United States Patent [19]
Ito et al.

[11] Patent Number: 6,137,704
[45] Date of Patent: Oct. 24, 2000

[54] POWER CONVERSION APPARATUS UTILIZING ZERO-PHASE POWER SUPPLY DEVICE THAT PROVIDES ZERO-PHASE SEQUENCE COMPONENTS

[75] Inventors: Junichi Ito; Koetsu Fujita, both of Tokyo, Japan

[73] Assignee: Fuji Electric Co., Ltd., Japan

[21] Appl. No.: 09/089,724

[22] Filed: Jun. 3, 1998

[30] Foreign Application Priority Data

Jun. 3, 1997 [JP] Japan ..................................... 9-145023
Jun. 3, 1997 [JP] Japan ..................................... 9-145024
Jun. 13, 1997 [JP] Japan ..................................... 9-156394
Jul. 31, 1997 [JP] Japan ..................................... 9-205122

[51] Int. Cl.⁷ .............................................. H02M 7/5387
[52] U.S. Cl. ............................................. 363/132; 363/98
[58] Field of Search ........................... 363/98, 131, 132; 318/138, 254, 439; 307/1, 2–5

[56] References Cited

U.S. PATENT DOCUMENTS 3,093,783  6/1963  Hass ......................................... 318/327
4,679,129  7/1987  Sakakibara et al. ....................... 363/17
4,695,933  9/1987  Nguyen et al. ............................ 363/17
4,922,400  5/1990  Cook ....................................... 363/132

*Primary Examiner*—Peter S. Wong
*Assistant Examiner*—Gary L. Laxton
*Attorney, Agent, or Firm*—Rossi & Associates

[57] ABSTRACT

A power conversion apparatus is provided which includes a power converter including a plurality of semiconductor switching elements which operate to perform power conversion, thereby to generate polyphase alternating current, an ac load circuit connected to an ac output side of the power converter, and a zero-phase power supply device connected to the ac load circuit. In this apparatus, the power converter, ac load circuit, and the zero-phase power supply device are connected in the form of a loop, so that voltage and current of the zero-phase power supply device provide zero-phase-sequence components when viewed from the ac output side of the power converter through the ac load circuit. The power converter performs time-sharing operations to supply and receive electric power to and from the ac load circuit, and supply and receive zero-phase-sequence power to and from the zero-phase power supply device.

12 Claims, 41 Drawing Sheets

6,137,704

POWER CONVERSION APPARATUS UTILIZING ZERO-PHASE POWER SUPPLY DEVICE THAT PROVIDES ZERO-PHASE SEQUENCE COMPONENTS

FIELD OF THE INVENTION

The present invention relates to an apparatus for converting input ac power into dc power and further converting the dc power into desired ac power, or an apparatus for converting input dc power into desired ac power.

BACKGROUND OF THE INVENTION

FIG. 46 is a circuit diagram showing a first known example of the above type of power conversion apparatus. This apparatus includes a single-phase ac power supply 101, reactor 102, converter 201 for shaping the waveform of input current into a sinusoidal wave having a high power factor, smoothing capacitor 202 provided in a dc intermediate circuit, and a three-phase voltage type inverter 231 for driving an induction motor 501 at variable speeds. In FIG. 46, the induction motor 501 is represented by its equivalent circuit.

In the converter 201 shown in FIG. 46, an ac power supply voltage applied through the reactor 102 is short-circuited by semiconductor switches, to thus form a suitable waveform of input current. As a result, ac power generated from the ac power supply 101 is converted into dc power, and the waveform of the input current is controlled to be in the shape of a sinusoidal wave. On the other hand, the inverter 231 consists of a three-phase voltage type PWM inverter, or the like, which includes three pairs of upper and lower arms each consisting of a self-commutated semiconductor switching element, such as IGBT, and a diode that is connected in reverse parallel to the switching element. The operation of this three-phase voltage type PWM inverter is well-known in the art, and therefore will not be explained in detail. The inverter 231 may operate in a selected one of six switching patterns established by controlling the conduction states of the six arms so as to control voltage between respective lines of the three phases, and two switching patterns associated with a zero-voltage vector, which are established by conducting all of the upper arms or all of the lower arms, so that all of the voltages between the lines of the three phases are made equal to zero level.

In the following description of other known circuits, the same reference numerals as used in FIG. 46 will be used for identifying functionally corresponding components or elements.

FIG. 47 is a circuit diagram showing a second known example of the above-described type of power conversion apparatus. The apparatus includes a dc power supply 103, and a converter (two-quadrant chopper) 204 which consists of one pair of upper and lower arms and serves to control the voltage applied to the inverter 231.

In this known circuit, dc power supply voltage applied through the reactor 102 is short-circuited by semiconductor switches, so that some energy is stored in the reactor 102. When the semiconductor switches are turned off, the energy of the reactor 102 is supplied, together with energy from the dc power supply 103, to the smoothing capacitor 202, so that the dc voltage of the smoothing capacitor 202 becomes higher than the power supply voltage.

In the power conversion apparatuses shown in FIG. 46 and FIG. 47, the capacitance of the smoothing capacitor 202 is made sufficiently large, so that switching operations of the converter 201 or converter 204, and the inverter 231 can be freely performed independently of each other.

FIG. 48 is a circuit diagram showing a third known example of the above type of power conversion apparatus, wherein reference numeral 104 denotes a single-phase, full-wave rectifier circuit consisting of a diode bridge, and reference numeral 205 denotes a converter in which the upper arm consists solely of a diode.

In the apparatus shown in FIG. 48, ac power supply voltage is subjected to full-wave rectification by the full-wave rectifier circuit 104, and the resulting dc voltage applied through the reactor 102 is short-circuited by semiconductor switches, thereby to form a suitable waveform of input current. In this manner, ac power generated from the ac power supply 101 can be converted into dc power, and the waveform of the input current can be controlled to be in the shape of a sinusoidal wave.

FIG. 49 is a circuit diagram showing a fourth known example of the above type of power conversion apparatus. This circuit diagram is disclosed in a paper titled "715 Reduction in Capacitance of Capacitor of Single-phase PWM Converter Having DC Active Filter Function" printed in 1996 National Convention Record I.E.E. Japan.

The apparatus shown in FIG. 49 includes a single-phase ac power supply 101, reactor 102, converter 201, inverter 231, two-quadrant chopper 401, smoothing capacitor 202 provided in a dc intermediate circuit, reactor 403 and capacitor 404 used for filters, and an induction motor 501.

While the operation of this circuit will not be described in detail, its basic operation is such that the converter 201 performs PWM control so as to keep a sinusoidal waveform of ac input current, while controlling the input power factor to 1. In order to absorb power ripple arising at the dc output side of the converter 201 and having a frequency that is twice as high as the power supply frequency, the two-quadrant chopper 401 controls the voltage of the capacitor 404 so as to supply and receive energy, thereby to reduce the capacitance of the smoothing capacitor 202.

FIG. 50 is a circuit diagram showing a fifth known example of the above-described type of power conversion apparatus. This circuit diagram is disclosed in a paper titled "One Measure to Reduce DC Voltage Ripple of Single-phase PWM Converter" printed in the Transactions of I.E.E. J. A Publication of Industry Applications Society published in 1993 (vol. 113-D, No. 9, p. 1106–p. 1107).

FIG. 51 is a circuit diagram showing a sixth known example of the above type of power conversion apparatus. This circuit diagram is disclosed in a paper titled "79 Method for Reducing Power Ripple of Single-phase Voltage Type PWM Converter" printed in 1996 National Convention Record I.E.E.J. Industry Applications Society.

In FIG. 50, reference numeral 405 denotes a LC filter in the form of a series resonance circuit that is coupled to a dc intermediate circuit. In FIG. 51, reference numeral 406 denotes a reactor.

While the operations of these circuits will not be described in detail, their basic operations are such that power ripple arising at the dc output side of the converter 201 and having a frequency that is twice as high as the power supply is absorbed by the LC filter 405 of FIG. 50 or the reactor 406 of FIG. 51 having the same resonance frequency, so that the capacitance of the smoothing capacitor 202 can be reduced.

In any case of the known circuits shown in FIG. 46 through FIG. 51, the reactor 102 needs to be provided on the input side of the converter 201, 204 or 205, for the purpose of absorbing ripple that arises upon switching of the converter, and therefore the overall size and cost of the power conversion apparatus cannot be reduced as desired.

In the known circuits shown in FIG. 49 through FIG. 51, the reactor (reactor of the LC filter 405 or reactor 406) is used for absorbing power ripple, and therefore the size and cost of the power conversion apparatus cannot be reduced as desired.

In the known circuits shown in FIG. 49 and FIG. 51, one pair of upper and lower arm (two-quadrant chopper 401) needs to be added to the dc intermediate circuit, and therefore the size and cost of the power conversion apparatus cannot be reduced as desired. Also, the known circuit as shown in FIG. 50 suffers from a problem that the breakdown voltage of the capacitor of the LC filter 405 becomes twice as high as the intermediate dc voltage.

SUMMARY OF THE INVENTION

It is therefore an object of the present invention to provide a power conversion apparatus which has a simple circuit configuration, and permits reduction in its size and cost.

To accomplish the above object, there is provided according the first aspect of the present invention a power conversion apparatus which includes: a power converter including a plurality of semiconductor switching elements which operate to perform power conversion, thereby to output polyphase alternating current; an ac load circuit connected to an ac output side of the power converter; and a zero-phase power supply device connected to the ac load circuit. In this apparatus, the power converter, ac load circuit, and the zero-phase power supply device are connected in the form of a loop, so that voltage and current of the zero-phase power supply device provide zero-phase-sequence components when viewed from the ac output side of the power converter through the ac load circuit, and the power converter performs time-sharing operations to supply and receive electric power to and from the ac load circuit, and supply and receive zero-phase-sequence power to and from the zero-phase power supply device.

A power conversion apparatus according to the second aspect of the invention includes: a single-phase ac power supply that generates a single-phase ac voltage; a power converter including a voltage-type inverter which converts the single-phase ac voltage into a polyphase ac voltage; a polyphase ac motor that is driven by the polyphase ac voltage generated from the voltage-type inverter, the polyphase ac motor including stator winding that are star-connected to each other; and a converter comprising two semiconductor switching elements that are connected in series and coupled to a dc side of the voltage-type inverter. In this apparatus, a first terminal of the single-phase ac power supply is connected to a neutral point of the stator windings of the polyphase ac motor, and a second terminal of the single-phase ac power supply is connected to a middle point between the two semiconductor elements of the converter, so that voltage and current of the single-phase ac power supply provide zero-phase-sequence components when viewed from an ac output side of the voltage-type inverter through the polyphase ac motor. The above-indicated voltage-type inverter supplies and receives electric power to and from the polyphase ac motor, and the inverter and the converter supply and receive zero-phase-sequence power to and from the ac power supply when the inverter outputs a zero-voltage vector, such that power transmission between the inverter and the ac motor and power transmission between the inverter and converter, and the ac power supply, are performed in a time-sharing manner.

A power converting apparatus according to the third aspect of the present invention includes: a single-phase ac power supply that generates a single-phase ac voltage; a power converter including a voltage-type inverter which converts the single-phase ac voltage into a polyphase ac voltage; a polyphase ac motor that is driven by the polyphase ac voltage generated from the voltage-type inverter, the polyphase ac motor including stator windings that are star-connected to each other; and a converter comprising two diodes that are connected in series and coupled to a dc side of the voltage-type inverter. In this apparatus, a first terminal of the single-phase ac power supply is connected to a neutral point of the stator windings of the polyphase ac motor, and a second terminal of the single-phase ac power supply is connected to a middle point between the two diodes of the converter, so that voltage and current of the ac power supply provide zero-phase-sequence components when viewed from an ac output side of the voltage-type inverter through the polyphase ac motor, and wherein the voltage-type inverter supplies and receives electric power to and from the polyphase ac motor, and the inverter and the converter supply and receive zero-phase-sequence power to and from the single-phase ac power supply when the inverter outputs a zero-voltage vector, such that power transmission between the inverter and the ac motor and power transmission between the inverter and converter, and the ac power supply, are performed in a time-sharing manner.

A power conversion apparatus according to the fourth aspect of the invention includes: a single-phase ac power supply that generates a single-phase ac voltage; a power converter including a voltage-type inverter which converts the single-phase ac voltage into a polyphase ac voltage; a polyphase ac motor that is driven by the polyphase ac voltage generated from the voltage-type inverter, the polyphase ac motor including stator windings that are star-connected to each other; and a converter comprising two capacitors that are connected in series and coupled to a dc side of the voltage-type inverter. In this apparatus, a first terminal of the single-phase ac power supply is connected to a neutral point of the stator windings of the polyphase ac motor, and a second terminal of the single-phase ac power supply is connected to a middle point between the two capacitors of the converter, so that voltage and current of the ac power supply provide zero-phase-sequence components when viewed from an ac output side of the voltage-type inverter through the polyphase ac motor. The above-indicated voltage-type inverter supplies and receives electric power to and from the polyphase ac motor, and the inverter and the converter supply and receive zero-phase-sequence power to and from the single-phase ac power supply when the inverter outputs a zero-voltage vector, such that power transmission between the inverter and the ac motor and power transmission between the inverter and converter, and the ac power supply, are performed in a time-sharing manner.

A power conversion apparatus according to the fifth aspect of the present invention includes: a dc power supply that generates a dc voltage; a power converter including a voltage-type inverter which converts the dc voltage into a polyphase ac voltage; a polyphase ac motor that is driven by the polyphase ac voltage generated from the voltage-type inverter, the polyphase ac motor including stator windings that are star-connected to each other; and a smoothing capacitor that is connected in parallel to a dc side of the voltage-type inverter. In this apparatus, a first terminal of the dc power supply is connected to a neutral point of the stator windings of the polyphase ac motor, and a second terminal of the dc power supply is connected to a connection point between the smoothing capacitor and the inverter, so that voltage and current of the dc power supply provide zero-phase-sequence components when viewed from an ac output side of the voltage-type inverter through the polyphase ac motor. The above-indicated voltage-type inverter performs time-sharing operations to supply and receive electric power to and from the polyphase ac motor, and supply and receive zero-phase-sequence power to and from the dc power supply when the inverter outputs a zero-voltage vector.

A power conversion apparatus according to the sixth aspect of the present invention includes: an ac power supply that produces an alternating current; a rectifier circuit that is connected to the ac power supply, for rectifying the alternating current so as to produce a dc voltage; a power converter including a voltage-type inverter which converts the dc voltage received from the rectifier circuit into a polyphase ac voltage; a polyphase ac motor that is driven by the polyphase ac voltage generated from the voltage-type inverter, the polyphase ac motor including stator windings that are star-connected to each other; and a smoothing capacitor that is connected in parallel to a dc side of the voltage-type inverter. In this apparatus, a first terminal of the rectifier circuit is connected to a neutral point of the stator windings of the polyphase ac motor, and a second terminal of the rectifier circuit is connected to a connection point between the smoothing capacitor and the inverter, so that voltage and current of the ac power supply provide zero-phase-sequence components when viewed from an ac output side of the voltage-type inverter through the polyphase ac motor. The above-indicated voltage-type performs time-sharing operations to supply and receive electric power to and from the polyphase ac motor, and supply and receive zero-phase-sequence power to and from the ac power supply when the inverter outputs a zero-voltage vector.

According to the first to sixth aspects of the invention as described above, the inverter is able to perform the function of one arm of the converter of the known circuit, which leads to reduction of the number of semiconductor switching elements, reverse parallel diodes and others in a single-phase/polyphase power converter or direct current/polyphase power converter. Also, a reactor on the input side of the power converter can be eliminated. Thus, the circuit configuration can be simplified, and the overall size and cost of the apparatus can be advantageously reduced. This makes it possible to realize a small-sized, inexpensive drive device for driving a motor, or the like, having a high input power factor.

In the power conversion apparatus according to the second to sixth aspects of the invention, a reactor may be inserted between the neutral point of the polyphase ac motor and the power supply. In this case, a stator core of the polyphase ac motor may also used as an iron core of the reactor. With this arrangement, the stator core of the motor can be more efficiently utilized.

In the apparatus according to the second to sixth aspects of the invention, an ac load having no neutral point may be connected to a polyphase output side of the voltage-type inverter, in place of the polyphase ac motor, and a reactor may be star-connected to the polyphase output side of the inverter, such that a neutral point of the reactor is connected to one terminal of the power supply or the rectifier circuit. With this arrangement, the power conversion apparatus of the present invention may be used for driving an ac load having no neutral point.

A power conversion apparatus according to the seventh aspect of the present invention includes: a converter which converts a single-phase ac voltage into a dc voltage; a voltage-type inverter that converts the dc voltage into a polyphase ac voltage; a polyphase ac motor that is driven by the polyphase ac voltage generated from the voltage-type inverter, the polyphase ac motor comprising stator windings that are star-connected to each other; a smoothing capacitor connected to a dc intermediate circuit provided between the converter and the voltage-type inverter; and a ripple absorbing capacitor that serves as an energy storage element, which is provided between a neutral point of the stator windings of the motor, and a connection point between the inverter and the smoothing capacitor. In this apparatus, the voltage-type inverter performs time-sharing operations to supply and receive power to and from the polyphase ac motor, and supply and receive zero-phase-sequence power to and from the ripple absorbing capacitor when the inverter outputs a zero-voltage vector, so as to control a dc voltage of the ripple absorbing capacitor, so that power ripple arising in the dc intermediate circuit is absorbed by the ripple absorbing capacitor.

A power conversion apparatus according to the eighth aspect of the invention includes: a converter which converts a single-phase ac voltage into a dc voltage; a voltage-type inverter that converts the dc voltage into a polyphase ac voltage; a polyphase ac motor that is driven by the polyphase ac voltage generated from the inverter, the polyphase ac motor comprising stator windings that are star-connected to each other; a smoothing capacitor connected to a dc intermediate circuit provided between the converter and the voltage-type inverter; and a series resonance circuit provided between a neutral point of the stator windings of the polyphase ac motor, and a connection point between the voltage-type inverter and the smoothing capacitor, the series resonance circuit comprising a resonance capacitor as an energy storage element, and a resonance reactor. In this apparatus, the voltage-type inverter performs time-sharing operations to supply and receive electric power to and from the polyphase ac motor, and supply and receive zero-phase-sequence power to and from the series resonance circuit when the inverter outputs a zero-voltage vector, so as to control a voltage across the series resonance circuit, so that the series resonance circuit absorbs power ripple arising in the dc intermediate circuit.

A power conversion apparatus according to the ninth aspect of the present invention includes: a converter which converts a single-phase ac voltage into a dc voltage; a voltage-type inverter that converts the dc voltage into a polyphase ac voltage; a polyphase ac motor that is driven by the polyphase ac voltage received from the inverter, the polyphase ac motor comprising stator windings that are star-connected to each other; a smoothing capacitor connected to a dc intermediate circuit provided between the converter and the voltage-type inverter; and a ripple absorbing reactor serving as an energy storage element, which is provided between a neutral point of the stator windings of the polyphase ac motor, and one of ac input terminals of the converter. In this apparatus, the voltage-type inverter performs time-sharing operations to supply and receive power to and from the polyphase ac motor, and supply and receive zero-phase-sequence power to and from the ripple absorbing reactor when a zero-voltage vector is generated by the inverter, so as to control a voltage of the ripple absorbing reactor, so that the ripple absorbing reactor absorbs power ripple arising in the dc intermediate circuit.

According to the seventh to ninth aspects of the invention, zero-phase-sequence power can be controlled by using a zero-voltage vector of the inverter, making it possible to eliminate an additional arm conventionally used in the known circuits. Thus, the circuit configuration can be simplified, and the size and cost of the apparatus can be reduced, while assuring reduced capacitance of the smoothing capacitor.

In the apparatus according to the seventh to ninth aspects of the invention, a reactor may be inserted between the neutral point of the polyphase ac motor and the energy storage element. In this case, a stator core of the polyphase ac motor may be also used as a stator of the reactor. In this arrangement, the reactor conventionally provided for absorbing power ripple may be replaced by leakage inductance of the motor.

In the apparatus according to the seventh to ninth aspects of the invention, an ac load having no neutral point may be connected to a polyphase output side of the voltage-type inverter, in place of the polyphase ac motor, and a reactor may be star-connected to the polyphase output side of the inverter, such that a neutral point of the reactor is connected to one terminal of the energy storage element. With this arrangement, the power conversion apparatus of the invention may be used for driving an ac load having no neutral point.

A power conversion apparatus according to the tenth aspect of the present invention includes: a single-phase voltage type inverter comprising a plurality of semiconductor switching elements which perform dc/ac power conversion, so as to generate a single-phase ac voltage; a smoothing capacitor that is connected between dc input terminals of the single-phase voltage type inverter; a single-phase circuit that is connected between ac output terminals of the single-phase voltage type inverter; a set of diodes comprising a plurality of diodes whose polarities are reversed at a polarity reversal point inside the set of diodes, at which point the diodes are connected to each other; and a dc power supply connected between the polarity reversal point of the set of diodes, and one terminal of the smoothing capacitor. In this apparatus, the single-phase voltage type inverter performs time-sharing operations to supply and receive ac power to and from the single-phase circuit, and supply and receive dc power to and from the dc power supply via the set of diodes when a zero-voltage vector is generated.

A power conversion apparatus according to the eleventh aspect of the invention includes: a single-phase voltage type inverter comprising a plurality of semiconductor switching elements that operate to perform dc/ac power conversion, so as to generate a single-phase ac voltage; a smoothing capacitor that is connected between dc input terminals of the single-phase voltage type inverter; a single-phase load that is connected between ac output terminals of the single-phase voltage-type inverter; a set of diodes comprising two diodes whose polarities are reversed at a polarity reversal point inside the set of diodes, at which point the two diodes are connected to each other; a reactor having a first end connected to the polarity reversal point of the set of diodes; and a dc power supply connected between a second end of the reactor and one terminal of the smoothing capacitor. In this apparatus, the single-phase voltage type inverter performs time-sharing operations to supply and receive ac power to and from the single-phase load, and supply and receive dc power to and from the dc power supply via the set of diodes when a zero-voltage vector is generated.

A power conversion apparatus according to the twelfth aspect of the present invention includes: a single-phase voltage type inverter comprising a plurality of semiconductor switching elements that operate to perform dc/ac power conversion, so as to generate a single-phase ac voltage; a smoothing capacitor that is connected between dc input terminals of the single-phase voltage type inverter; a single-phase ac power supply connected between ac output terminals of the single-phase voltage type inverter with a first reactor interposed between the ac power supply and the inverter; a set of diodes comprising two diodes whose polarities are reversed at a polarity reversal point inside the set of diodes, at which point the two diodes are connected to each other; a second reactor having a first end connected to the polarity reversal point of the set of diodes; and a dc power supply connected between a second end of the second reactor and one terminal of the smoothing capacitor. In this apparatus, the single-phase voltage type inverter performs time-sharing operations to supply and receive ac power to and from the single-phase ac power supply, so as to regenerate power of the dc power supply, and supply and receive dc power to and from the dc power supply via the set of diodes when a zero-voltage vector is generated.

A power conversion apparatus according to the thirteenth aspect of the invention includes: a single-phase voltage type inverter comprising a plurality of semiconductor switching elements that operate to perform dc/ac power conversion, so as to generate a single-phase ac voltage; a smoothing capacitor that is connected between dc input terminals of the single-phase voltage type inverter; a first reactor having one end connected to a first ac output terminal of the inverter; a second reactor having one end connected to a second ac output terminal of the inverter; a single-phase ac power supply connected between the other end of the first reactor and the other end of the second reactor; a set of diodes comprising two diodes whose polarities are reversed at a polarity reversal point inside the set of diodes, at which point the two diodes are connected to each other, the set of diodes being connected in series to opposite terminals of the single-phase ac power supply; and a dc power supply connected between the polarity reversal point of the set of diodes and one terminal of the smoothing capacitor. In this apparatus, the single-phase voltage type inverter performs time-sharing operations to supply and receive ac power to and from the single-phase ac power supply, so as to regenerate power of the dc power supply, and supply and receive dc power to and from the dc power supply via the set of diodes when a zero-voltage vector is generated.

In the apparatus according to the eleventh to thirteenth aspects of the invention, the inverter may replace a dc/dc converter, such as a booster chopper, used in the known circuit for increasing the dc voltage of the single-phase voltage type inverter to a certain level. Accordingly, the number or size of semiconductor switching elements, and driving circuit and drive power supply for these elements may be reduced. Consequently, the circuit configuration can be simplified, and the size and cost of the apparatus can be advantageously reduced.

In the apparatus according to the eleventh to thirteenth aspects of the invention, the dc power supply may be constructed as a combination of an ac power supply and a rectifier circuit.

A power conversion apparatus according to the fourteenth aspect of the present invention includes: a dc power supply that produces dc power; a voltage-type inverter comprising a plurality of semiconductor switching elements that operate to convert the dc power of the dc power supply into ac power, and supply the ac power to a load; and zero-phase-sequence current passing means comprising a plurality of diodes having respective first terminals that are connected to a common point with the same polarity, the zero-phase-sequence current passing means being connected between the dc power supply and ac output terminals of the voltage-type inverter for respective phases. In this apparatus, the voltage-type inverter performs time-sharing operations to supply and receive ac power to and from the load, and supply and receive zero-phase-sequence power to and from the dc power supply via the zero-phase current passing means when a zero-voltage vector is generated by the inverter.

A power conversion apparatus according to the fifteenth aspect of the invention includes: a dc power supply comprising an ac power supply, and a rectifier circuit connected to the ac power supply; a three-phase voltage type inverter comprising a plurality of semiconductor switching elements that operate to convert dc power of the dc power supply into a three-phase ac power, and supply the ac power to a load; a zero-phase bypass diode set serving as zero-phase current passing means, comprising three diodes having respective anodes that are connected to a common point, the anodes being connected to a positive-side output terminal of the rectifier circuit via a reactor, the three diodes having respective cathodes that are respectively connected to ac output terminals of the three-phase voltage type inverter that correspond to respective phases; and a smoothing capacitor provided on a dc input side of the three-phase voltage type inverter. In this apparatus, the rectifier circuit has a negative-side output terminal that is connected to a negative-side terminal of the smoothing capacitor, and the three-phase voltage type inverter performs time-sharing operations to supply and receive ac power to and from the load, and supply and receive zero-phase-sequence power to and from the dc power supply via the zero-phase bypass diode set when a zero-voltage vector is generated by the inverter.

A power conversion apparatus according to the sixteenth aspect of the invention includes: a dc power supply comprising an ac power supply, and a rectifier circuit connected to the ac power supply; a three-phase voltage-type inverter comprising a plurality of semiconductor switching elements that operate to convert dc power of the dc power supply into three-phase ac power, and supply the ac power to a load; a zero-phase bypass diode set serving as zero-phase current passing means, comprising three diodes having respective cathodes that are connected to a common point, the cathodes being connected to a positive-side output terminal of the rectifier circuit via a reactor, the three diodes having respective anodes that are connected to ac output terminals of the three-phase voltage type inverter that correspond to respective phases; and a smoothing capacitor provided on a dc input side of the three-phase voltage type inverter. In this apparatus, the rectifier circuit has a positive-side output terminal that is connected to a positive-side terminal of the smoothing capacitor; and the three-phase voltage type inverter performs time-sharing operations to supply and receive ac power to and from the load, and supply and receive zero-phase-sequence power to and from the dc power supply via the zero-phase bypass diode set when a zero-voltage vector is generated by the inverter.

A power conversion apparatus according to the seventeenth aspect of the invention includes: a dc power supply comprising an ac power supply, and a rectifier circuit connected to the ac power supply with a reactor interposed between the ac power supply and the rectifier circuit; a three-phase voltage type inverter comprising a plurality of semiconductor switching elements that operate to convert dc power of the dc power supply into three-phase ac power, and supply the ac power to a load; a zero-phase bypass diode set serving as zero-phase current passing means, comprising three diodes having respective anodes that are connected to a common point, the anodes being connected to a positive-side output terminal of the rectifier circuit, the three diodes having respective cathodes that are connected to ac output terminals of the three-phase voltage type inverter that correspond to respective phases; and a smoothing capacitor provided on a dc input side of the three-phase voltage type inverter. In this apparatus, the rectifier circuit has a negative-side output terminal that is connected to a negative-side terminal of the smoothing capacitor, and the three-phase voltage type inverter performs time-sharing operations to supply and receive ac power to and from the load, and supply and receive zero-phase-sequence power to and from the dc power supply via the zero-phase bypass diode set when a zero-voltage vector is generated by the inverter.

A power conversion apparatus according to the eighteenth aspect of the invention includes: a dc power supply comprising an ac power supply, and a rectifier circuit connected to the ac power supply with a reactor interposed between the ac power supply and the rectifier circuit; a three-phase voltage type inverter comprising a plurality of semiconductor switching elements that operate to convert dc power of the dc power supply into a three-phase ac power, and supply the ac power to a load; a zero-phase bypass diode set serving as zero-phase current passing means, comprising three diodes having respective cathodes that are connected to a common point, the cathodes being connected to a positive-side output terminal of the rectifier circuit, the three diodes having respective anodes that are connected to ac output terminals of the three-phase voltage type inverter that correspond to respective phases; and a smoothing capacitor provided on a dc input side of the three-phase voltage type inverter. In this apparatus, the rectifier circuit has a positive-side output terminal that is connected to a positive-side terminal of the smoothing capacitor, and the three-phase voltage type inverter performs time-sharing operations to supply and receive ac power to and from the load, and supply and receive zero-phase-sequence power to and from the dc power supply via the zero-phase bypass diode set when a zero-voltage vector is generated by the inverter.

A power conversion apparatus according to the nineteenth aspect of the invention includes: a dc power supply having a positive electrode and a negative electrode; a three-phase voltage type inverter comprising a plurality of semiconductor switching elements that operate to convert dc power of the dc power supply into a three-phase ac power, and supply the ac power to a load; a zero-phase bypass diode as zero-phase current passing means, comprising three diodes having respective anodes that are connected to a common point, the anodes being connected to the positive electrode of the dc power supply via a reactor, the three diodes having respective cathodes that are connected to ac output terminals of the three-phase voltage type inverter that correspond to respective phases; and a smoothing capacitor provided on a dc input side of the three-phase voltage type inverter. In this apparatus, the negative electrode of the dc power supply is connected to a negative-side terminal of the smoothing capacitor, and the three-phase voltage type inverter performs time-sharing operations to supply and receive ac power to and from the load, and supply and receive zero-phase-sequence power to and from the ac power supply when a zero-voltage vector is generated by the inverter, so as to control a dc voltage of the inverter.

A power conversion apparatus according to the twentieth aspect of the invention includes: a dc power supply having a positive electrode and a negative electrode; a three-phase voltage-type inverter comprising a plurality of semiconductor switching elements that operate to convert dc power of the dc power supply into a three-phase ac power, and supply the ac power to a load; a zero-phase bypass diode serving as zero-phase current passing means, comprising three diodes having respective cathodes that are connected to a common point, the cathodes being connected to the negative electrode of the dc power supply via a reactor, the three diodes having respective anodes that are connected to ac output terminals of the inverter that correspond to respective phases; and a smoothing capacitor provided on a dc input side of the three-phase voltage type inverter. In this apparatus, the positive electrode of the dc power supply is connected to a positive-side terminal of the smoothing capacitor, and the three-phase voltage type inverter performs time-sharing operations to supply and receive ac power to and from the load, and supply and receive zero-phase-sequence power to and from the dc power supply when a zero-voltage vector is generated by the inverter, so as to control a dc voltage of the inverter.

In the power conversion apparatus of the fifteenth, seventeenth, and nineteenth aspects of the invention, a zero-phase-sequence voltage command value that is to be superimposed on each of voltage command values for respective phases may be obtained by subtracting the minimum value of the voltage command values for respective phases, from an anode potential command value of the zero-phase bypass diode set.

In the power conversion apparatus of the sixteenth, eighteenth and twentieth aspects of the invention, a zero-phase-sequence voltage command value that is to be superimposed on each of voltage command values for respective phases may be obtained by subtracting the maximum value of the voltage command values for respective phases, from a cathode potential command value of the zero-phase bypass diode set.

According to the fourteenth to eighteenth aspects of the invention, the inverter generates a zero-voltage vector to control zero-phase-sequence voltage, thereby to perform the function of a dc/dc converter, such as a booster chopper, used in the known circuit for controlling the waveform of input current to be in the shape of a sinusoidal wave. This leads to reduction in the number or size of semiconductor switching elements, and driving circuit and drive power supply for these elements.

According to the nineteenth and twentieth aspects of the invention, zero-phase-sequence voltage artificially obtained by the zero-phase bypass diode set may be utilized so that dc power supply voltage can be increased without adding using an additional arm, thus eliminating a need to provide a booster chopper.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

Figure 1:
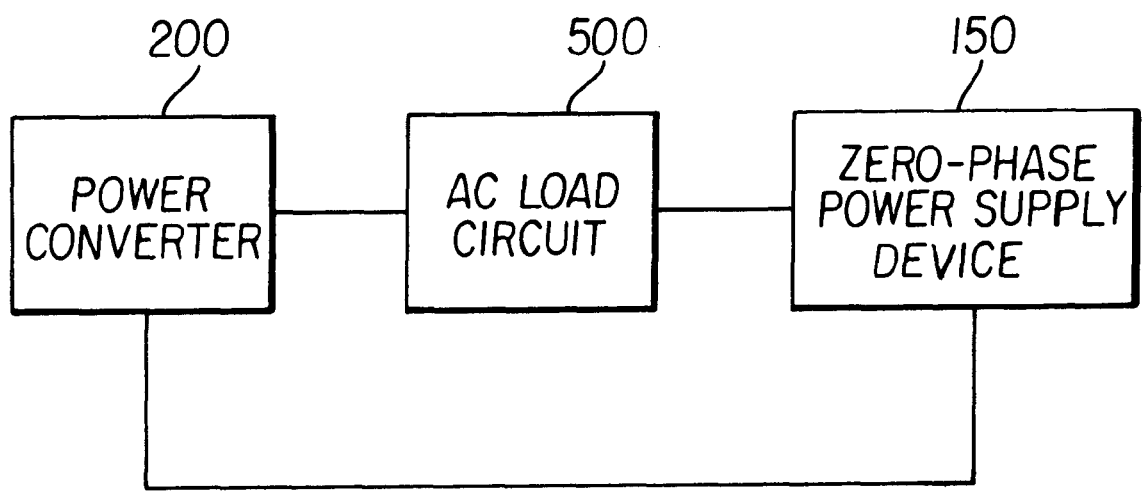
FIG. 1 is a schematic view showing the first embodiment of the present invention.

In the following description of preferred embodiments of the present invention, the same reference numerals as used in FIGS. 46–51 showing the known circuits are used for identifying corresponding components or elements having substantially the same function.

FIG. 1 is a schematic view showing a power conversion apparatus constructed according to the first embodiment of the present invention. In FIG. 1 reference numeral 150 denotes a zero-phase power supply device consisting of a single-phase ac power supply, dc power supply, or a passive element, such as inductance or capacitance, which is able to store electric energy to be supplied to a load, and reference numeral 200 denotes a power converter, such as a single-phase/polyphase power converter or direct current/polyphase power converter, which consists of a converter, chopper, or an inverter, or the like. This power converter 200 performs power conversion through the operation of semiconductor switching element(s), and generates polyphase ac power. Reference numeral 500 denotes an ac load circuit, such as an ac motor, transformer, or an ac power supply connected through inductance, which supplies and receive ac power to and from the power converter 200.

The power converter 200, ac load circuit 500 and the zero-phase power supply device 150 are connected in the form of a loop, so that the voltage and current of the zero-phase power supply device 150 provide zero-phase-sequence components when viewed from the ac output side of the power converter 200 through the ac load circuit 500. In this sense, the power supply device 150 is called "zero-phase power supply device".

In the arrangement as described above, ac power is transmitted between the power converter 200 and the ac load circuit 500, by controlling voltage between respective lines of an inverter in the power converter 200 and current flowing between these lines, thereby to control electric power, in the same manner as in the known circuits.

For power transmission between the power converter 200 and the power supply device 150, on the other hand, the power converter 200 controls zero-phase-sequence voltage and zero-phase-sequence current of the zero-phase power supply device 150, for example, using a zero-voltage vector of its inverter, for example.

Thus, the power converter 200 performs time-sharing operations to supply and receive electric power to and from the ac load circuit 500, and supply and receive zero-phase-sequence power to and from the zero-phase power supply device 150. Namely, while the power converter 200 supplies and receives zero-phase-sequence power to and from the zero-phase power supply device 150, the inverter included in the power converter 200 performs part or all of the operations of the converter for performing power conversion between the converter 200 and the zero-phase power supply device 150. Consequently, the number of arms comprising semiconductor switching elements or diodes in the power converter 200 can be reduced.

It is possible to use a reactor, such as leakage reactance of an ac motor, which is included in the ac load circuit 500, as an input-side reactor needed for the power converter 200. The use of such a reactor eliminates a need to provide an exclusive input reactor, and thus contributes to reduction in the size of the apparatus.

Figure 2:
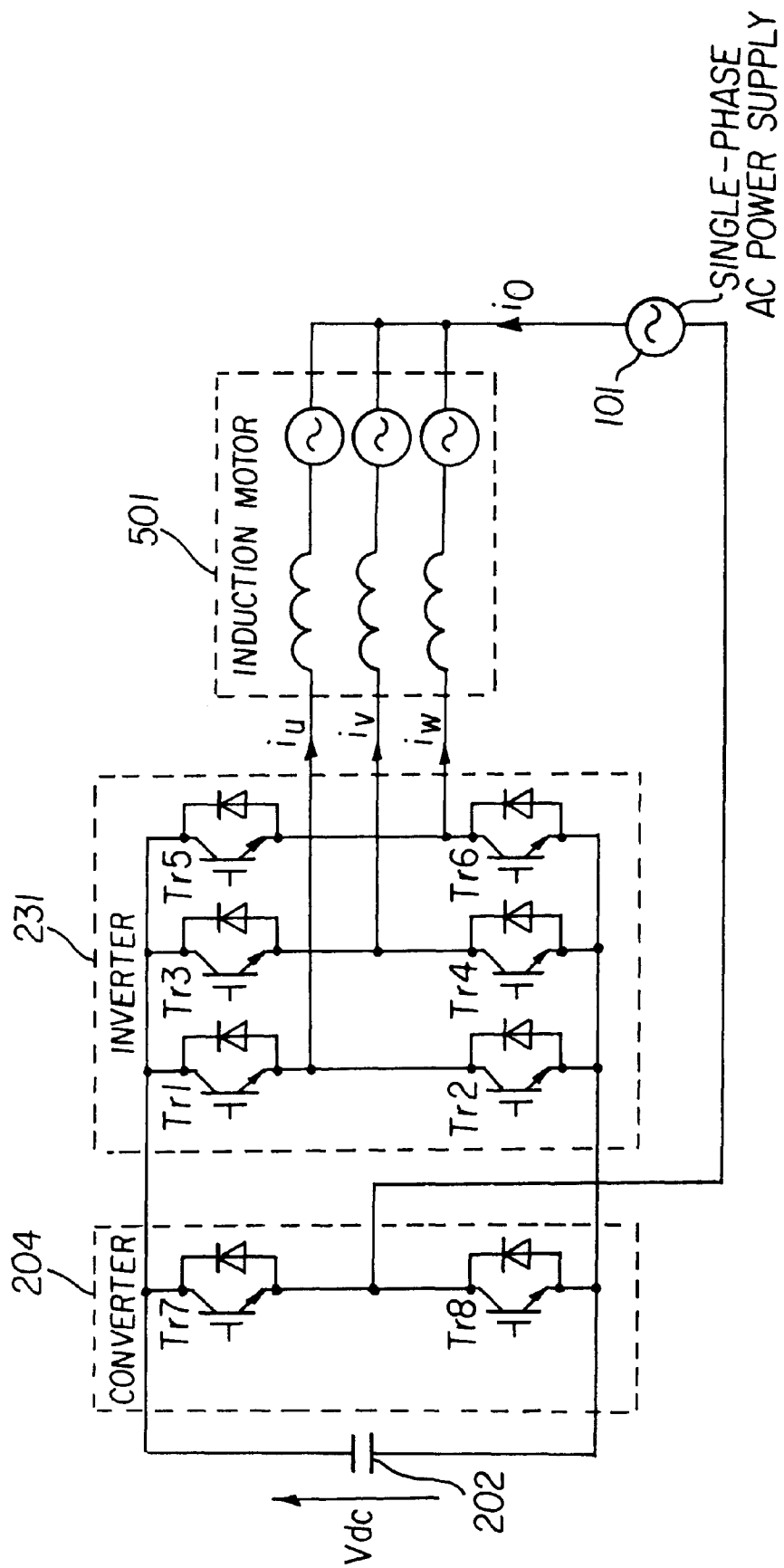
FIG. 2 is a circuit diagram showing the second embodiment of the present invention.

FIG. 2 is a circuit diagram showing a power converting apparatus constructed according to the second embodiment of the present invention. The apparatus shown in FIG. 2 includes a smoothing capacitor 202, three-phase voltage type inverter 231 consisting of self-commutated semiconductor switching elements Tr1–Tr6, such as IGBTs, and diodes each of which is connected in reverse parallel to a corresponding one of the switching elements, converter 204 having a pair of upper and lower arms comprising self-commutated semiconductor switching elements Tr7, Tr8, and diodes each of which is connected in reverse parallel to a corresponding one of the switching elements, three-phase induction motor 501 in which stator windings are star-connected to each other, and a single-phase ac power supply 501 that is connected at one end to a neutral point of the induction motor 501, and connected at the other end to the middle point (virtual neutral point) of the switching elements Tr7, Tr8 of the converter 204.

In the present embodiment, attention is given to a zero-voltage vector of the three-phase voltage type inverter 231. More specifically, the three-phase voltage type inverter 231 is able to generate a zero-voltage vector, by selecting one of two switching patterns, i.e., a switching pattern in which all of the upper arms are conducted, and a switching pattern in which all of the lower arms are conducted. This embodiment utilizes this degree of freedom in selecting the switching pattern.

The zero-phase-sequence voltage generated by the inverter 231 does not appear as a voltage between lines, and therefore has no influence on the manner of driving the motor. Accordingly, an equivalent circuit of its positive-phase-sequence component is configured as shown in FIG. 3, wherein the inverter 231 operates in the same manner as a known counterpart in terms of driving of the motor 501, and supplies and receives ac power to and from the motor 501, by controlling voltage between lines of the inverter 231 and current flowing between the lines, thereby to control electric power to be supplied to the motor 501.

Figure 3:
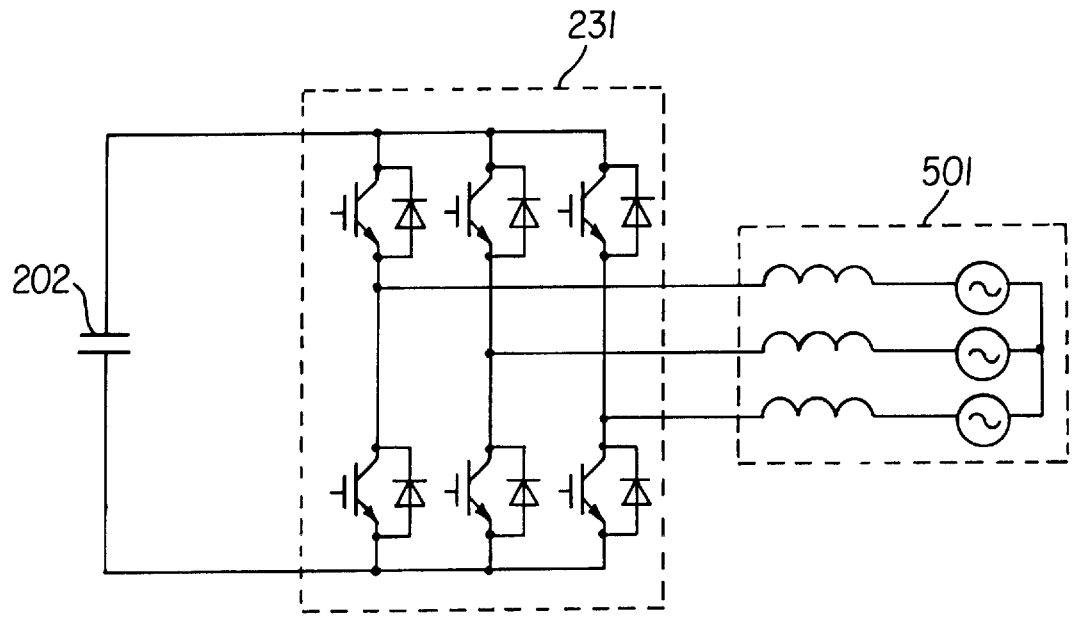
FIG. 3 is an equivalent circuit for a positive-phase-sequence component of the second embodiment of the invention.
Figure 4:
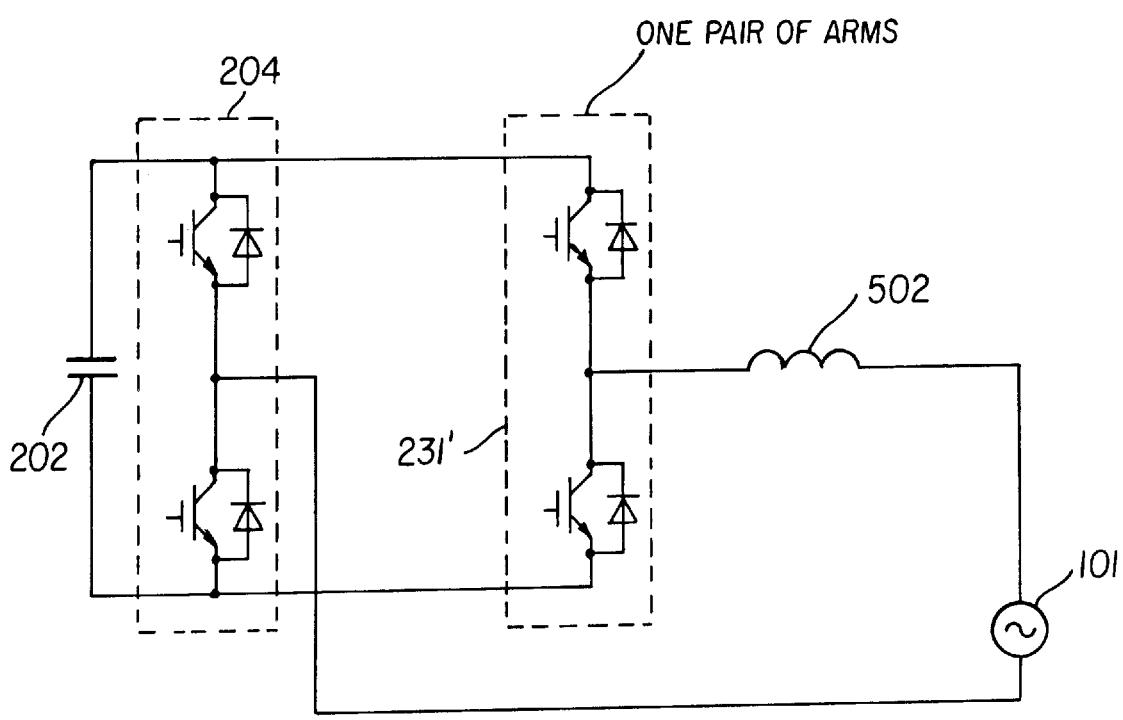
FIG. 4 is an equivalent circuit for a zero-phase-sequence component of the second embodiment of the invention.

When considering the zero-phase-sequence component, on the other hand, the equivalent circuit is configured as shown in FIG. 4, wherein three pairs of arms of the inverter 231 as viewed in FIG. 3 can be regarded as one pair of arms 231' which performs switching operation at the ratio of the zero-voltage vectors. In this connection, the ratio of the zero-voltage vectors means the ratio of a zero-voltage vector generated when all of upper arms are conducted to that generated when all of lower arms are conducted. One arm of the converter 201 of the known circuit shown in FIG. 46 may be substituted or replaced by the arrangement in which the zero-phase-sequence voltage is controlled by the inverter 231 of FIG. 2. The motor 501 may be considered as a reactor 502 having a value of leakage inductance.

Figure 46:
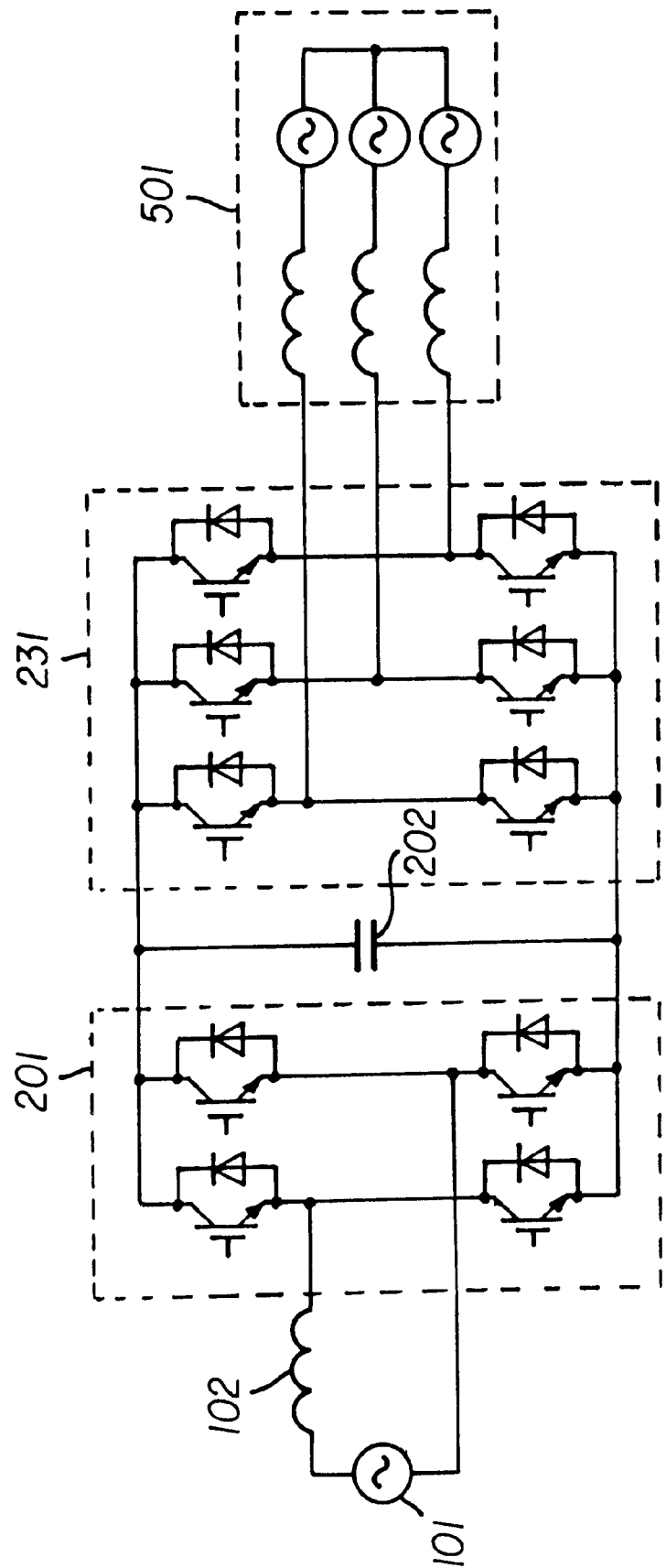
FIG. 46 is a circuit diagram showing a known circuit.

By separately adding one pair of arms 204 serving as a converter as shown in FIG. 4, the pairs of arms 231' and 204 cooperate with each other to provide a circuit arrangement which is equivalent to that of the converter 201 of the known circuit as shown in FIG. 46, and perform power conversion in the same manner as in the converter 201. Namely, the converter consisting of the pairs of arms 231', 204 of FIG. 4 supplies and receives zero-phase-sequence power to and from the single-phase ac power supply 101, through the reactor 502.

Thus, the circuit as shown in FIG. 2 is able to realize a single-phase/polyphase power converting circuit that is substantially the same as the known circuit shown in FIG. 46. Consequently, the circuit configuration can be simplified, and the overall size and cost of the apparatus can be reduced, owing to reduction in the number of semiconductor switching elements, diodes and other components, and elimination of the input-side reactor.

The motor which provides an ac load may be other type of polyphase ac motor than the three-phase induction motor as used in the illustrated embodiment.

Figure 5:
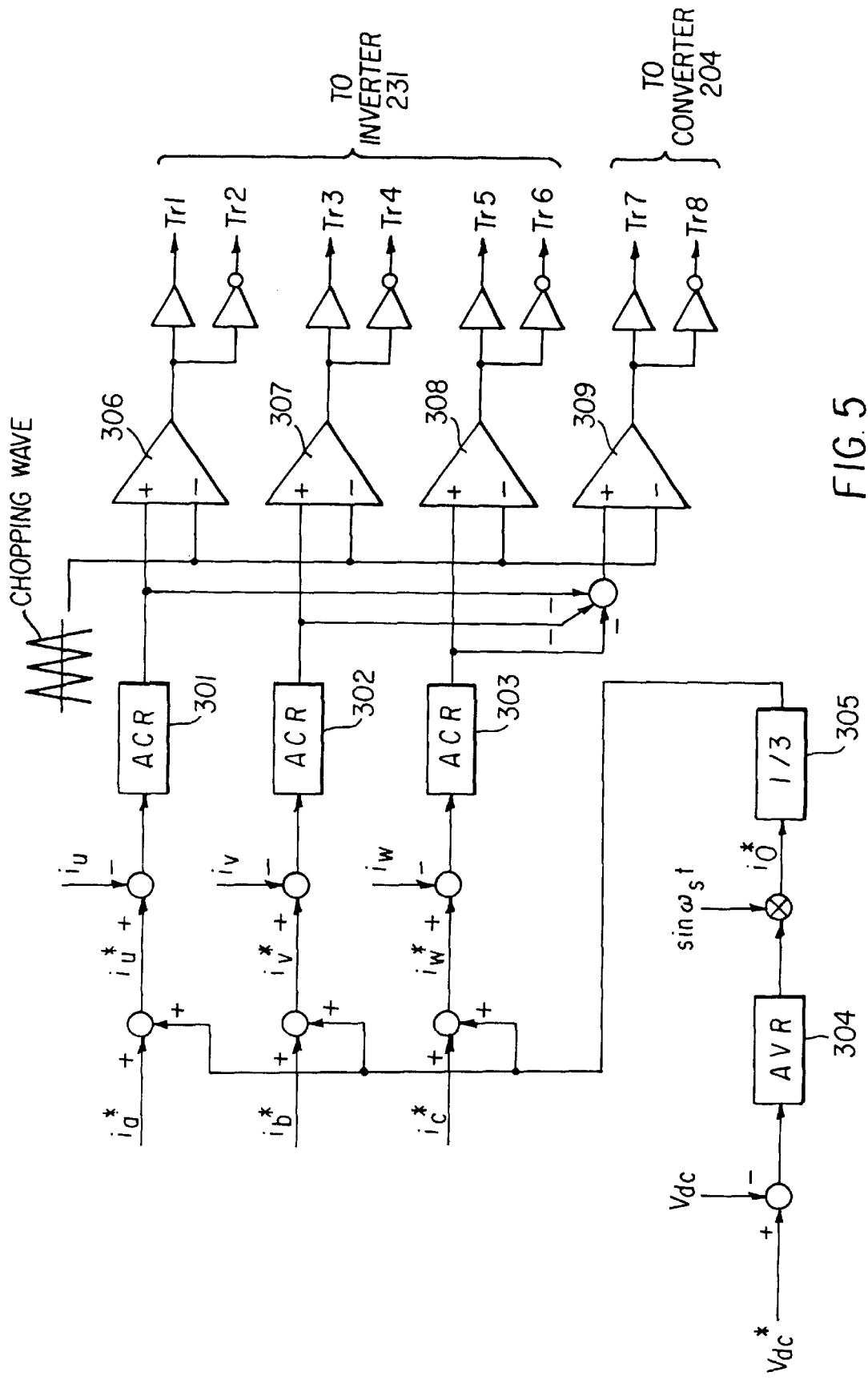
FIG. 5 is a circuit diagram showing a control circuit of the second embodiment of the invention.

Each of the inverter 231 and converter 204 of FIG. 2 is controlled by PWM pulses, which are produced, for example, by a control circuit as shown in FIG. 5.

Referring to FIG. 5, a difference between a dc voltage command $V_{dc}^*$ and a dc voltage detected value $V_{dc}$ is input to a voltage controller 304, and the output of the controller 304 is multiplied by a sinusoidal wave $\sin \omega_s t$ which is in phase with the power supply voltage and has a magnitude of 1, so as to provide a zero-phase-sequence (input) current command $i_0^*$.

After a multiplier 305 multiplies the zero-phase-sequence current command $i_0^*$ by ⅓, the resulting signal is added to current commands $i_a^*$, $i_b^*$, $i_c^*$ for driving the motor 501, so as to produce current commands $i_u^*$, $i_v^*$, $i_w^*$ for respective phases. Then, differences between these current commands $i_u^*$, $i_v^*$, $i_w^*$ and actual current detected values $i_u$, $i_v$, $i_w$ for respective phases are obtained, and the results are input to respective current controllers 301–303. Then, comparators 306–308 compare respective outputs of these controllers 301–303 with a chopping wave, so as to obtain PWM patterns for driving the switching elements Tr1–Tr6 of the inverter 231 so that the currents of respective phases follow the corresponding commands $i_u^*$, $i_v^*$, and $i_w^*$.

With regard to the converter 204, zero-phase-sequence voltage is obtained from the sum of the voltage commands for respective phases to be applied to the inverter 231 (i.e., outputs of the current controllers 301, 303), and this zero-phase-sequence voltage is compared by a comparator 309 with a chopping wave, thereby to obtain PWM patterns for driving the switching elements Tr7, Tr8 of the converter 204.

In the present embodiment, the inverter 231 and converter 204 are controlled by PWM pulses in a time-sharing fashion, so as to operate as a combination of the three-phase voltage type inverter of FIG. 3 and the full-bridge type single-phase converter of FIG. 4, wherein the three-phase voltage type inverter uses positive-phase-sequence current to control voltage across its lines and current flowing between the lines, and the full-bridge type single-phase converter uses zero-phase-sequence current to control the input current of the single-phase ac power supply 101.

Figure 6:
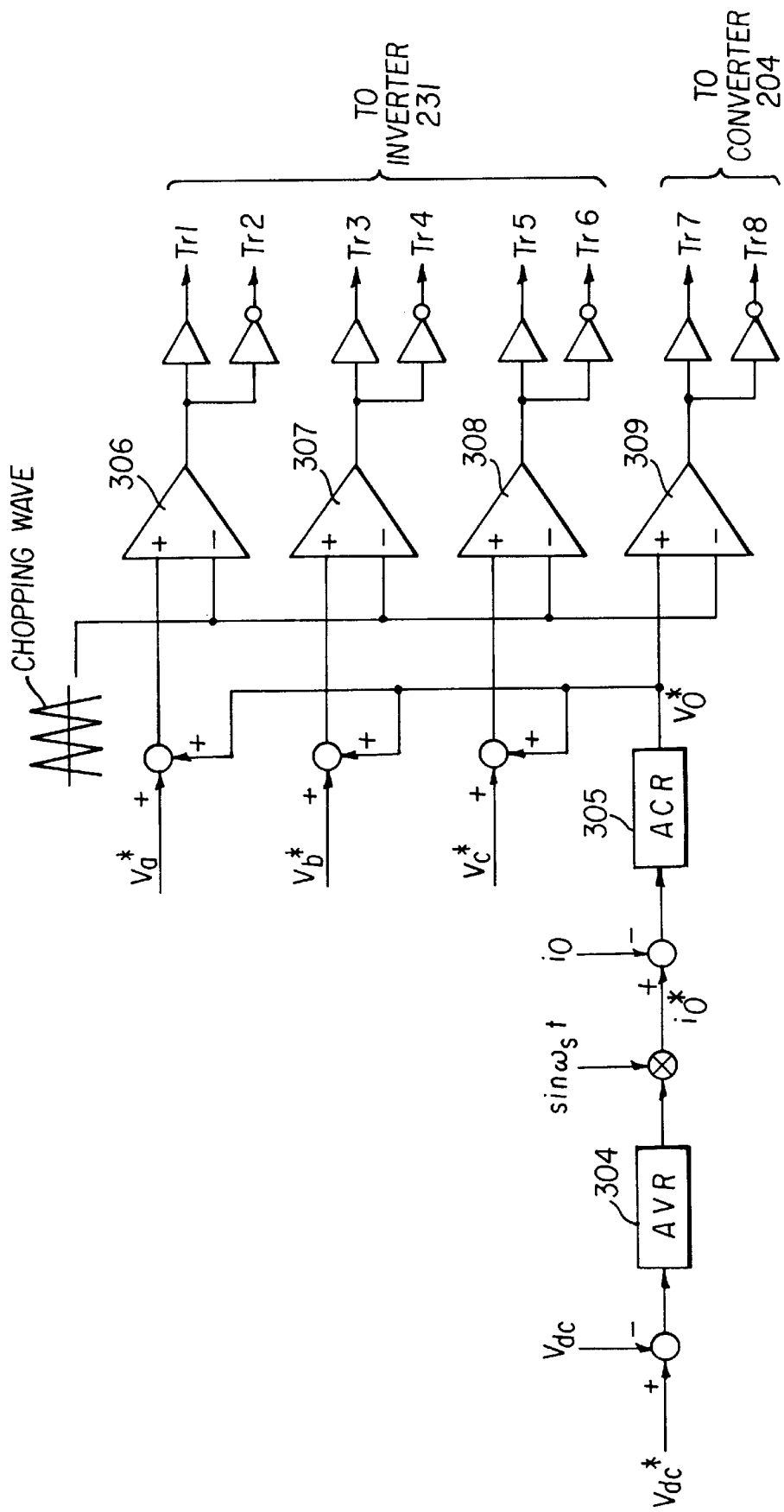
FIG. 6 is a circuit diagram showing a control circuit of the second embodiment of the invention.

FIG. 6 shows another example of control circuit for the power conversion apparatus of FIG. 2. While PWM pulses are obtained from the current commands $i_a^*$, $i_b^*$, $i_c^*$ for the motor 501 in the above example of FIG. 5, PWM pulses may be obtained from voltage commands $v_a^*$, $v_b^*$, $v_c^*$ to be applied to the motor 501 as shown in FIG. 6.

In this case, a difference between a zero-phase-sequence current command $i_0^*$ and a zero-phase-sequence current $i_0$ obtained from current of each phase is input to a current controller 305, so as to obtain a zero-phase-sequence voltage command $v_0^*$, and this command is added to each of voltage commands $v_a^*$, $v_b^*$, $v_c^*$. The results thus obtained are compared by comparators 306–308 with a chopping wave, so as to obtain PWM patterns for driving the switching elements Tr1–Tr6 of the inverter 231.

With regard to the converter 204, the zero-phase-sequence voltage $v_0^*$ is compared by a comparator 309 with a chopping wave, thereby to obtain PWM patterns for driving the switching elements Tr7, Tr8 of the converter 204.

Figure 7:
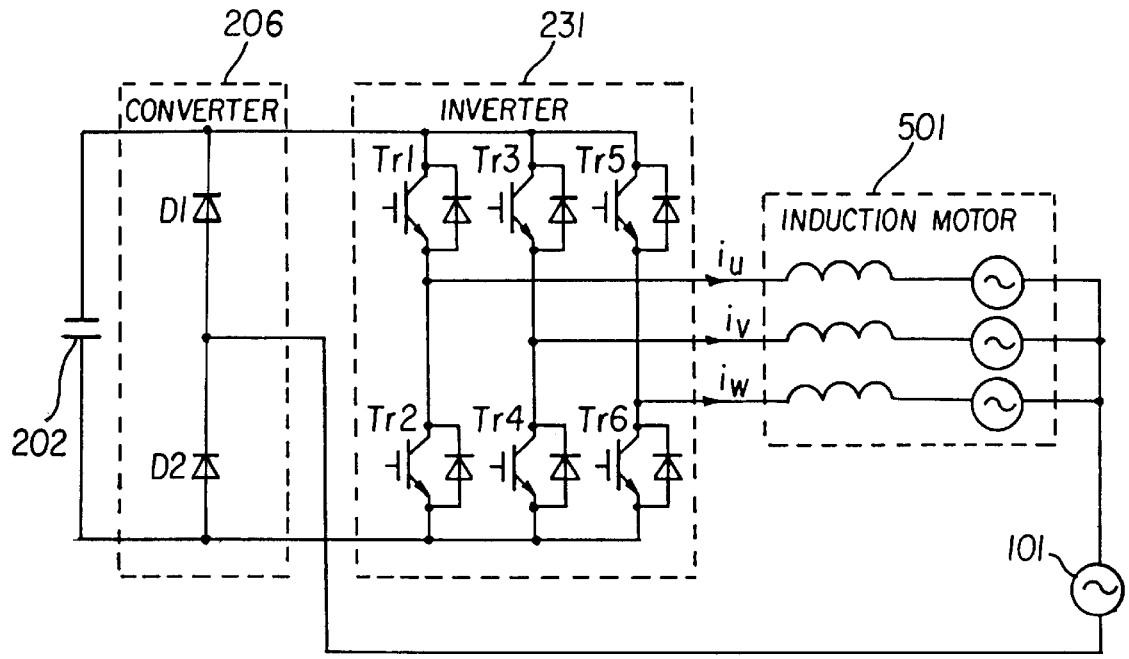
FIG. 7 is a circuit diagram showing the third embodiment of the present invention.

FIG. 7 is a circuit diagram showing a power conversion apparatus constructed according to the third embodiment of the present invention.

In FIG. 7, a converter 206 consists of a series circuit of two diodes D1, D2, and its middle point is connected to one terminal of the single-phase ac power supply 101. The other components of the apparatus of this embodiment are similar to those of the second embodiment of FIG. 2.

With the above arrangement, the structure of the converter 206 can be more simplified than that of FIG. 2, though it becomes impossible to regenerate electric power from the motor 501 into the single-phase ac power supply 101.

The power conversion apparatus of the present embodiment operates in substantially the same manner as that of the second embodiment of FIG. 2. Namely, this apparatus operates as a combination of the three-phase voltage type inverter of FIG. 3 and a hybrid bridge type single-phase converter consisting of one pair of arm of the inverter, and the converter 206 of FIG. 7, wherein the former component uses positive-phase-sequence current to control voltage between lines of the inverter and current flowing between the lines, and the latter component uses zero-phase-sequence current to control input current of the single-phase ac power supply 101.

Figure 8:
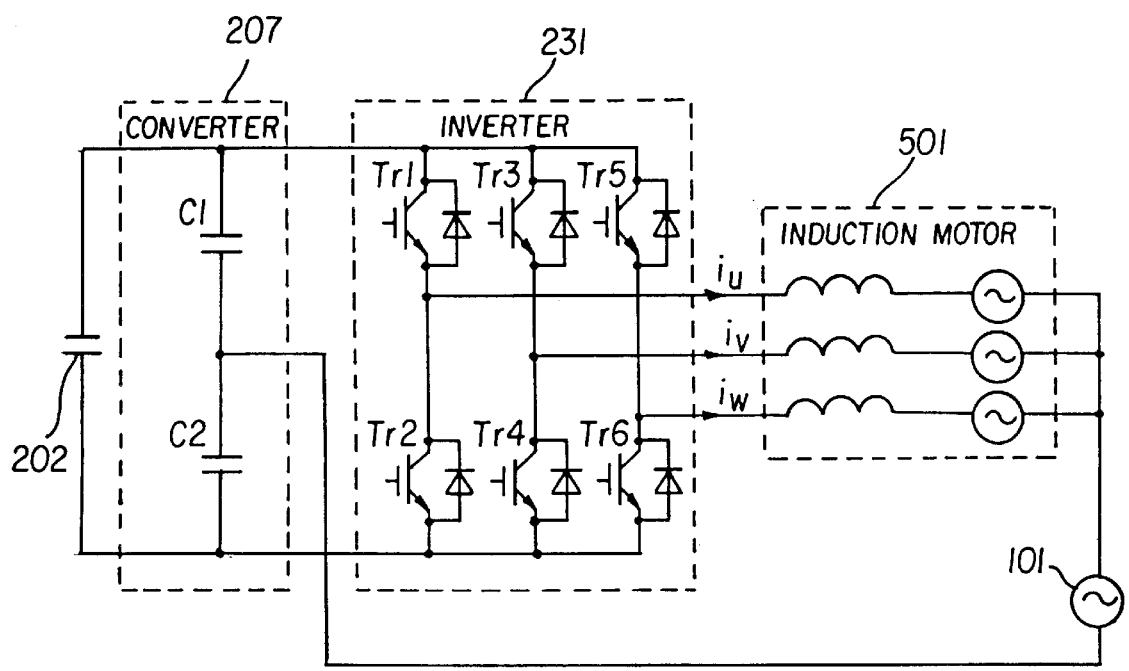
FIG. 8 is a circuit diagram showing the fourth embodiment of the invention.

FIG. 8 is a circuit diagram showing the fourth embodiment of the present invention.

In FIG. 8, a converter 207 consists of a series circuit of two capacitors C1, C2 as passive elements, and its middle point is connected to one terminal of the single-phase ac power supply 101.

With this arrangement, the structure of the converter 207 may be even more simplified than that of the third embodiment of FIG. 7, and it is possible to regenerate electric power from the motor 501 to the single-phase ac power supply 101. However, the maximum output voltage becomes equal to a difference between one-half of the dc voltage of the smoothing capacitor 202, and the maximum value of the ac power supply voltage.

The power conversion apparatus of the present embodiment operates as a combination of the three-phase voltage type inverter of FIG. 3, and a half-bridge type single-phase converter provided by one pair of arm of the inverter.

Although not illustrated in the figures, the above-described embodiments of FIG. 2, FIG. 7 and FIG. 8 may be modified such that a reactor is connected between the neutral point of the motor 501 and the single-phase ac power supply 101, with a stator core of the motor 501 used as a core of the reactor.

Figure 9:
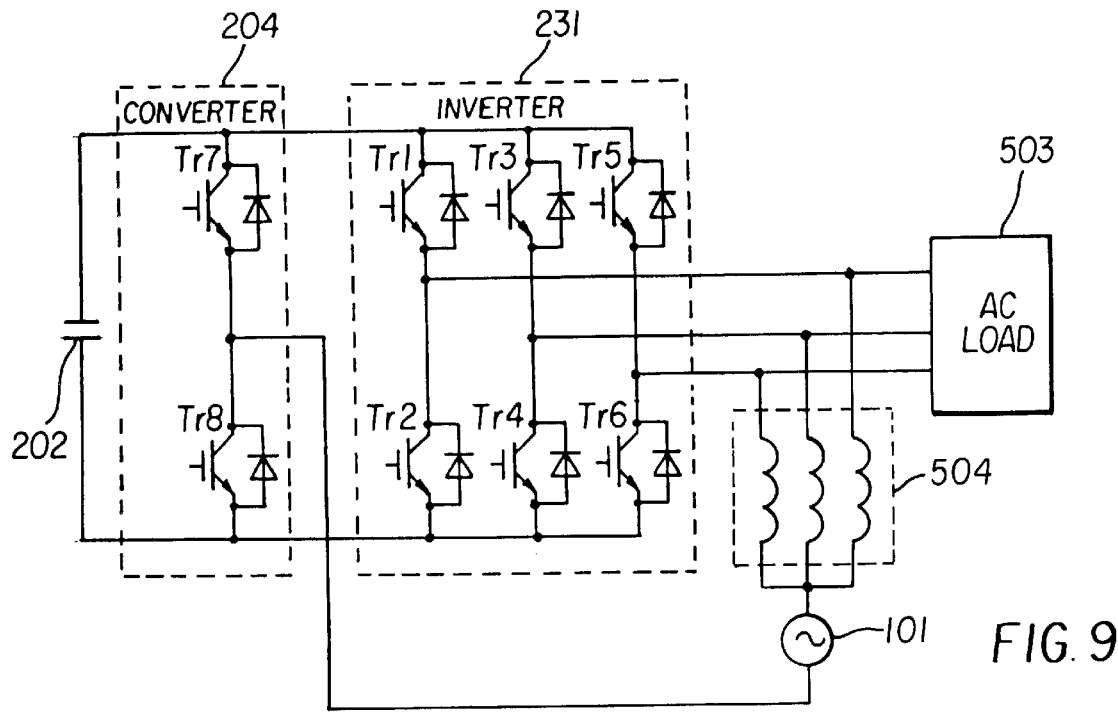
FIG. 9 is a circuit diagram showing the fifth embodiment of the invention.

FIG. 9 is a circuit diagram showing a power conversion apparatus constructed according to the fifth embodiment of the present invention.

The circuit of FIG. 9 is designed on the basis of the embodiment of FIG. 2, but is different from that of FIG. 2 in that a reactor 504 is star-connected to output terminals of respective phases of the three-phase voltage type inverter 231, and the neutral point of this reactor 504, instead of the neutral point of the motor 501 of FIG. 2, is connected to one terminal of the single-phase ac power supply 101.

The present embodiment may employ an ac load 503 that does not have a neutral point, and a part of the structure of the inverter is able to serve as a converter as in the embodiment of FIG. 2, without causing zero-phase-sequence current to flow through the ac load 503. The operation of the apparatus as a whole and the method of controlling the inverter 231 and converter 204 are substantially the same as those of the embodiment of FIG. 2.

This embodiment may be applied to a structure obtained by removing the motor 501 from each of the embodiments of FIG. 7 and FIG. 8.

Figure 10:
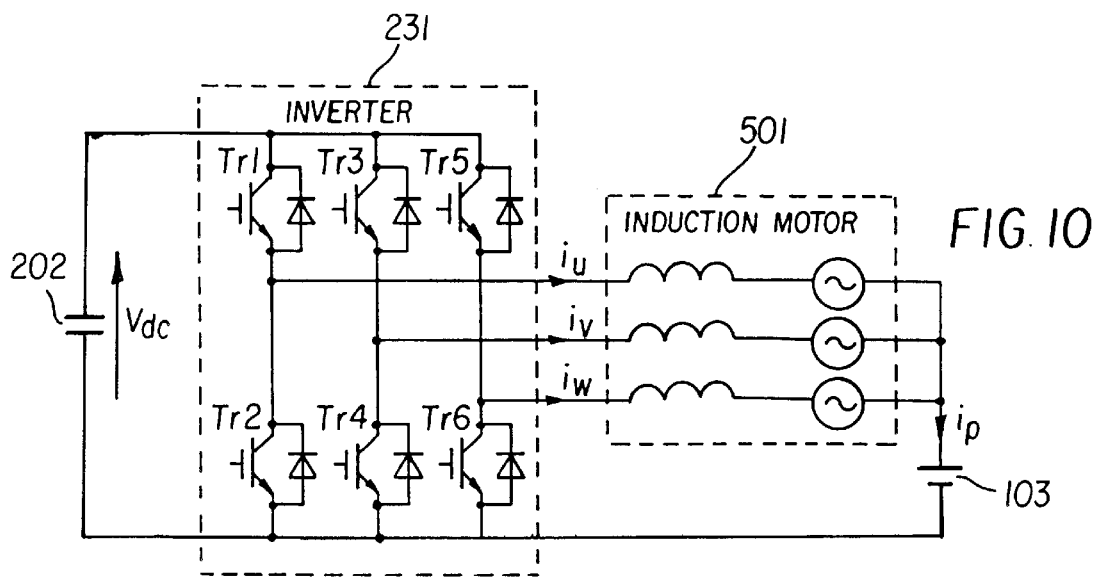
FIG. 10 is a circuit diagram showing the sixth embodiment of the invention.

FIG. 10 is a circuit diagram showing a power conversion apparatus constructed according to the sixth embodiment of the present embodiment.

In the apparatus of FIG. 10, the neutral point of the induction motor 501 is connected to the positive terminal of a dc power supply 103, and the negative terminal of this power supply 103 is connected to a connection point or node between the lower arms of the three-phase voltage type inverter 231 and the smoothing capacitor 202. With this connecting arrangement, the dc power supply voltage becomes equal to zero-phase-sequence voltage when viewed from the ac output terminal of the inverter 231.

The equivalent circuit of this embodiment for the positive-phase-sequence component is identical with that of FIG. 3 as explained above, and operates to drive the motor 501 in the same manner as the known three-phase voltage type inverter.

Figure 11:
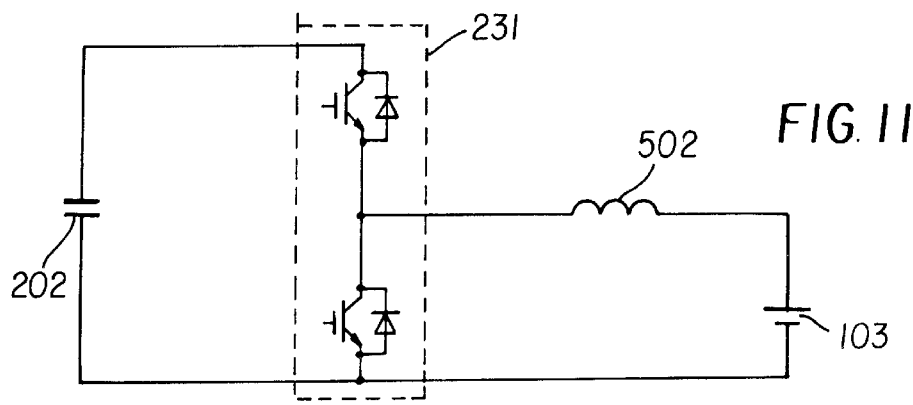
FIG. 11 is a circuit diagram showing an equivalent circuit for a zero-phase-sequence component of the embodiment of FIG. 10.
Figure 47:
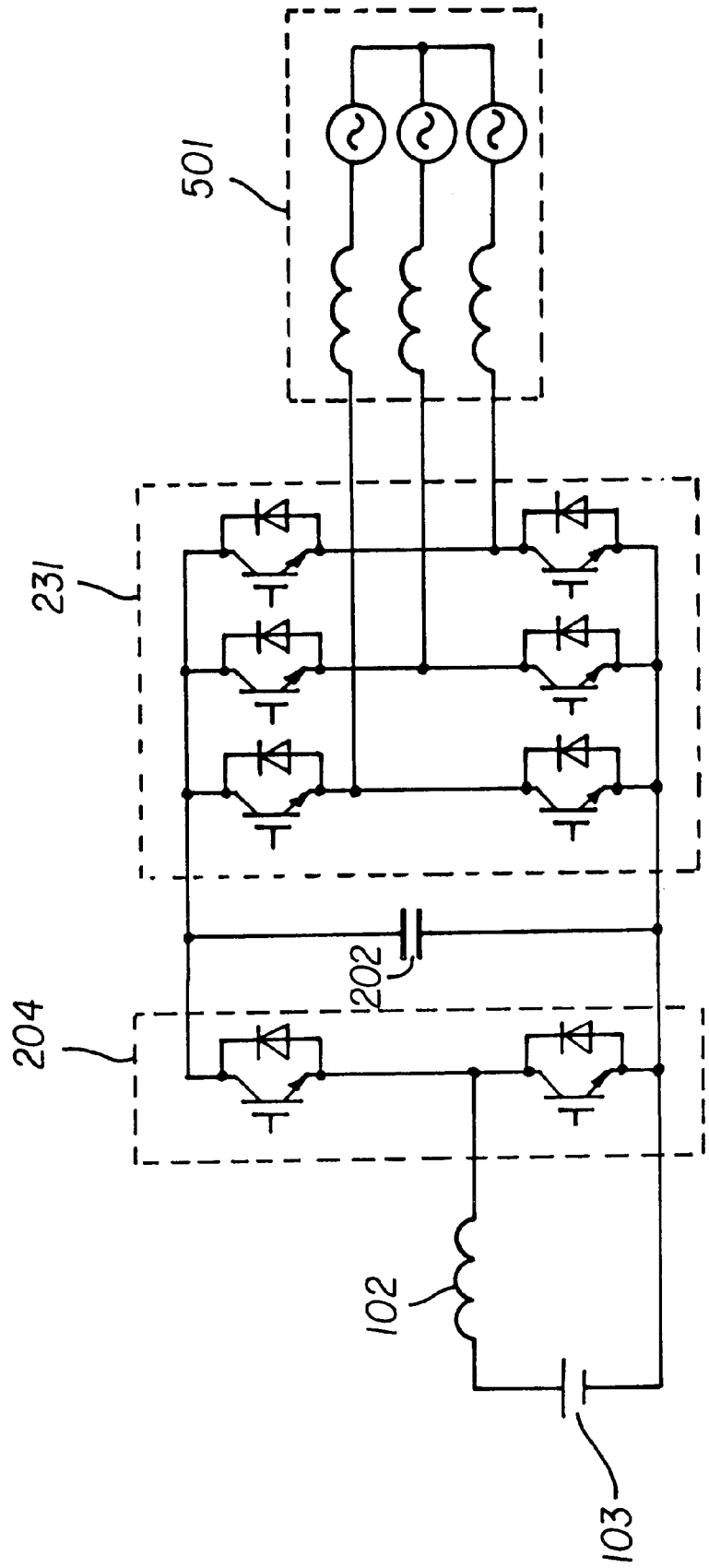
FIG. 47 is a circuit diagram showing a known circuit.

The equivalent circuit of the present embodiment for the zero-phase-sequence component is constructed as shown in FIG. 11. Namely, three pairs of arms of the three-phase voltage type inverter 231 is regarded as one pair of arms 231' which performs switching operation at the ratio of a zero-voltage vector, and performs the function of the converter (two-quadrant chopper) 204 as shown in FIG. 47. Thus, the converter 204 may be substituted or replaced by the arrangement in which the zero-phase-sequence voltage is controlled by the inverter 231 of FIG. 10. Further, the motor 501 can be considered as a reactor 502 having a certain value of leakage inductance.

In the circuit of FIG. 10 as described above, zero-phase-sequence power is transmitted between the dc power supply 103 and the capacitor 202, through the operation of the circuit of FIG. 11.

Thus, the circuit as shown in FIG. 10 is able to realize a single-phase/polyphase power converting circuit that is similar to the known circuit shown in FIG. 47. Since the number of semiconductor switching elements, diodes and other components is reduced, and the input-side reactor is eliminated, the circuit configuration can be simplified, and the overall size and cost of the power converting apparatus can be reduced.

The motor which provides an ac load may be other type of polyphase ac motor than the three-phase induction motor as used in this embodiment.

Figure 12:
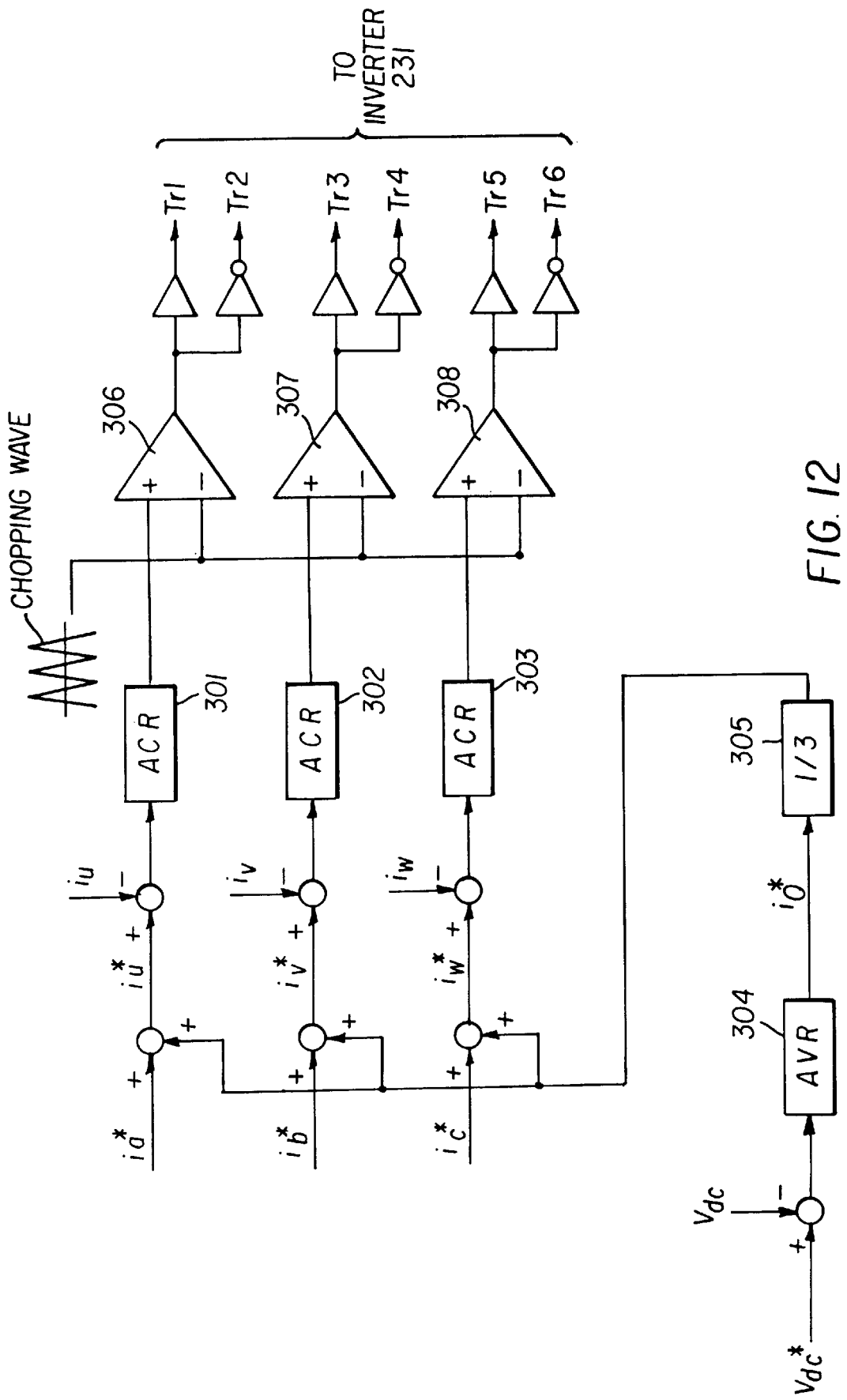
FIG. 12 is a circuit diagram showing a control circuit of the embodiment of FIG. 10.

FIG. 12 is a circuit diagram showing a control circuit for obtaining PWM pulses to be applied to the inverter 231 of the embodiment of FIG. 10.

In FIG. 12, a difference between a dc voltage command $V_{dc}*$ and a dc voltage detected value $V_{dc}$ is input to a voltage controller 304, which in turn generate a zero-phase-sequence (input) current command $i_0*$. The arrangement of the other portion of this control circuit is similar to that of the control circuit of FIG. 5 except a portion of the circuit of FIG. 5 for obtaining PWM pulses to be applied to the converter 204. The PWM pulses finally obtained from the circuit of FIG. 12 are applied to the switching elements Tr1–Tr6 of the inverter 231 of FIG. 10.

By using the control circuit as described above, the apparatus of FIG. 10 operates as a combination of the three-phase voltage type inverter of FIG. 3 and the two-quadrant chopper of FIG. 11, wherein the former component uses positive-phase-sequence current to control line voltage and current flowing between lines, and the latter component uses zero-phase-sequence current to control dc voltage.

Figure 13:
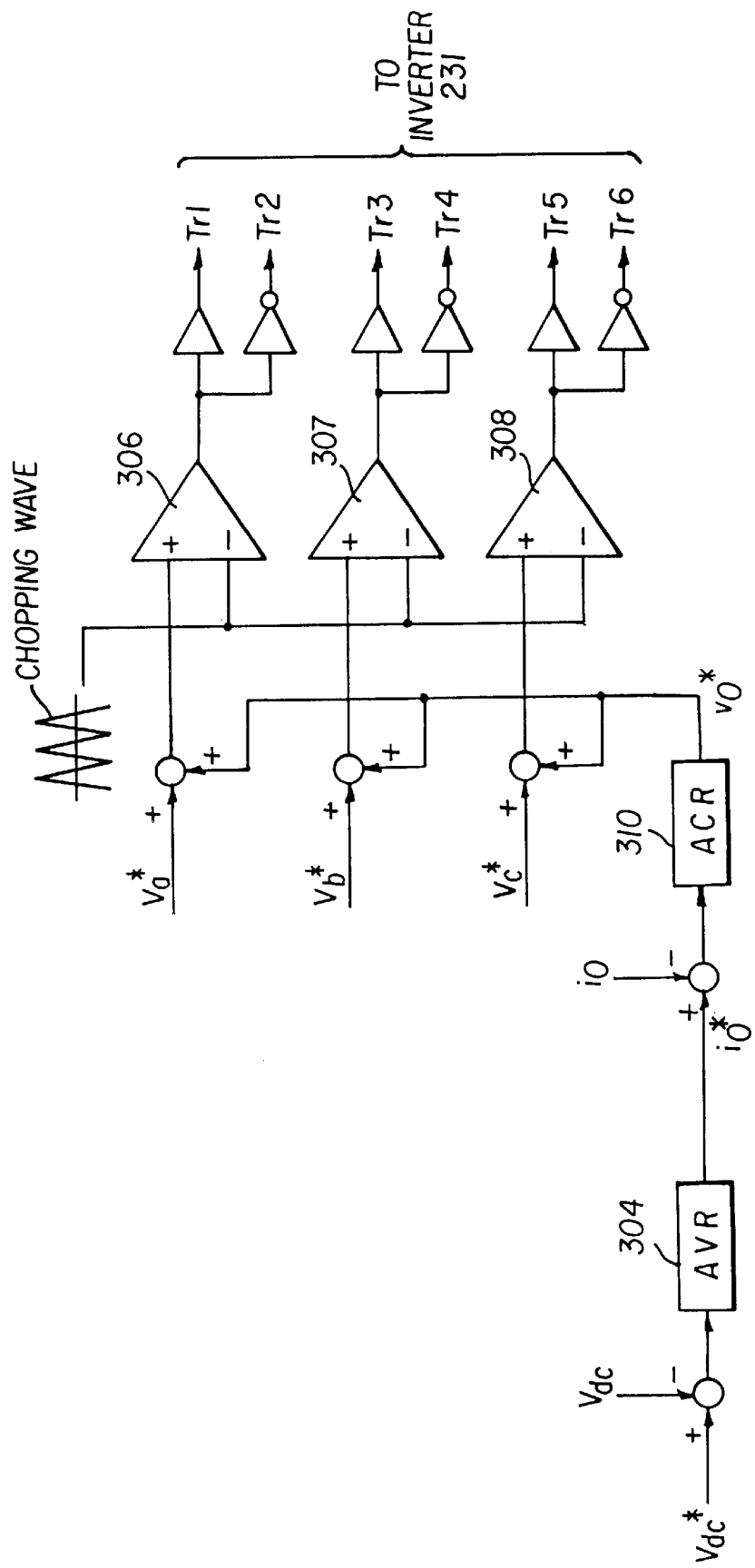
FIG. 13 is a circuit diagram showing a control circuit of the embodiment of FIG. 10.

FIG. 13 shows another example of control circuit, in which PWM pulses are obtained from voltage commands $v_a*, v_b*, v_c*$ to be applied to the motor 501, as in the control circuit of FIG. 6.

Figure 14:
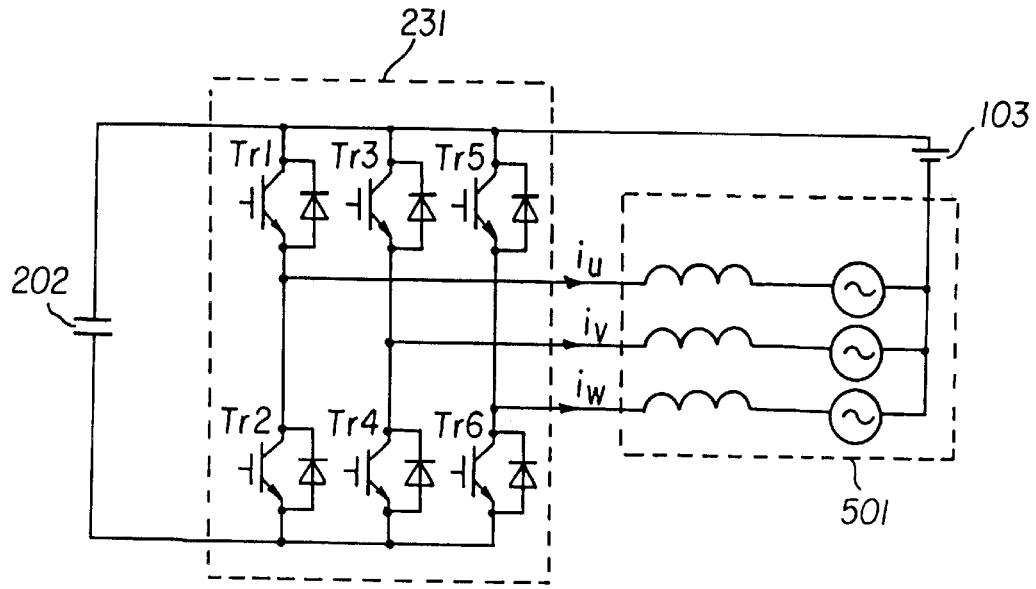
FIG. 14 is a circuit diagram showing the seventh embodiment of the present invention.

FIG. 14 is a circuit diagram showing a power conversion apparatus constructed according to the seventh embodiment of the present invention.

In the circuit of FIG. 14, the neutral point of the motor 501 is connected to the negative electrode of the dc power supply 103, and the positive electrode of this power supply 103 is connected to a connection point between the upper arms of the three-phase voltage type inverter 231 and the smoothing capacitor 202.

The apparatus of this embodiment operates as a combination of the three-phase voltage type inverter and the two-quadrant chopper, in a similar manner to the embodiment of FIG. 10.

Figure 15:
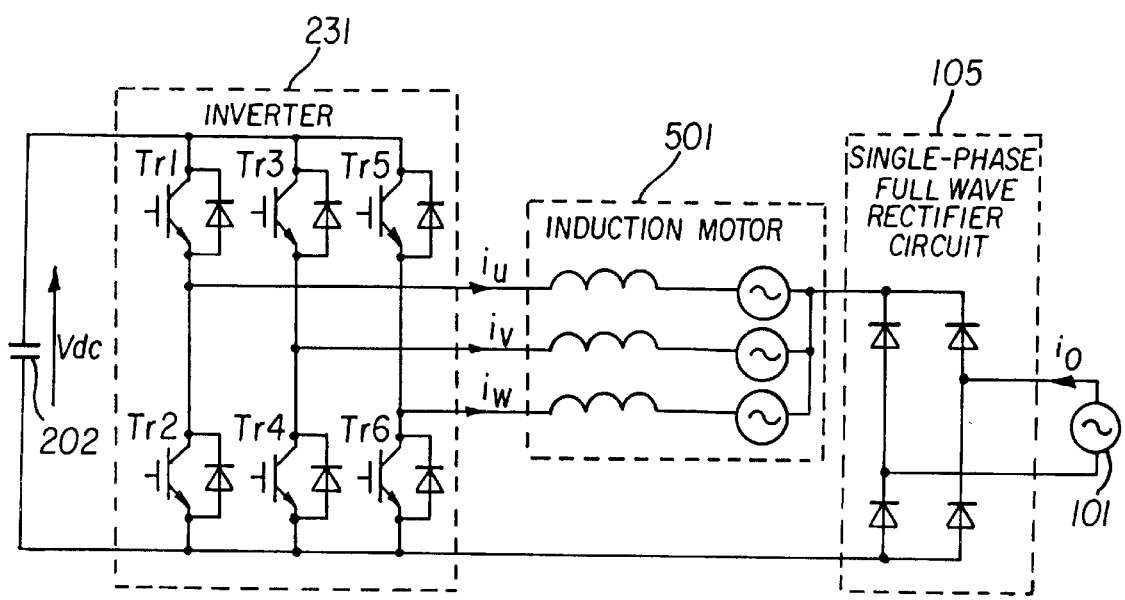
FIG. 15 is a circuit diagram showing the eighth embodiment of the invention.

FIG. 15 is a circuit diagram showing a power conversion apparatus constructed according to the eighth embodiment of the present invention.

In the circuit of FIG. 15, a combination of a single-phase ac power supply 101 and a single-phase full-wave rectifier circuit 105 in the form of a diode bridge is used in place of the dc power supply 103 used in the sixth embodiment of FIG. 10. This power supply structure may be applied to the seventh embodiment of FIG. 14.

Figure 16:
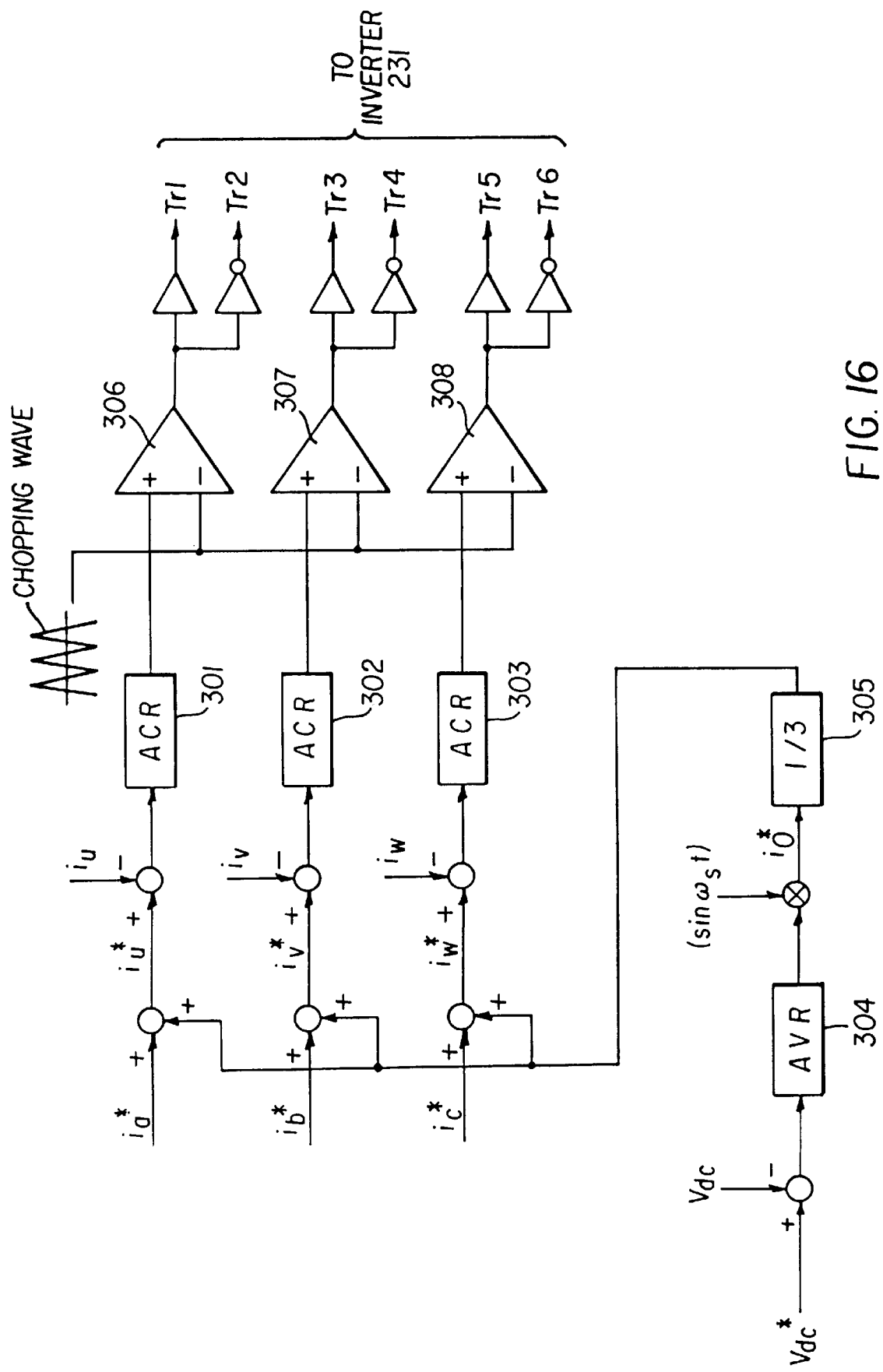
FIG. 16 is a circuit diagram showing a control circuit of the embodiment of FIG. 15.

A control circuit for controlling the apparatus of FIG. 15 is configured as shown in FIG. 16. Specifically, the input current is shaped into a sinusoidal waveform, by multiplying the output of the voltage controller 304 by an absolute value

|sin ω_s t| of a sinusoidal wave sin ω_s t that is in phase with the power supply voltage and has a magnitude of 1, thereby to obtain a zero-phase-sequence (input) current command $i_0^*$. The arrangement of the ether portion of the circuit is identical with that of the control circuit of FIG. 12. The control circuit of FIG. 16 is able to control the dc voltage to a certain level, while maintaining the sinusoidal waveform of the input current.

The apparatus of FIG. 15 operates as a combination of the three-phase voltage type inverter and a single-phase/single-switch type sinusoidal current converter.

Figure 17:
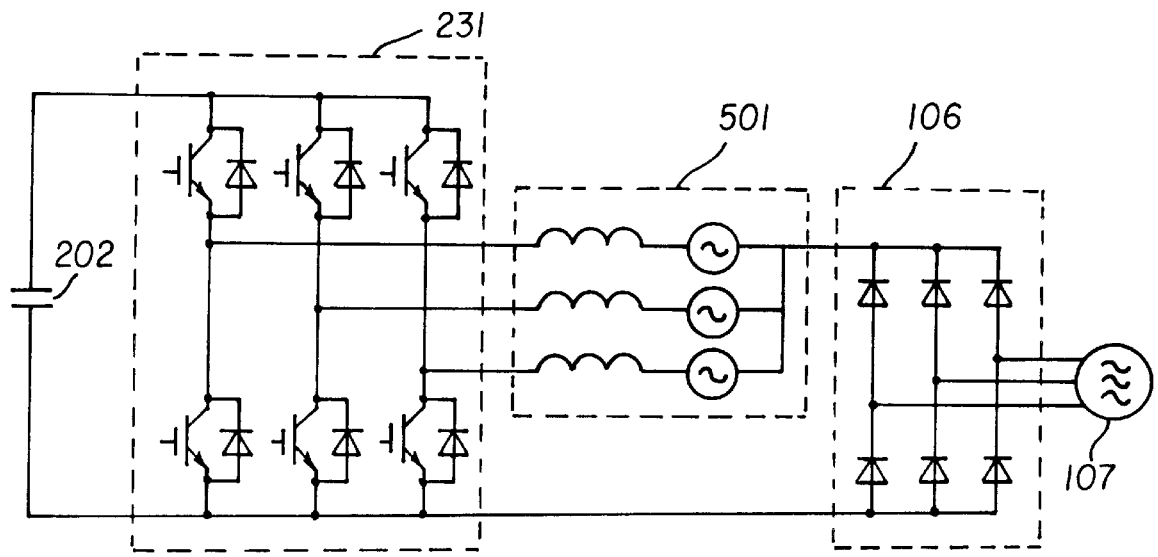
FIG. 17 is a circuit diagram showing the ninth embodiment of the invention.

FIG. 17 is a circuit diagram showing a power conversion apparatus constructed according to the ninth embodiment of the present invention.

In the present embodiment, a combination of a three-phase ac power supply 107 and a three-phase full-wave rectifier circuit 106 provided by a diode bridge is used in place of the dc power supply 103 used in the embodiment of FIG. 10. This power supply structure may also be applied to the embodiment of FIG. 14.

In this case, a control circuit similar to that of FIG. 13 as described above is used for providing input current having a high power factor. Namely, the zero-phase-sequence current $i_0$ is controlled to a certain fixed value, so that the current waveform of the three-phase ac power supply 107 assumes the shape of a square wave with an electrical angle of 120° conduction. Accordingly, the power factor can be improved as compared with the case where the single-phase ac power supply is used, and the maximum value of the input current can be advantageously reduced.

Although not illustrated in the figures, the above-described embodiments of FIG. 10, FIG. 14, FIG. 15, and FIG. 17 may be modified such that a reactor is connected between the neutral point of the motor 501 and the dc power supply (including the combination of ac power supply and rectifier circuit), with a stator core of the motor 501 used as a core of the reactor.

Figure 18:
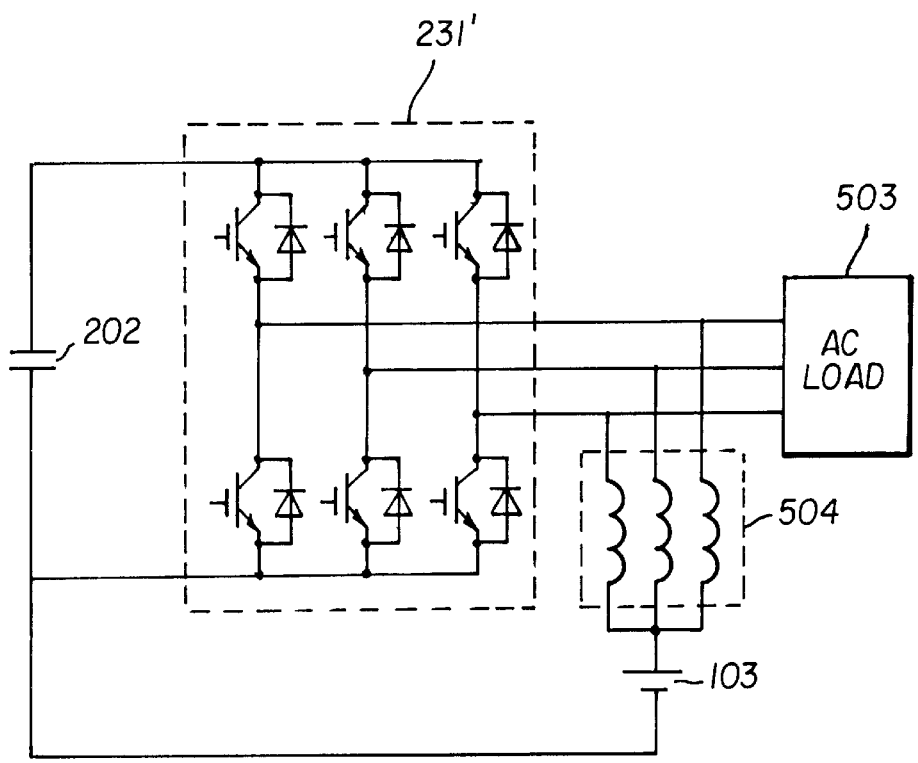
FIG. 18 is a circuit diagram showing the tenth embodiment of the invention.

FIG. 18 is a circuit diagram showing a power conversion apparatus constructed according to the tenth embodiment of the present invention.

The circuit of FIG. 18 is designed on the basis of the embodiment of FIG. 10, but is different from that of FIG. 10 in that a reactor 504 is star-connected to output terminals of respective phases of the three-phase voltage type inverter 231, and the neutral point of this reactor 504, rather than the neutral point of the motor 501 of FIG. 10, is connected to the positive terminal of the dc power supply 103.

The present embodiment may employ an ac load 503 that does not have a neutral point, and a part of the structure of the inverter 231 is able to perform the function of a two-quadrant chopper, without causing zero-phase-sequence current to flow through the ac load 503.

This embodiment may be applied to a structure obtained by removing the motor 501 from each of the embodiments of FIG. 14, FIG. 15 and FIG. 17.

Figure 19:
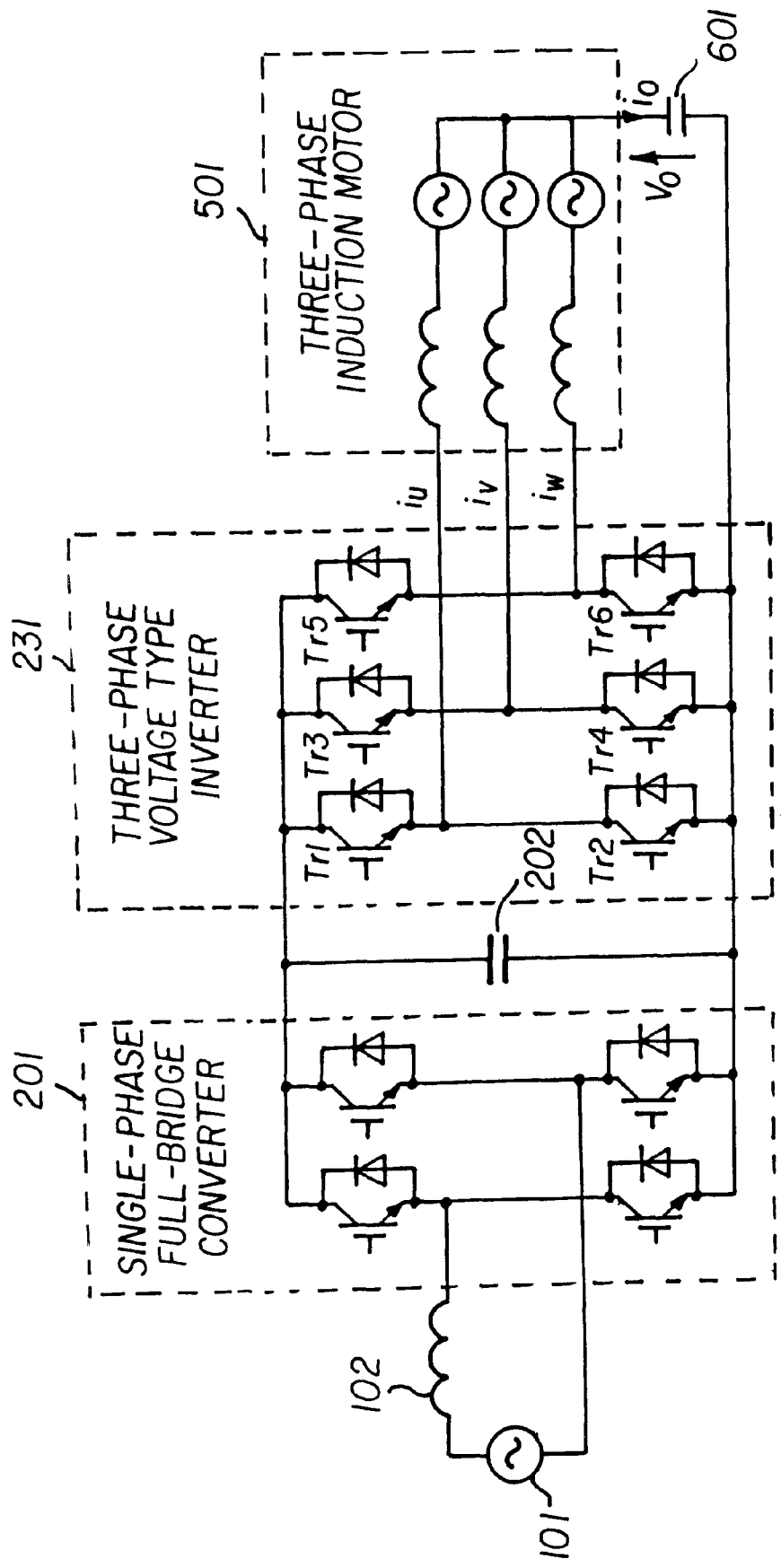
FIG. 19 is a circuit diagram showing the eleventh embodiment of the invention.

FIG. 19 is a circuit diagram showing a power conversion apparatus constructed according to the eleventh embodiment of the present invention.

The power converter of FIG. 19 includes a single-phase ac power supply 101, converter 201 in the form of a single-phase full bridge constituted by self-commutated semiconductor switching elements, such as IGBT, and diodes that are reversely connected in parallel with the respective switching elements, three-phase voltage type inverter 231 consisting of similar self-commutated semiconductor switching elements Tr1–Tr6, and diodes that are reversely connected in parallel with the respective switching elements Tr1–Tr6, smoothing capacitor 202 provided in a dc intermediate circuit, and a three-phase induction motor 501. In FIG. 19, reference numeral 102 denotes a reactor for absorbing ripple arising upon switching of the converter 201.

In the present embodiment, attention is given to a zero-voltage vector of the three-phase voltage type inverter 231. Namely, the three-phase voltage type inverter 231 is able to produce a zero-voltage vector, by selecting one of two switching patterns, i.e., a switching pattern in which all of the upper arms are conducted together, and a switching pattern in which all of the lower arms are conducted together. This embodiment utilizes this degree of freedom in selecting the switching pattern.

The zero-phase-sequence voltage generated by the inverter 231 does not appear as voltage between lines of the inverter 231, and therefore has no influence on driving of the motor. An equivalent circuit of its positive-phase-sequence component is constructed as shown in FIG. 20, wherein the inverter 231 operates in the same manner as a known counterpart in terms of driving of the motor 501, and supplies and receives ac power to and from the motor 501, by controlling line voltage of the inverter 231 and current flowing between the lines of the inverter 231.

Figure 20:
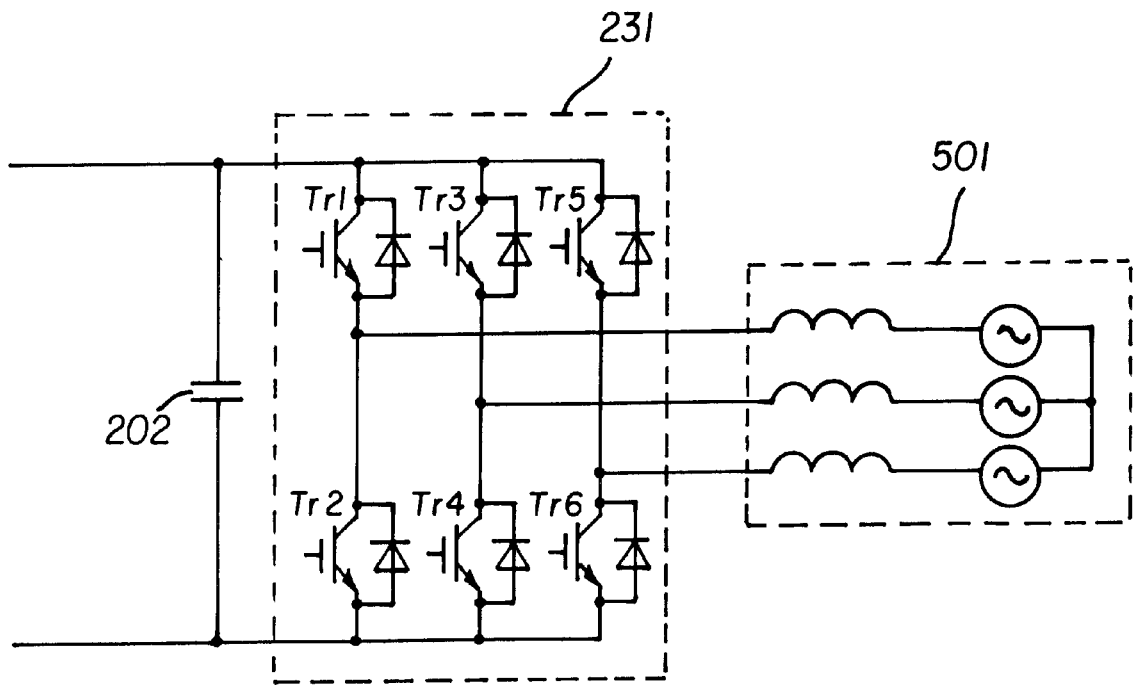
FIG. 20 is a circuit diagram showing an equivalent circuit of a positive-phase-sequence component of an output portion of the embodiment of FIG. 19.
Figure 21:
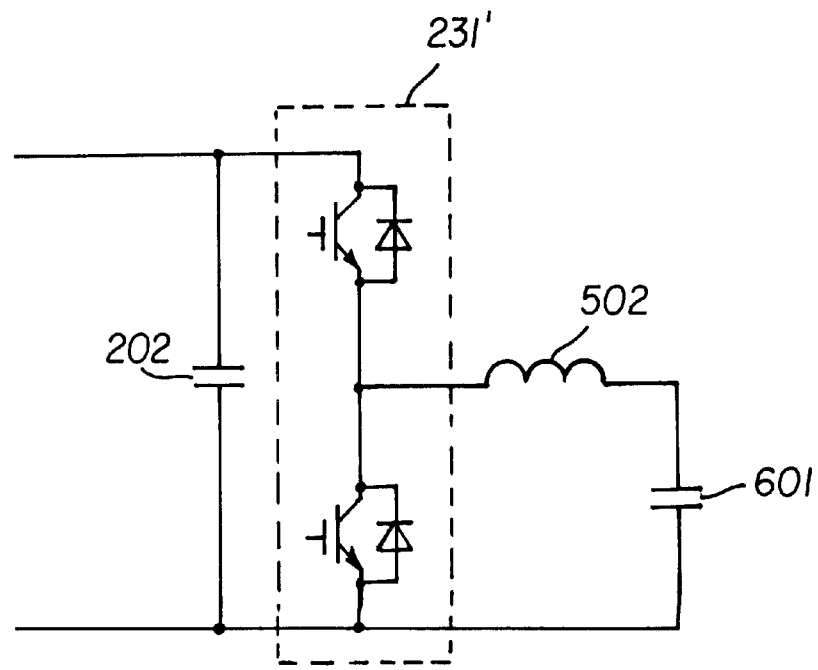
FIG. 21 is a circuit diagram showing an equivalent circuit of a zero-phase-sequence component of an output portion of the embodiment of FIG. 19.

On the other hand, an equivalent circuit of the zero-phase-sequence component is constructed as shown in FIG. 21, wherein three pairs of arms of the inverter 231 as seen in FIG. 20 is regarded as one pair of arms 231' which performs switching operations at the ratio of the zero-voltage vectors. The motor 501 can be considered as a reactor 502 having a certain value of leakage inductance.

The voltage of the capacitor 601 for absorbing power ripple, when viewed from the ac output side of the inverter 231, becomes equal to zero-phase-sequence voltage. With the zero-phase-sequence voltage transmitted between the inverter 231 and the capacitor 601 through the motor 501 (reactor 502), this circuit is able to perform the same function as one pair of arms (two-quadrant chopper 401), reactor 403 and the capacitor 404 added to the known arrangement of FIG. 49. Thus, the capacitance of the smoothing capacitor 202 can be reduced, without using an additional arm.

Figure 49:
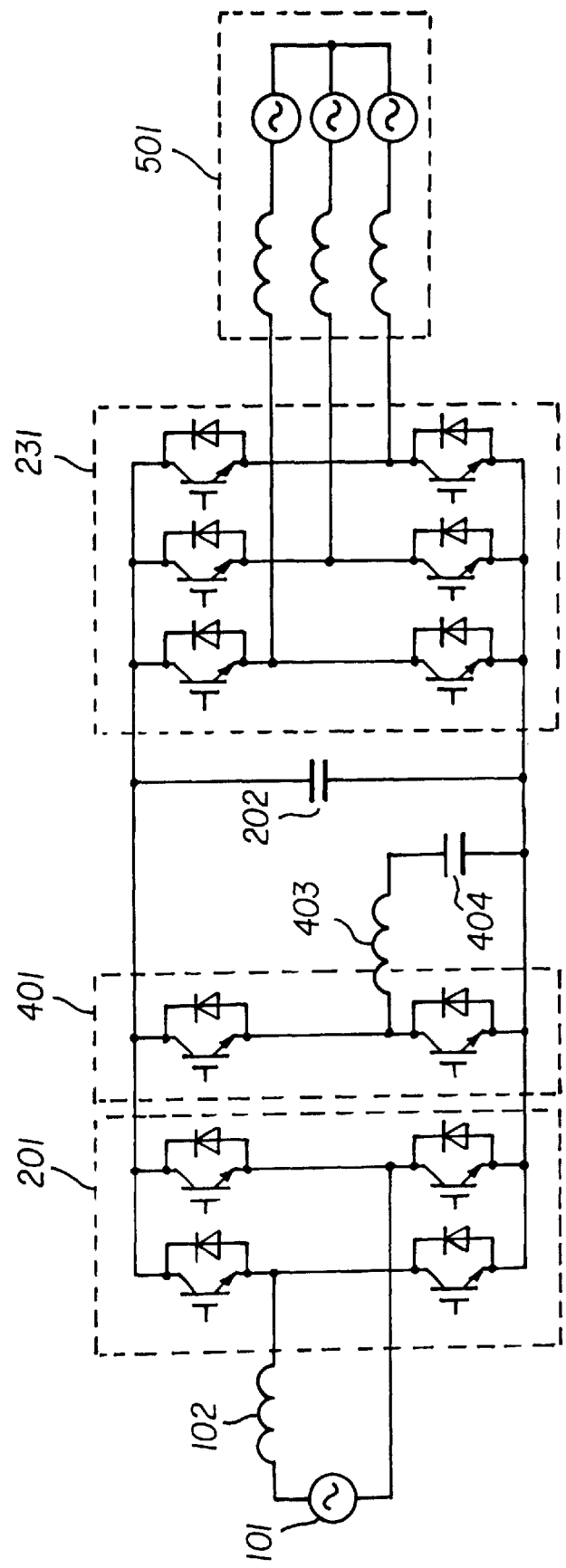
FIG. 49 is a circuit diagram showing a known circuit.

Thus, the circuit shown in FIG. 19, in which the zero-phase-sequence power is transmitted between the inverter 231 and the capacitor 601, is able to realize a single-phase/polyphase power converting circuit that is substantially equivalent to that of the known circuit of FIG. 49. Since the additional arm and reactor as used in the known circuit need not be provided, the circuit configuration can be simplified, and the size and cost of the power converting apparatus can be reduced.

The ac motor which provides an ac load may be a polyphase ac motor of other type than the three-phase induction motor as used in the above embodiment.

The single-phase full bridge converter 201 of FIG. 19 operates so that the input current signal is shaped into a sinusoidal waveform in a conventional manner.

Figure 22:
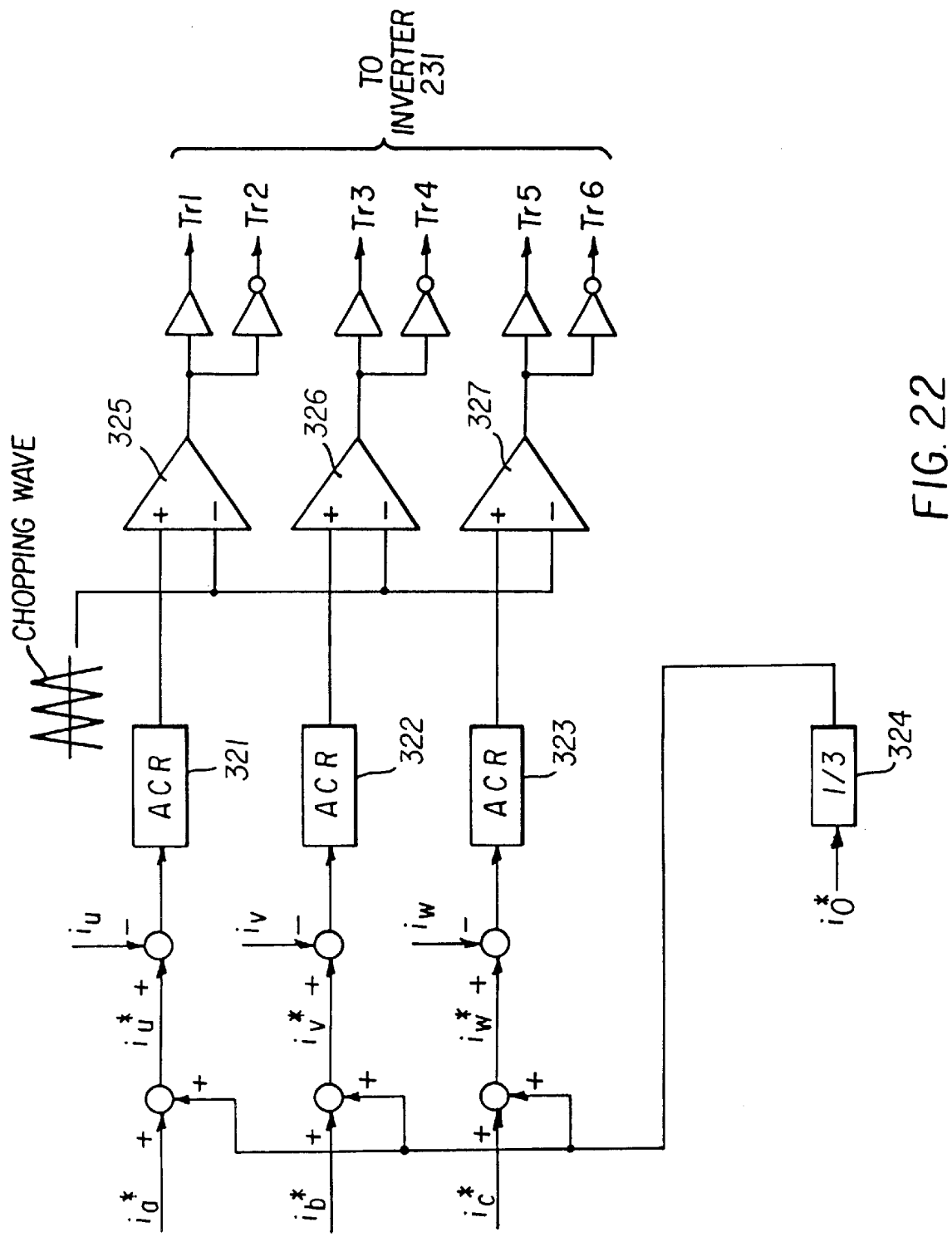
FIG. 22 is a circuit diagram showing a control circuit of the embodiment of FIG. 19.

The three-phase voltage type inverter 231 is controlled by PWM pulses, which are produced, for example, by a control circuit as shown in FIG. 22.

The method for producing a command for the current flowing through the capacitor 601 for absorbing power ripple, namely, zero-phase-sequence current command $i_0^*$, can be easily derived from the paper titled "715 Reduction in the Capacitance of Capacitor of Single-phase PWM Converter Having DC Active Filter Function" printed in 1996 National Convention Record I.E.E. Japan.

After a multiplier 324 multiplies this zero-phase-sequence current command $i_0{}^*$ by ⅓, the result is added to current commands $i_a{}^*$, $i_b{}^*$, $i_c{}^*$ for driving the motor 501, so as to produce current commands $i_u{}^*$, $i_v{}^*$, $i_w{}^*$ for respective phases. Then, differences between these current commands $i_u{}^*$, $i_v{}^*$, $i_w{}^*$ and actual current detected values $i_u$, $i_v$, $i_w$ for respective phases are calculated, and the results are input to respective current controllers 321–323. Then, comparators 325–327 compare respective outputs of these controllers 321–323 with a chopping wave, so as to obtain PWM patterns for driving the switching elements Tr1–Tr6 of the inverter 231 so that the currents of respective phases follow the corresponding commands $i_u{}^*$, $i_v{}^*$, and $i_w{}^*$.

In the present embodiment, the inverter 231 is controlled by PWM pulses in a time-sharing manner, so as to operate as a combination of the three-phase voltage type inverter of the known circuit shown in FIG. 49 and the two-quadrant chopper, wherein the former component uses positive-phase-sequence current to control line voltage and current flowing between lines, and the latter component uses zero-phase-sequence current to control the input current of the capacitor 601.

Figure 23:
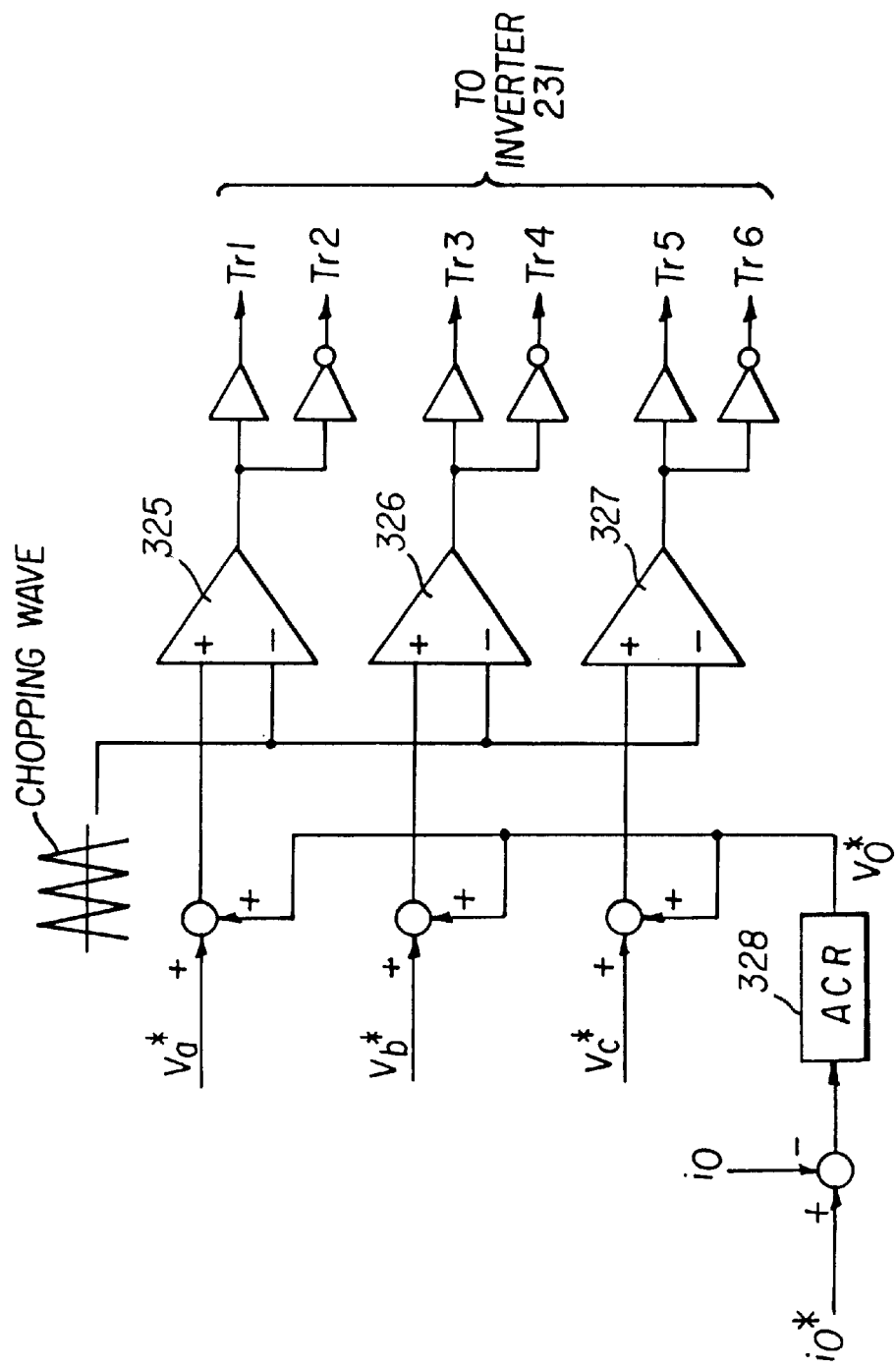
FIG. 23 is a circuit diagram showing a control circuit of the embodiment of FIG. 19.

FIG. 23 shows another example of control circuit. While PWM pulses are obtained from the current commands $i_a{}^*$, $i_b{}^*$, $i_c{}^*$ of the motor 501 in the above example of FIG. 22, PWM pulses may be obtained from voltage commands $v_a{}^*$, $v_b{}^*$, $v_c{}^*$ to be applied to the motor 501 as shown in FIG. 23.

In this case, a difference between a zero-phase-sequence current command $i_0{}^*$ and a zero-phase-sequence current $i_0$ obtained from the current of each phase is input to the current controller 328, so as to obtain a zero-phase-sequence voltage command $v_0{}^*$, and this voltage command is added to each of voltage commands $v_a{}^*$, $v_b{}^*$, $v_c{}^*$. Comparators 325–327 compare the respective results of addition with a chopping wave, so as to obtain PWM patterns for driving the switching elements Tr1–Tr6 of the inverter 231.

In the present embodiment of FIG. 19, ripple that arises in the input current of the capacitor 601 upon switching of the inverter 231 is smoothed by leakage inductance of the motor 501 (reactor 502 in FIG. 21). If it is not sufficient, a reactor using a stator core of the motor 501 may be further connected between the neutral point of stator windings of the motor 501 and the capacitor 601.

In the embodiment as described above, the capacitor 601 for absorbing power ripple may be connected between the neutral point of the motor 501 and the connection point between the upper arms of the inverter 231 and the smoothing capacitor 202.

Figure 24:
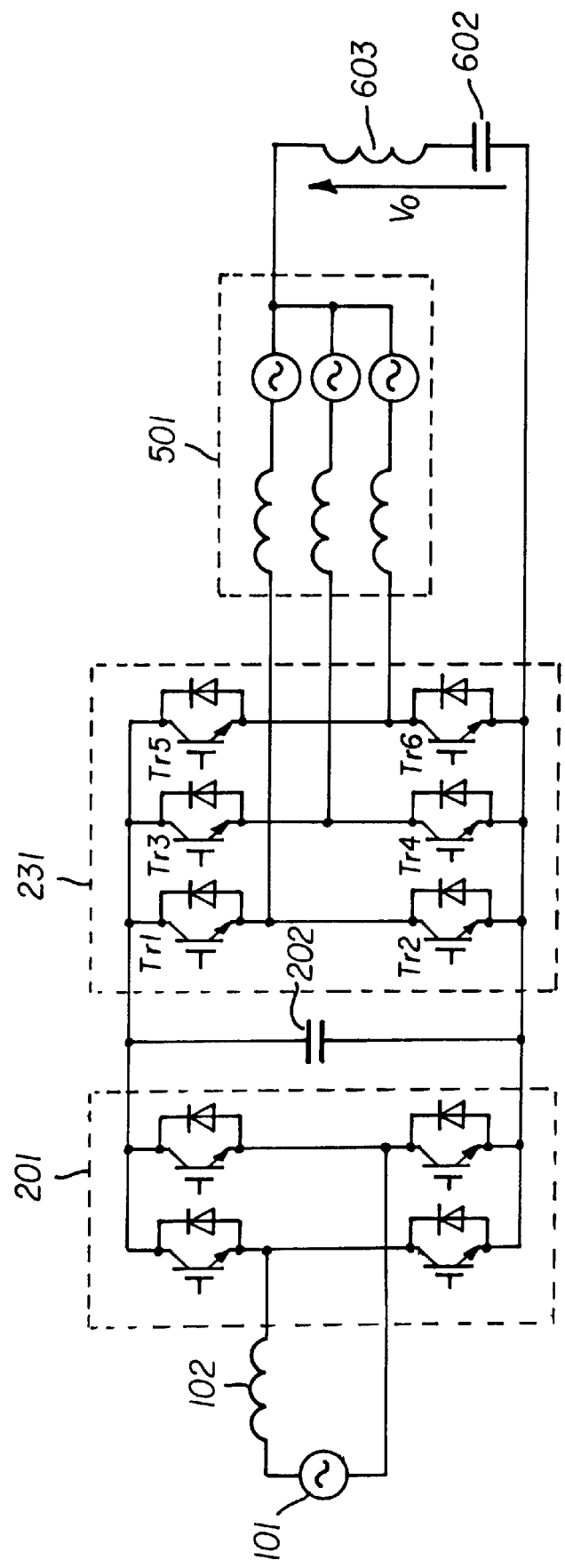
FIG. 24 is a circuit diagram showing the twelfth embodiment of the present invention.

FIG. 24 is a circuit diagram showing a power conversion apparatus constructed according to the twelfth embodiment of the present invention.

In the present embodiment, a series resonance circuit as an energy storage element consisting of a resonance reactor 603 and a resonance capacitor 602 is connected between the neutral point of the motor 501 and a connection point between the lower arms of the inverter 231 and the smoothing capacitor 202. The size of this apparatus can be further reduced if the iron core of the resonance reactor 603 and the stator core of the motor 501 are integrated for use in common. The other parts of the circuit arrangement are identical with those of the embodiment of FIG. 19.

Here, the resonance frequency of the above series resonance circuit is selected to be twice as high as the power supply frequency.

In this embodiment, the single-phase full bridge converter 201 operates so that the waveform of the input current is formed into the shape of a sinusoidal wave, in the same manner as described above.

Figure 25:
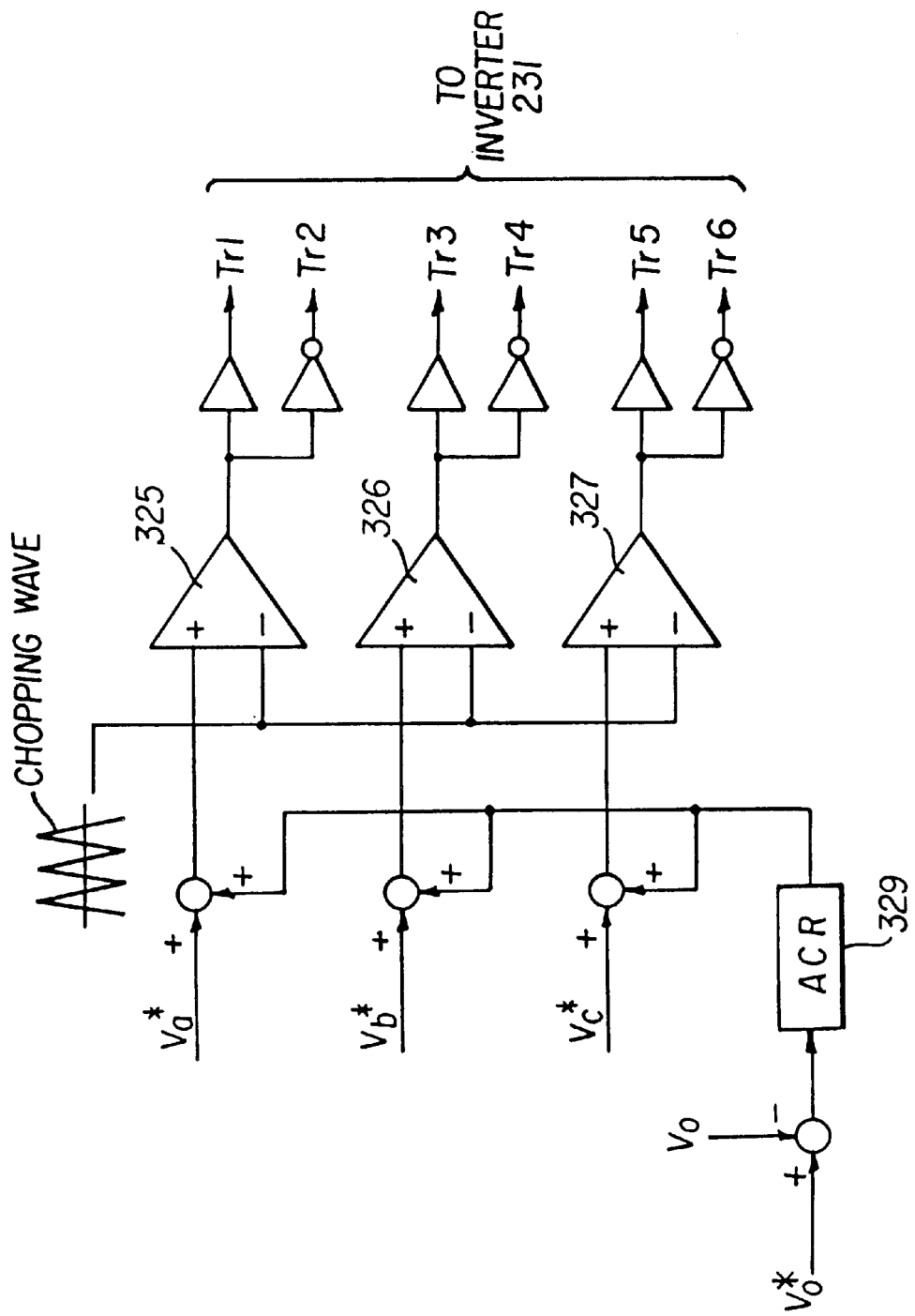
FIG. 25 is a circuit diagram showing a control circuit of the embodiment of FIG. 24.

FIG. 25 shows a control circuit for producing PWM pulses to be applied to the switching elements Tr1–Tr6 of the inverter 231 of FIG. 24.

As shown in FIG. 25, in the present embodiment, a zero-phase-sequence voltage command $v_0{}^*$ is directly applied so as to control a zero-phase-sequence voltage detected from voltage of each phase to be kept at a constant level. In FIG. 25, reference numeral 329 denotes a voltage controller which receives a difference between the zero-phase voltage command $v_0{}^*$ and the zero-phase voltage detected value $v_0$. The output of this voltage controller 329 is added to each of voltage commands $v_a{}^*$, $v_b{}^*$, and $v_c{}^*$, and comparators 325–327 compare the results of addition with a chopping wave, thereby to obtain PWM patterns for the switching elements Tr1–Tr6 of the inverter 231.

Figure 50:
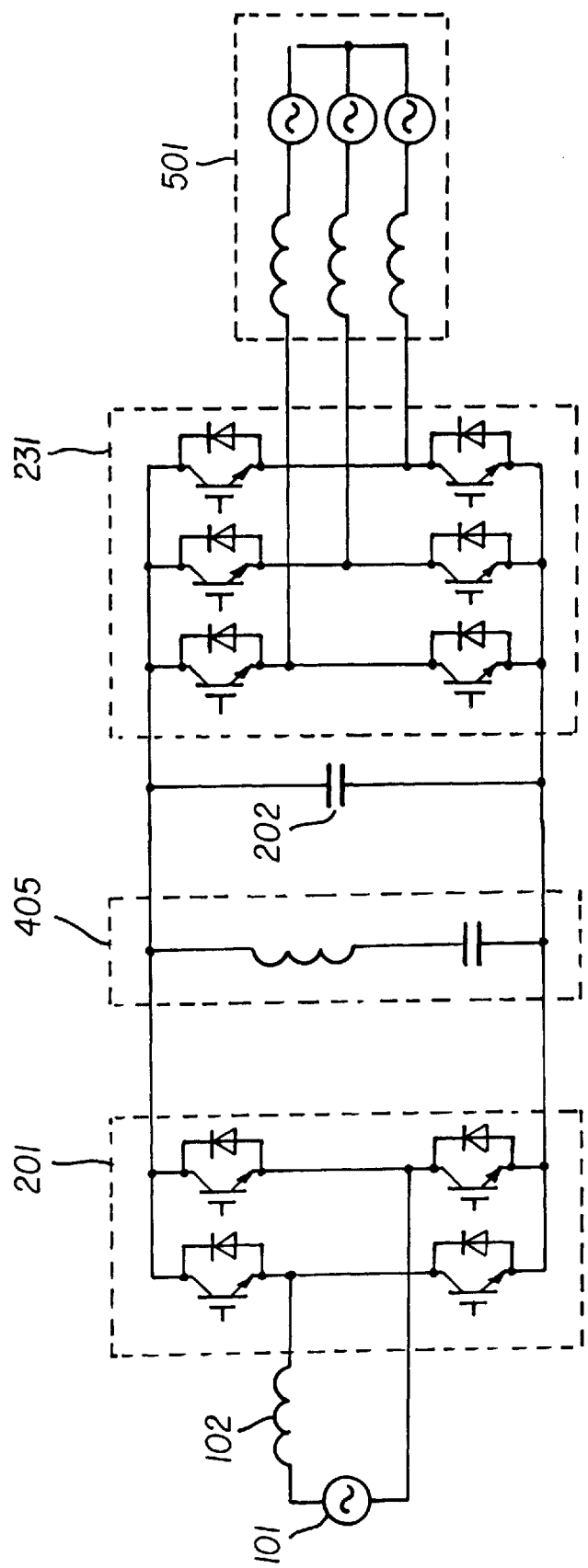
FIG. 50 is a circuit diagram showing a known circuit.

Although the breakdown voltage of the resonance capacitor needs to be twice as high as the dc intermediate voltage in the known circuit of FIG. 50, the breakdown voltage of the resonance capacitor 602 of the present embodiment may be about ½ of that of the known circuit if its magnitude is controlled by the zero-phase-sequence voltage command $v_0{}^*$ to be equal to one half of the dc intermediate voltage, for example. This leads to reduced size and cost of the resulting circuit.

As is apparent from the above description, in the present embodiment, the series resonance circuit consisting of the resonance reactor 603 and the resonance capacitor 602 functions as an LC filter 405 of FIG. 50, so as to absorb power ripple whose frequency is twice as high as the power supply frequency.

The manner of transmitting zero-phase-sequence power between the inverter 231 and the series resonance circuit is similar to that of the embodiment of FIG. 19.

In the embodiment as described above, the series resonance circuit consisting of the resonance reactor 603 and the resonance capacitor 602 may be connected between the neutral point of the motor 501, and a connection point between the upper arms of the inverter 231 and the smoothing capacitor 202.

Figure 26:
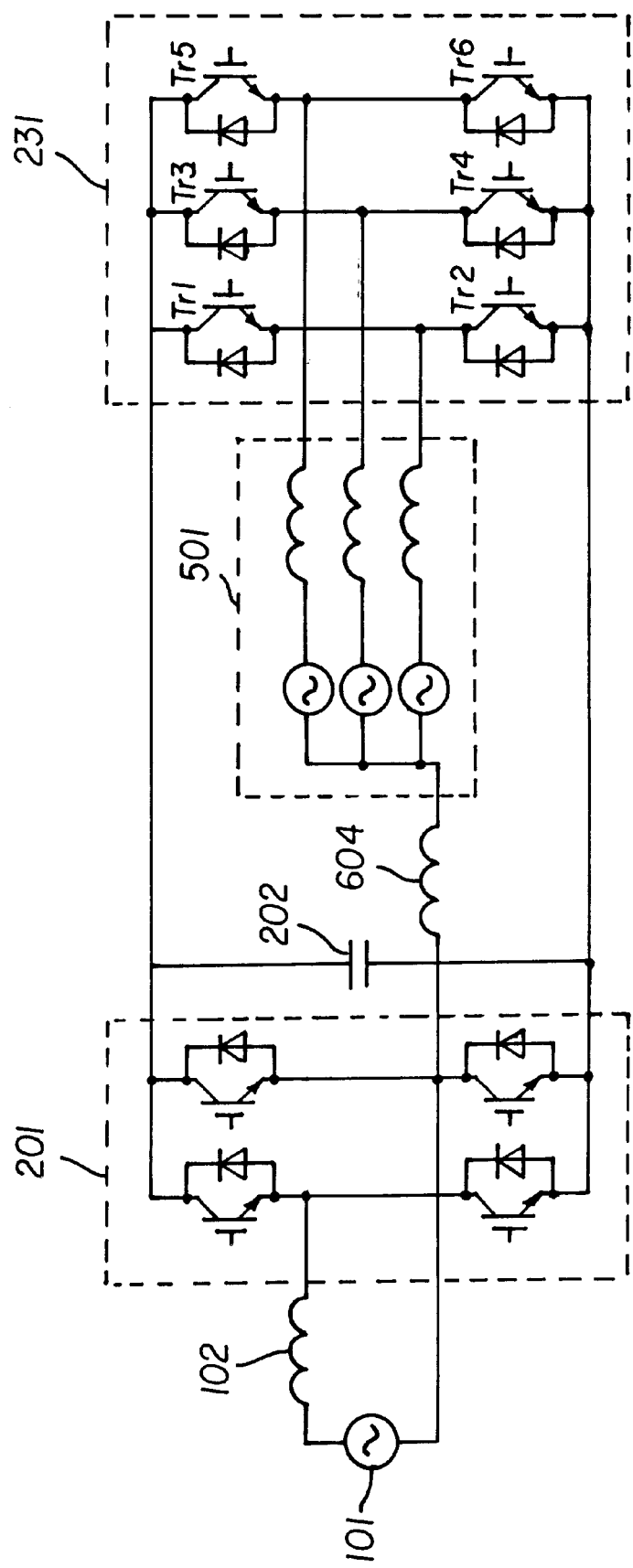
FIG. 26 is a circuit diagram showing the thirteenth embodiment of the invention.

FIG. 26 is a circuit diagram showing a power conversion apparatus constructed according to the thirteenth embodiment of the present invention.

In this embodiment, a reactor 604 for absorbing ripple, which serves as an energy storage element, is connected between the neutral point of the motor 501, and one of ac input terminals (the middle point of one pair of upper and lower arms) of the converter 201. This reactor 604 may be integrated with the motor 501 by using the same iron core, so that the size of the whole circuit can be reduced. For the other part of the circuit arrangement, the same reference numerals as used in the previous embodiments are used for identifying corresponding components.

As a method for controlling the apparatus of the present embodiment, the single-phase full bridge converter 201 operates so that the waveform of the input current is shaped into a sinusoidal wave in the same manner as in the previous embodiments.

The control circuit of FIG. 25 may be used for producing PWM pulses to be applied to the switching elements Tr1–Tr6 of the inverter 231. In this connection, the method for producing the zero-phase-sequence voltage command $v_0^*$ for reducing the capacitance of the smoothing capacitor 202 can be easily derived from the paper titled "79 Method for Reducing Power Ripple of Single-phase Voltage Type PWM Converter" printed in 1996 National Convention Record I.E.E.J. Industry Applications Society.

Figure 51:
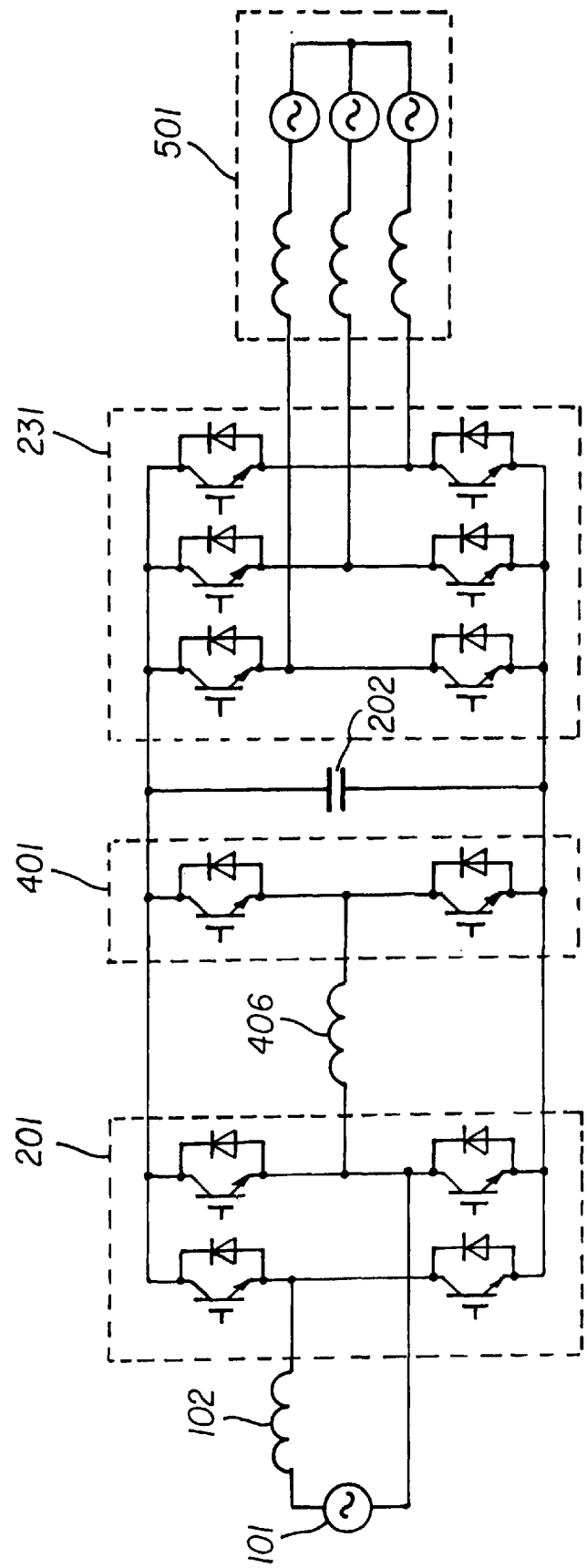
FIG. 51 is a circuit diagram showing a known circuit.

The mechanism for transmitting zero-phase-sequence power between the inverter 231 and the reactor 604 is the same as that of the embodiment of FIG. 19, and the same function as performed by the pair of arms 401 in the known circuit of FIG. 51 may be performed by causing the inverter 231 to generate a zero-voltage vector to control the current of the reactor 604. Consequently, the circuit of FIG. 26 becomes substantially equivalent to the circuit of FIG. 51, and the size and cost of the apparatus may be reduced owing to elimination of the additional arm.

In the present embodiment, one end of the reactor 604 for absorbing power ripple may be connected to the other ac input terminal (middle point of the other pair of upper and lower arms) of the converter 201.

Figure 27:
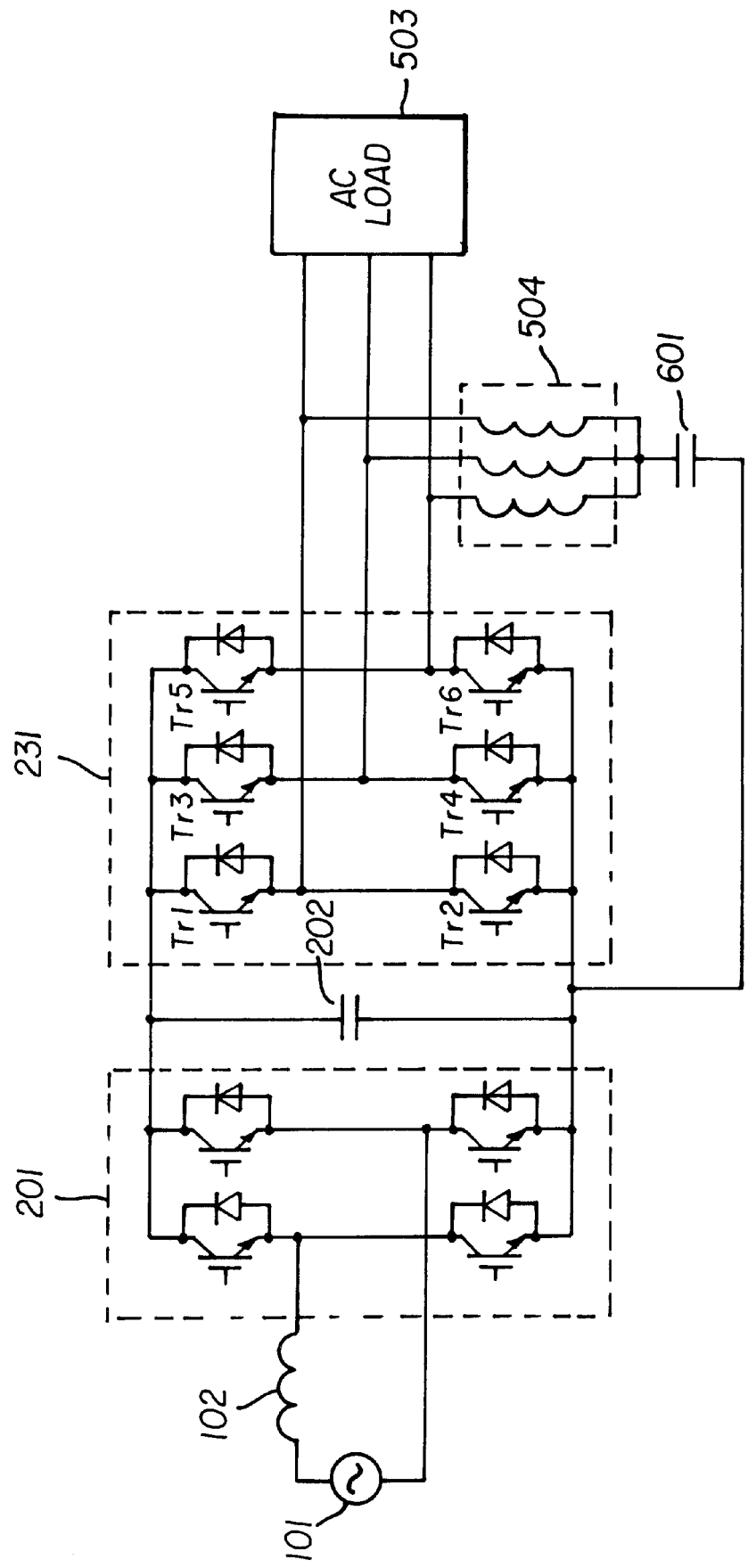
FIG. 27 is a circuit diagram showing the fourteenth embodiment of the invention.

FIG. 27 is a circuit diagram showing a power conversion apparatus according to the fourteenth embodiment of the present invention.

The circuit of this embodiment is designed on the basis of that of the embodiment of FIG. 19, but is different from that of FIG. 19 in that a reactor 504 is star-connected to output terminals of respective phases of the three-phase voltage type inverter 231, and its neutral point, rather than the neutral point of the motor 501 of FIG. 19, is connected to one terminal of the capacitor 601.

The present embodiment may employ an ac load 503 that does not have a neutral point, and the capacitance of the smoothing capacitor 202 may be reduced by eliminating an additional arm, as in the embodiment of FIG. 19, without causing zero-phase-sequence current to flow through the ac load 503.

This embodiment may be applied to a structure obtained by removing the motor 501 from each of the embodiments of FIG. 24 and FIG. 26.

While the single-phase full bridge converter is used as the converter 201 in each of the illustrated embodiments, a single-phase hybrid bridge converter, or any other type of converter, may be used as a converter, since the significance of the present invention resides in reduction of the capacitance of the smoothing capacitor 202.

Figure 28:
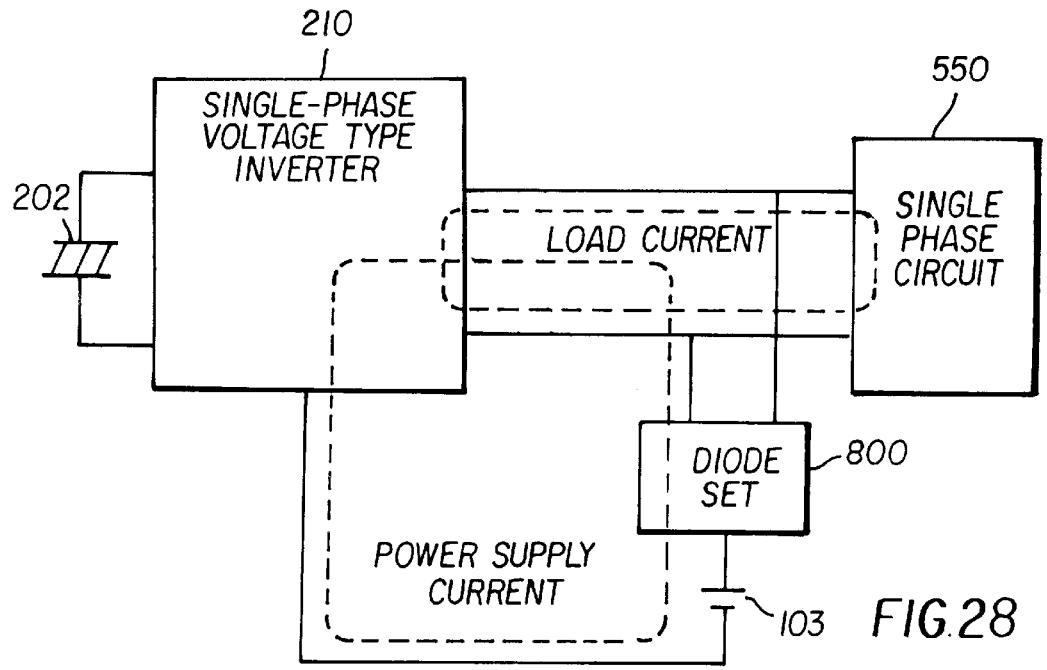
FIG. 28 is a schematic view showing the fifteenth embodiment of the invention.

FIG. 28 is a schematic view showing a power conversion apparatus constructed according to the fifteenth embodiment of the present invention.

The apparatus of FIG. 28 includes a dc power supply 103, smoothing capacitor 202, single-phase voltage type inverter 210, and a single-phase circuit 550, such as a single-phase ac motor, transformer, or a single-phase ac power supply coupled through inductance, which supplies and receives ac power to and from the inverter 210.

In FIG. 28, reference numeral 800 denotes a set of diodes constructed by connecting a plurality of diodes in series so that the polarity is reversed at a connecting point inside the component 800. The opposite ends of this set of diodes 800 are connected to ac output terminals of the inverter 210, and the polarity reversal point (virtual neutral point) inside the set of the diodes 800 is connected to the positive electrode of the dc power supply 103.

The negative electrode of the dc power supply 103 is connected to a connection point between the lower arms of the inverter 210 and the smoothing capacitor 202, and the inverter 210, set of diodes 800, and the dc power supply 103 are connected in the form of a loop so that the voltage and current of the dc power supply 103 provide zero-phase-sequence components (components having the same magnitude and no phase difference) when viewed from the ac output terminal of the inverter 210 through the set of diodes 800.

In the arrangement as described above, ac power is transmitted between the inverter 210 and the single-phase circuit 550, by controlling voltage between lines of the inverter 210 and current (load current) flowing between the lines, to thereby control electric power, in the same manner as in the known circuit. Namely, where the single-phase circuit 550 is a single-phase load, such as an ac motor, ac power is supplied to the circuit 550 so as to drive the single-phase load. Where the single-phase circuit 550 is a single-phase ac power supply coupled via a reactor to the inverter 210, dc power of the dc power supply 103 is converted into ac power by means of the inverter 210, and the ac power thus obtained is regenerated into the single-phase ac power supply.

In the meantime, the inverter 210 generates a zero-voltage vector so as to control zero-phase-sequence voltage and zero-phase sequence current, so that dc power is transmitted between the inverter 210 and the dc power supply 103.

Namely, transmission of ac power between the inverter 210 and the single-phase circuit 550 and transmission of dc power between the inverter 210 and the dc power supply 103 are performed in a time-sharing manner, and, when the inverter 210 supplies and receives dc power to and from the dc power supply 103, the inverter 210 functions as a chopper for performing DC/DC power conversion. This makes it unnecessary to provide a DC/DC converter 205 as shown in FIG. 49, and makes it possible to reduce the number of semiconductor switching elements and their driving circuit which constitute this converter 205.

Figure 29:
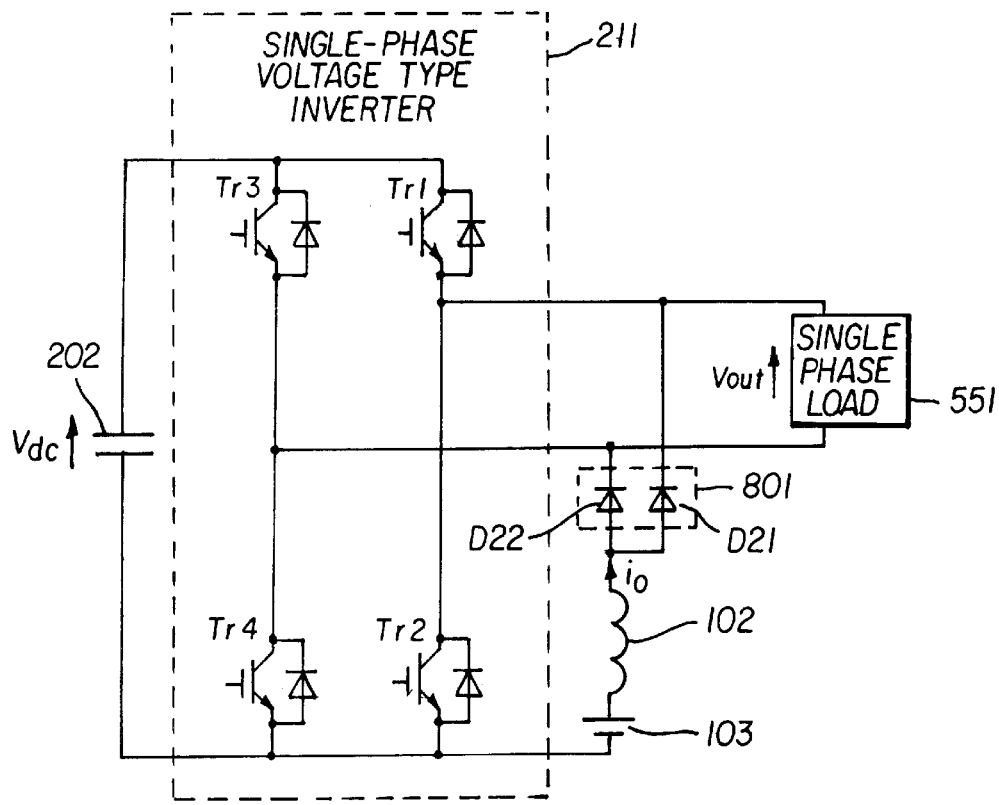
FIG. 29 is a circuit diagram showing the sixteenth embodiment of the invention.

FIG. 29 is a circuit diagram showing a power conversion apparatus constructed according to the sixteenth embodiment of the present invention.

The apparatus shown in FIG. 29 includes a dc power supply 103, reactor 102, smoothing capacitor 202, and a single-phase voltage type inverter 211 consisting of self-commutated semiconductor switching elements Tr1–Tr4, such as IGBT, and diodes each of which is reversely connected in parallel with a corresponding one of the switching elements. This apparatus further includes a single-phase load, such as a single-phase ac motor, that is connected to an ac output terminal of the inverter 211, and a set of diodes 801 wherein diodes D21, D22 are connected in series with reverse polarities, and the cathodes of the respective diodes D21, D22 are respectively connected to ac output terminals of the inverter 211, while their anodes (which provide a polarity reversal point where the diodes D21, D22 are connected to each other) are connected one end of the reactor 102.

Here, the positive electrode of the dc power supply 103 is connected to the other end of the reactor 102, and the negative electrode of the power supply 103 is connected to a connection point between the lower arms of the inverter 211 and the smoothing capacitor 202.

In the present embodiment, attention is given to the zero-voltage vector of the single-phase voltage type inverter 211. Namely, the single-phase voltage type inverter 211 is able to generate a zero-voltage vector, by selecting one of two switching patterns, i.e., a switching pattern in which all of the upper arms are conducted altogether, and a switching pattern in which all of the lower arms are conducted altogether. This embodiment makes use of this degree of freedom in selecting the switching pattern.

The zero-phase-sequence voltage generated by the inverter 211 does not appear as voltage between lines, and therefore has no influence on supply of ac power to the single-phase load 551. Thus, an equivalent circuit of its positive-phase-sequence component is configured as shown in FIG. 30, wherein the inverter 211 operates in the same manner as the known counterpart for (when) supplying power to the single-phase load 551, and supplies and receives ac power to and from the single-phase motor 501, by controlling the voltage across (between) lines of the inverter 211 and current flowing between the lines, thereby to control the power.

The voltage of the dc power supply 103, when viewed from the ac output terminal of the inverter 211 through the diodes D21, D22 of the set of diodes 801, becomes equal to zero-phase-sequence voltage, and zero-phase-sequence current is bypassed through the set of diodes 801 connected in the above arrangement, and thus prevented from flowing into the single-phase load 551.

Figure 30:
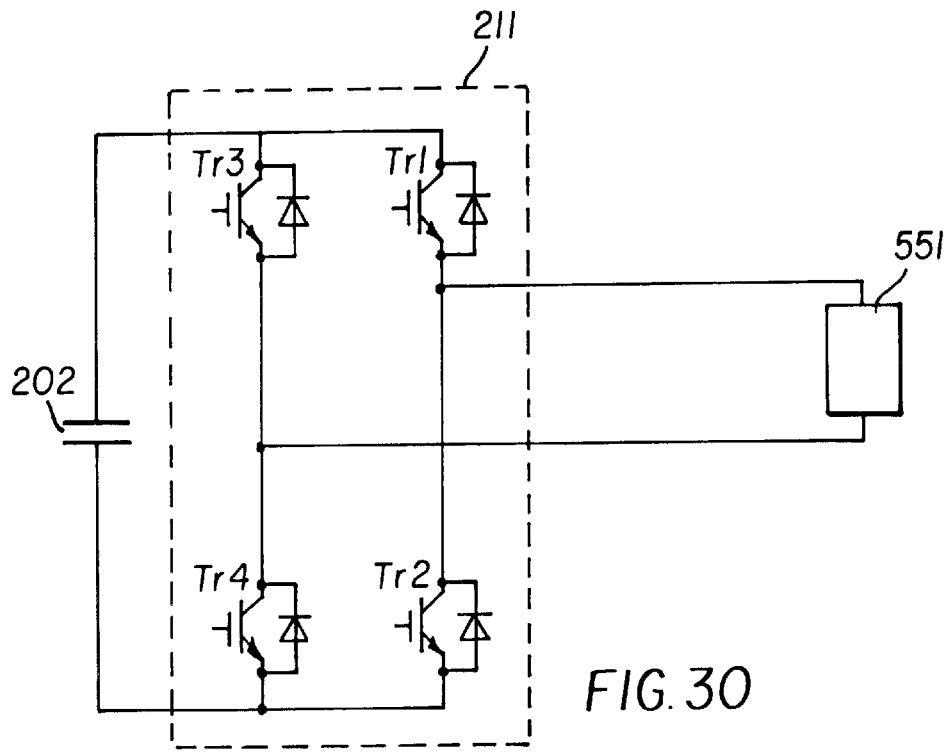
FIG. 30 is a circuit diagram showing an equivalent circuit of a positive-phase-sequence component of the embodiment of FIG. 29.
Figure 31:
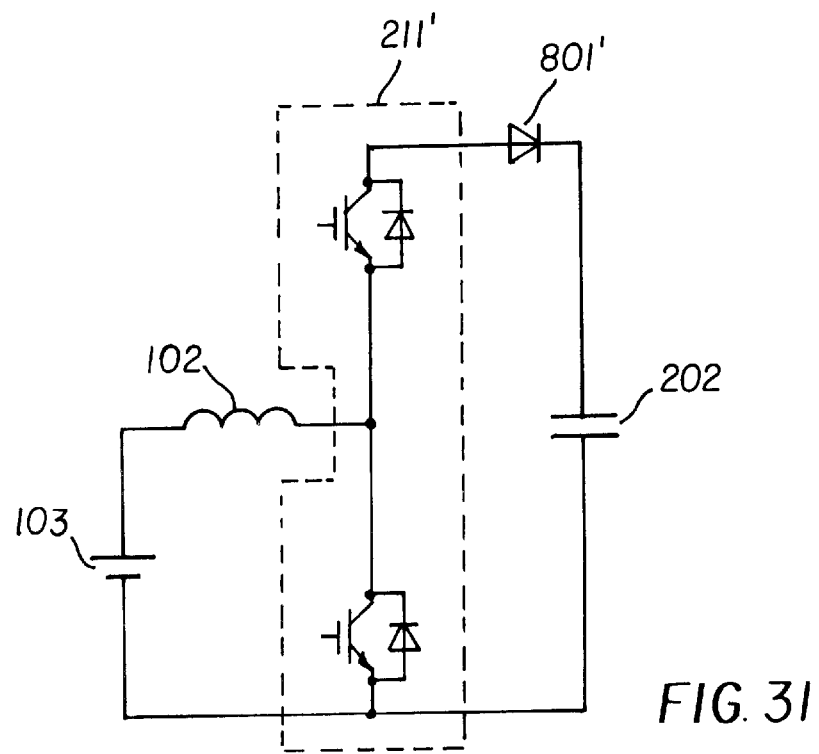
FIG. 31 is a circuit diagram showing an equivalent circuit of a zero-phase-sequence component of the embodiment of FIG. 29.

On the other hand, an equivalent circuit of the zero-phase-sequence component is constructed as shown in FIG. 31, wherein two pairs of arms of the inverter 211 as shown in FIG. 30 may be regarded as one pair of arms 211' which performs switching operation at the ratio of a zero-voltage vector. Namely, the function of the booster chopper 205 used in the known circuit of FIG. 48 may be performed by the inverter 211 of FIG. 29 that controls the zero-phase-sequence voltage. In FIG. 31, reference numeral 801' denotes a diode that is equivalent to the set of the diodes 801 of FIG. 29.

Figure 48:
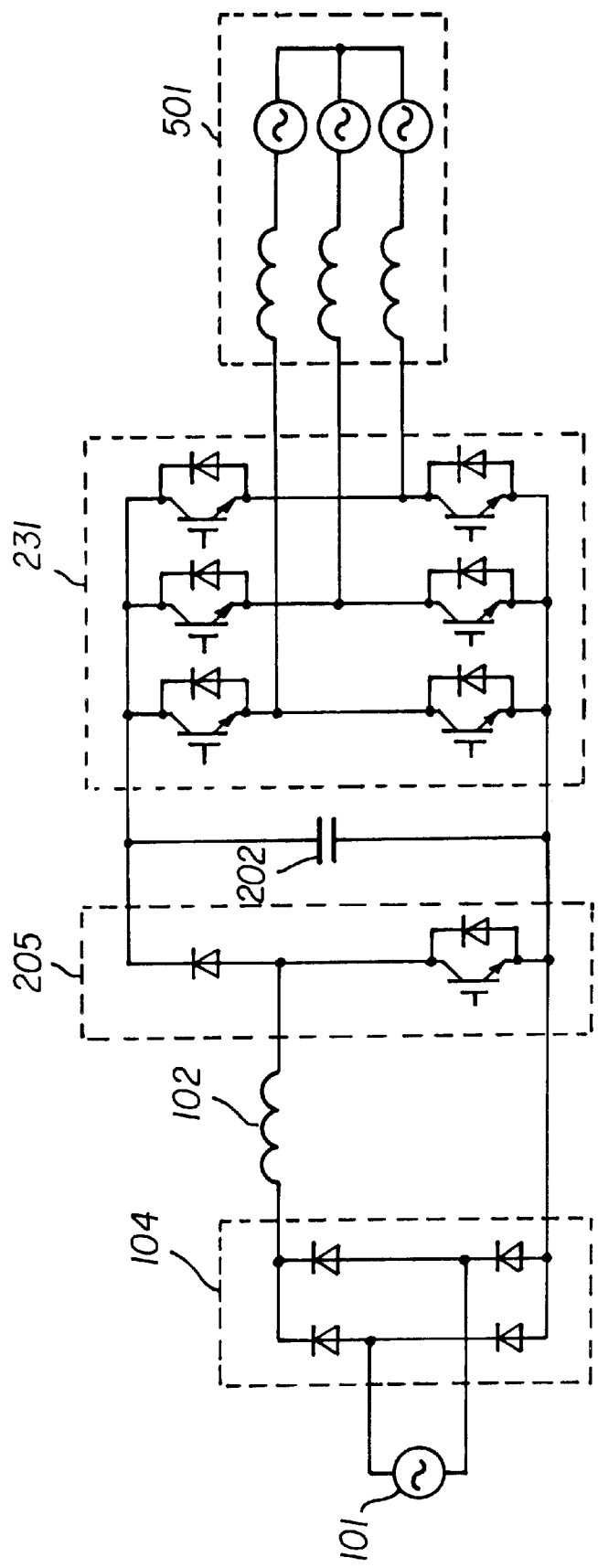
FIG. 48 is a circuit diagram showing a known circuit.

In the arrangement as described above, the inverter 211 performs switching operation to generate a zero-voltage vector, to thus perform substantially the same operation as the booster chopper 205 of FIG. 48, so that dc power can be transmitted between the dc power supply 103 and the capacitor 202.

Thus, the circuit shown in FIG. 29 is able to realize a DC/AC power conversion apparatus that operates in substantially the same manner as that of FIG. 48. Since semiconductor switching elements that constitute the booster chopper can be eliminated, the circuit configuration can be simplified, and the size and cost of the apparatus can be reduced.

Figure 32:
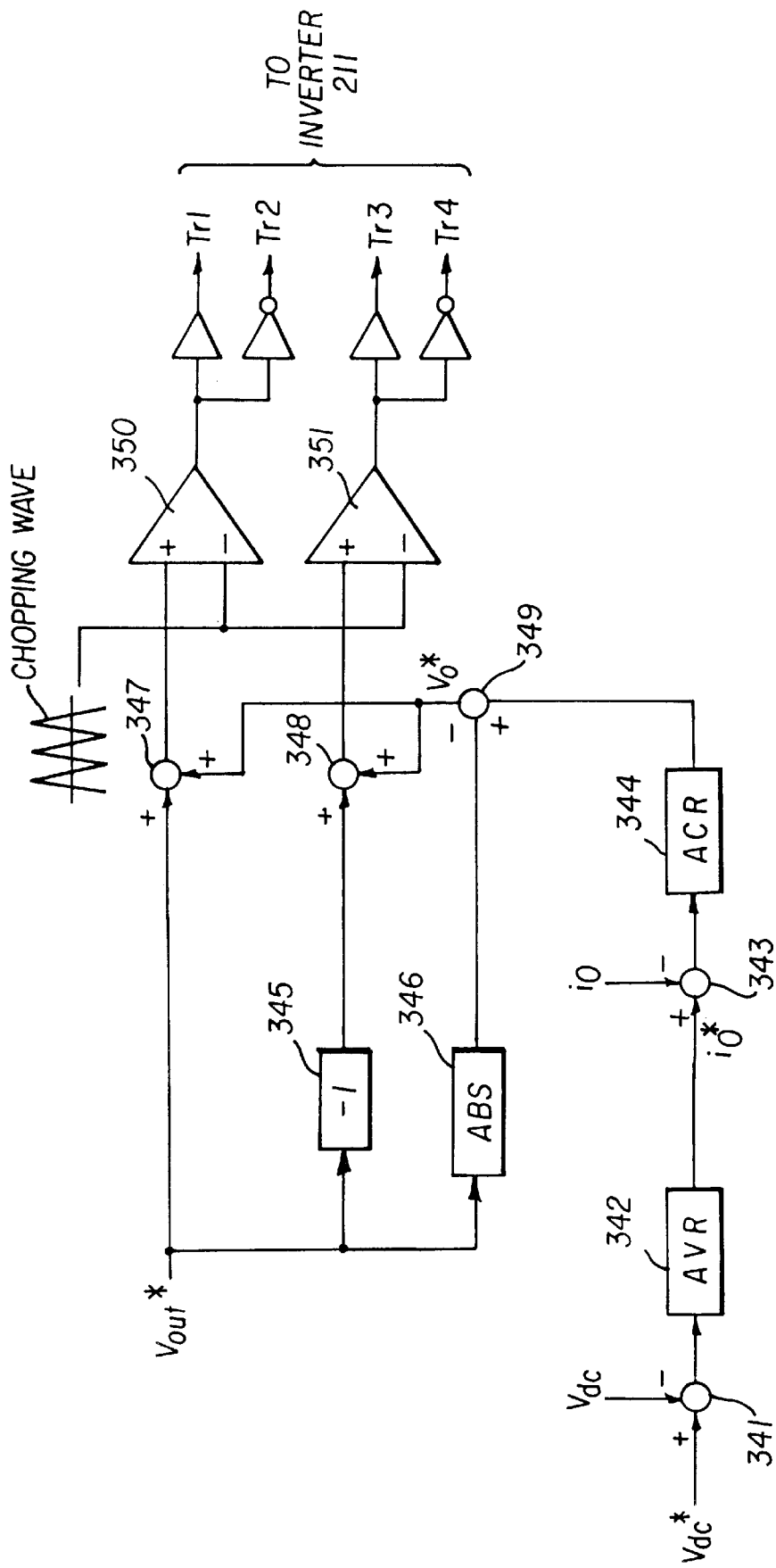
FIG. 32 is a circuit diagram showing a control circuit of the embodiment of FIG. 29.

The inverter 211 of FIG. 29 is controlled by PWM pulses, which are produced by, for example, a control circuit as shown in FIG. 32.

Referring to FIG. 32, a difference between a dc voltage command $V_{dc}^*$ and a dc voltage detected value $V_{dc}$ is obtained by an adder 341, and the result is input to a voltage controller 342, which in turn produce a zero-phase-sequence (input) current command $i_0^*$. Then, a difference between this zero-phase-sequence current command $i_0^*$ and a zero-phase-sequence current detected value $i_0$ is obtained by an adder 343, and the result is received by a current controller 344.

In the meantime, an absolute value detector 346 receives an output voltage command $v_{out}^*$ of the inverter 211, and obtains its absolute value, which is then subtracted by an adder 349 from the output of the current controller 344, so as to obtain a zero-phase-sequence voltage command $v_0^*$.

The output voltage command $v_{out}^*$ and the zero-phase-sequence voltage command $v_0^*$ are added by an adder 347, and the zero-phase-sequence voltage command $v_0^*$ and a signal produced by reversing the polarity of the output voltage command $v_{out}^*$ by a polarity reversing device 345 are added by an adder 348. Then, comparators 350, 351 compare the results of the addition with a chopping wave, so as to obtain PWM patterns for controlling the switching elements Tr1–Tr4 of the inverter 211 so that the dc voltage detected value $V_{dc}$ follows the current voltage command $V_{dc}^*$.

In the present embodiment of FIG. 29, when the positive electrode of the dc power supply 103 is connected to a connection point between the upper arms of the inverter 211 and the smoothing capacitor 202, the negative electrode of the dc power supply 103 is connected to one end of the reactor 102, and the other end of the reactor 102 is connected to a connection point (polarity reversal point) between the cathodes of the diodes D21, D22, with the anodes of the diodes D21, D22 being respectively connected to ac output terminals of the inverter 211.

Figure 33:
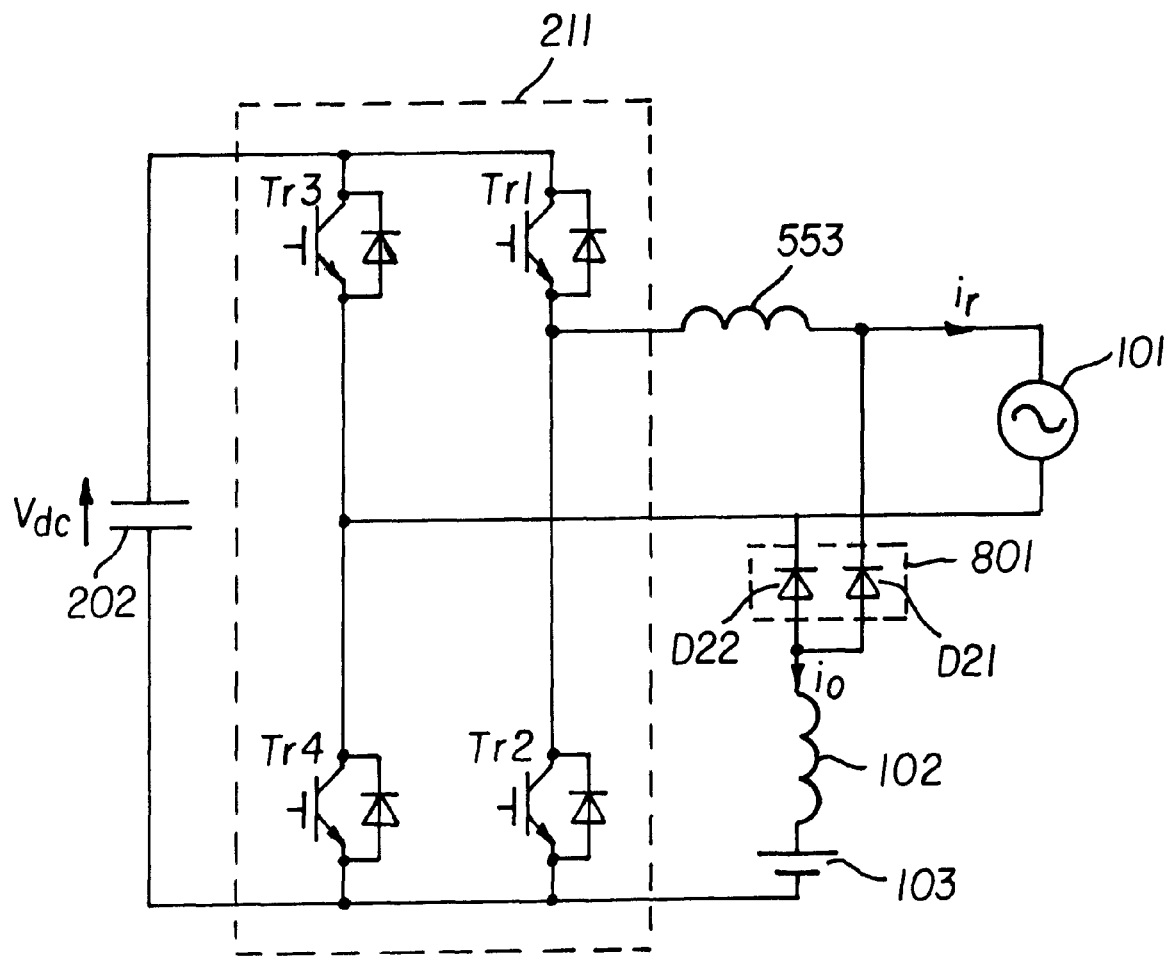
FIG. 33 is a circuit diagram showing the seventeenth embodiment of the present invention.

FIG. 33 is a circuit diagram showing a power conversion apparatus constructed according to the seventeenth embodiment of the present invention.

The present embodiment corresponds to the known circuit of FIG. 48, wherein ac power generated from the inverter 211 is regenerated into the single-phase ac power supply 101. In FIG. 33, the same reference numerals as used in FIG. 29 are used for identifying corresponding ones of the other constituent elements of the apparatus of FIG. 33.

Figure 34:
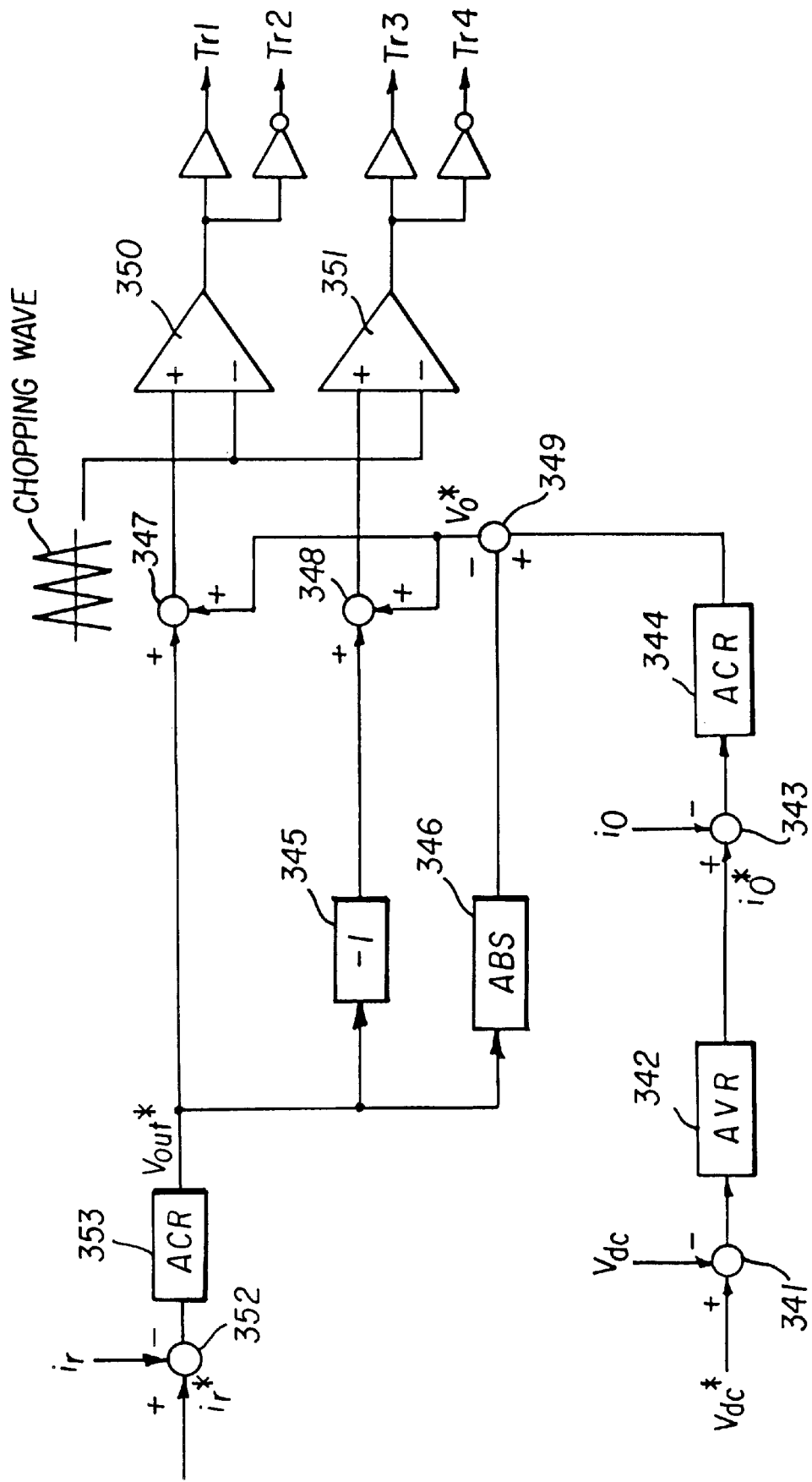
FIG. 34 is a circuit diagram showing a control circuit of the embodiment of FIG. 33.

In the present embodiment, a control circuit as shown in FIG. 34 is used for shaping the waveform of regenerative current into a sinusoidal waveform.

More specifically, a difference between a regenerative current command $i_r^*$ and an actual regenerative current detected value $i_r$ is calculated by an adder 352, and the result is input to a current controller 353, which in turn produces an output voltage command $v_{out}^*$. The contents of other control operations are similar to those of the control circuit of FIG. 32.

The apparatus of the present embodiment operates substantially in the same manner as in the embodiment of FIG. 29, and the operation of the booster chopper 205 used in the known circuit of FIG. 48 is performed by the inverter 211 which generate a zero-voltage vector, so that dc power is transmitted between the inverter 211 and the dc power supply 103. At this time, zero-phase-sequence current is bypassed through the set of diodes 801, and thus prevented from flowing into the single-phase ac power supply 101.

During regeneration of electric power, current $i_r$ having a sinusoidal waveform is caused to flow so that dc power of the dc power supply 103 is regenerated into the single-phase ac power supply 101 via the inverter 211.

In the present embodiment, where the positive electrode of the dc power supply 103 is connected to a connection point between the upper arms of the inverter 211 and the smoothing capacitor 202, the negative electrode of the power supply 103 is connected to one end of the reactor 102, and the other end of the reactor 102 is connected to a connection point (polarity reversal point) between the cathodes of the diodes D21, D22, while the anodes of the diodes D21, D22 are respectively connected to the opposite terminals of the single-phase ac power supply 101.

Figure 35:
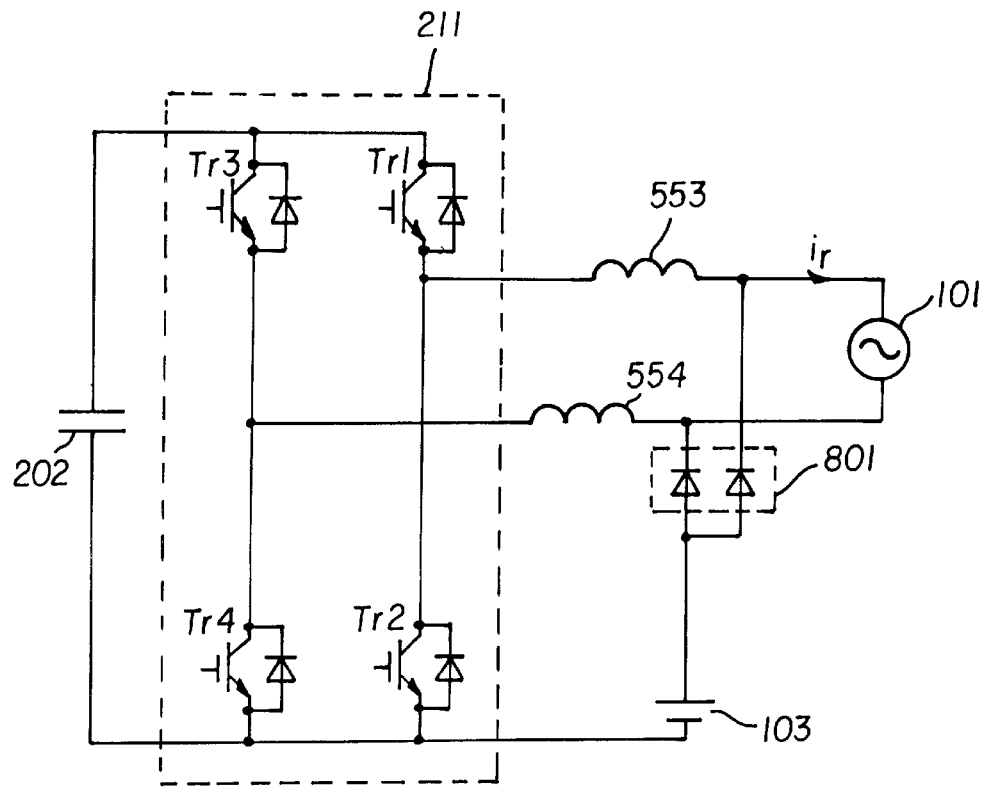
FIG. 35 is a circuit diagram showing the eighteenth embodiment of the invention.

FIG. 35 is a circuit diagram showing a power conversion apparatus constructed according to the eighteenth embodiment of the present invention.

In the present embodiment, first reactor 553 and second reactor 554 are inserted between the ac output terminals of the inverter 211 and the opposite terminals of the single-phase ac power supply 101.

In this arrangement, the current flowing through the reactors 553, 554 may be reduced as compared with the current flowing through the dc reactor 102 in the embodiments of FIG. 29 and FIG. 33, and therefore the burden on the reactors can be reduced. While the method for controlling this circuit is similar to that of the embodiments of FIG. 29 or FIG. 33, it is necessary to detect current values flowing through the reactors 553, 554, to separate a positive-phase-sequence component and a zero-phase-sequence component, in order to obtain commands for the zero-phase-sequence current and regenerative current.

In the present embodiment, where the positive electrode of the dc power supply 103 is connected to a connection point between the upper arms of the inverter 211 and the smoothing capacitor 202, the negative electrode of the dc power supply 103 is connected to a connection point (polarity reversal point) between the cathodes of the diodes D21, D22, and the anodes of the diodes D21, D22 are respectively connected to the opposite terminals of the single-phase ac power supply 101.

Figure 36:
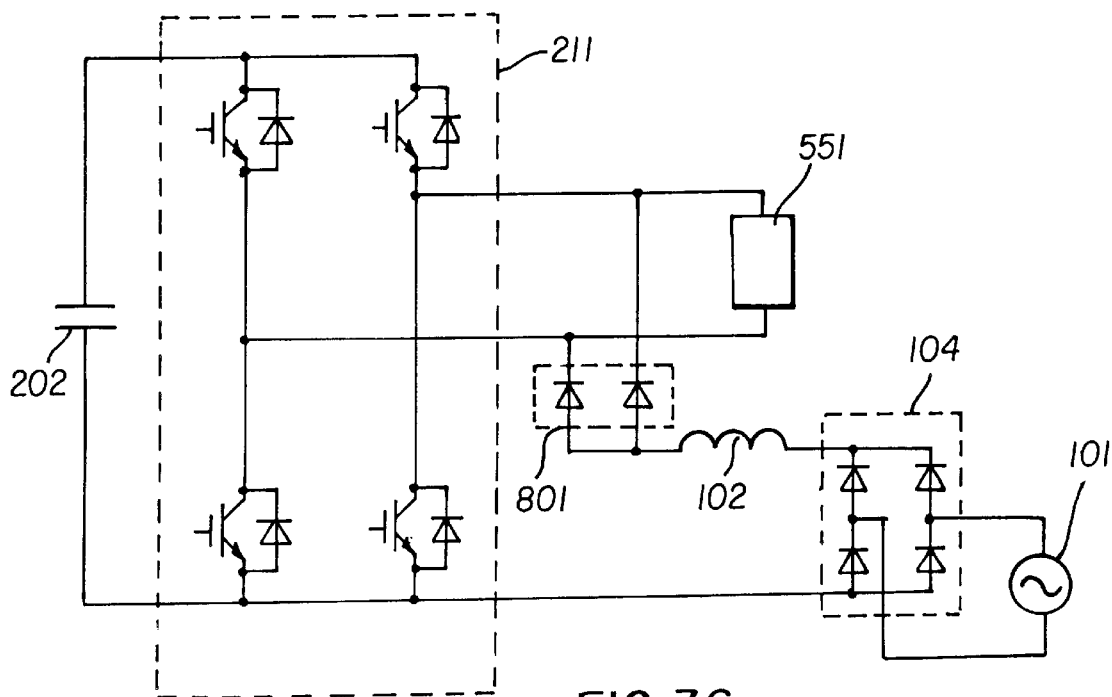
FIG. 36 is a circuit diagram showing the nineteenth embodiment of the invention.

FIG. 36 is a circuit diagram showing a power conversion apparatus according to the nineteenth embodiment of the present embodiment.

In the present embodiment, the dc power supply 103 used in the embodiment of FIG. 29 is replaced by a combination of a single-phase ac power supply 101 and a single-phase full wave rectifying circuit 104 in the form of a diode bridge.

In a control circuit for controlling the apparatus of the present embodiment, the output of the voltage controller 342 in FIG. 32 may be multiplied by an absolute value of a sinusoidal wave that is in phase with the ac power supply voltage, so that the ac input current signal can be shaped into a sinusoidal waveform.

Although not illustrated in the figures, the dc power supply may be replaced by a combination of a polyphase ac power supply, such as a three-phase ac power supply, and a full-wave rectifier circuit.

The combination of the single-phase or polyphase ac power supply and the rectifier circuit as employed in the present embodiment may be used as a replacement of the dc power supply 103 of the embodiments of FIG. 33 and FIG. 35, in addition to that of FIG. 29.

Figure 37:
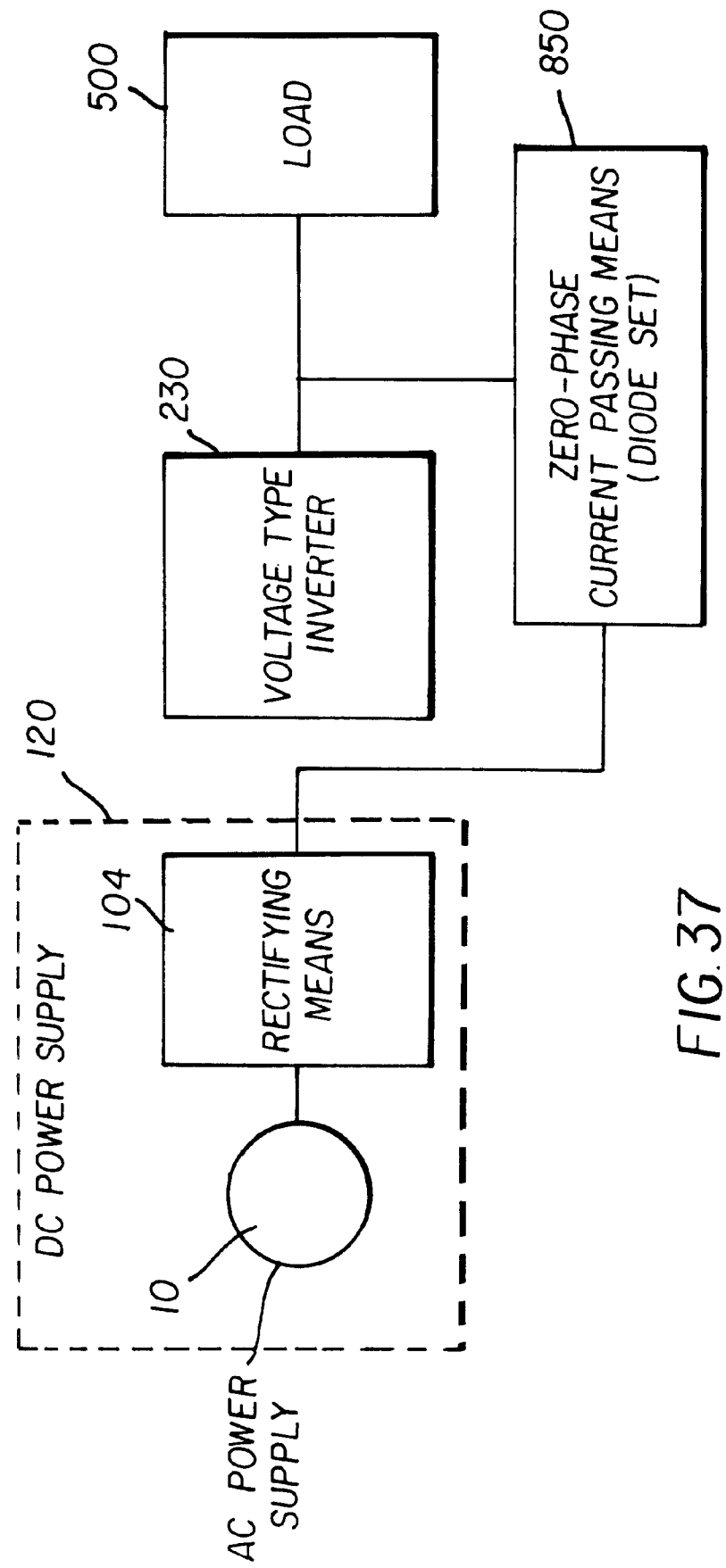
FIG. 37 is a schematic view showing the twentieth embodiment of the invention.

FIG. 37 is a schematic view showing a power conversion apparatus constructed according to the twentieth embodiment of the present invention.

The apparatus of FIG. 37 includes a single-phase or polyphase ac power supply 101, rectifying means 104, such as a full-wave rectifier circuit, for converting alternating current into direct current, the ac power supply 101 and rectifying means 104 constituting a direct power supply 120. The apparatus further includes a three-phase or other phase voltage-type inverter for producing ac voltage, a load 500, such as an ac motor, and zero-phase-sequence current passing means 850 which consists of diodes, and is connected between a dc output terminal of the rectifying means 104 and an ac output terminal of the voltage-type inverter 230.

When a zero-voltage vector is generated by the voltage-type inverter 230, the output voltage of the rectifying means 104 (dc power supply 120) becomes equal to so-called zero-phase-sequence voltage, due to the presence of the set of diodes of the zero-phase-sequence current passing means 850 between the rectifying means 104 and the ac output terminal of the inverter 230 (or input terminal of the load 500), and zero-phase-sequence current is bypassed through the set of diodes of the zero-phase-sequence current passing means 850, and thus prevented from flowing into the load 500.

In this operation, the voltage-type inverter 230 may be regarded as a single pair of arms that perform switching operation at the ratio of the zero-voltage vectors, and thus operates in the same manner as the booster chopper 205 as shown in the known circuit of FIG. 48. Accordingly, there is no need to separately provide a booster chopper, and therefore the number of semiconductor switching elements included in the circuit as a whole can be reduced, while eliminating a driving circuit, drive power supply, and control circuit for these switching elements of the booster chopper.

Where the voltage-type inverter 230 consists of a single-phase voltage type inverter, the zero-voltage vector is generated by conducting all of the upper arms of two pairs, or conducting all of the lower arms of the two pairs.

Figure 38:
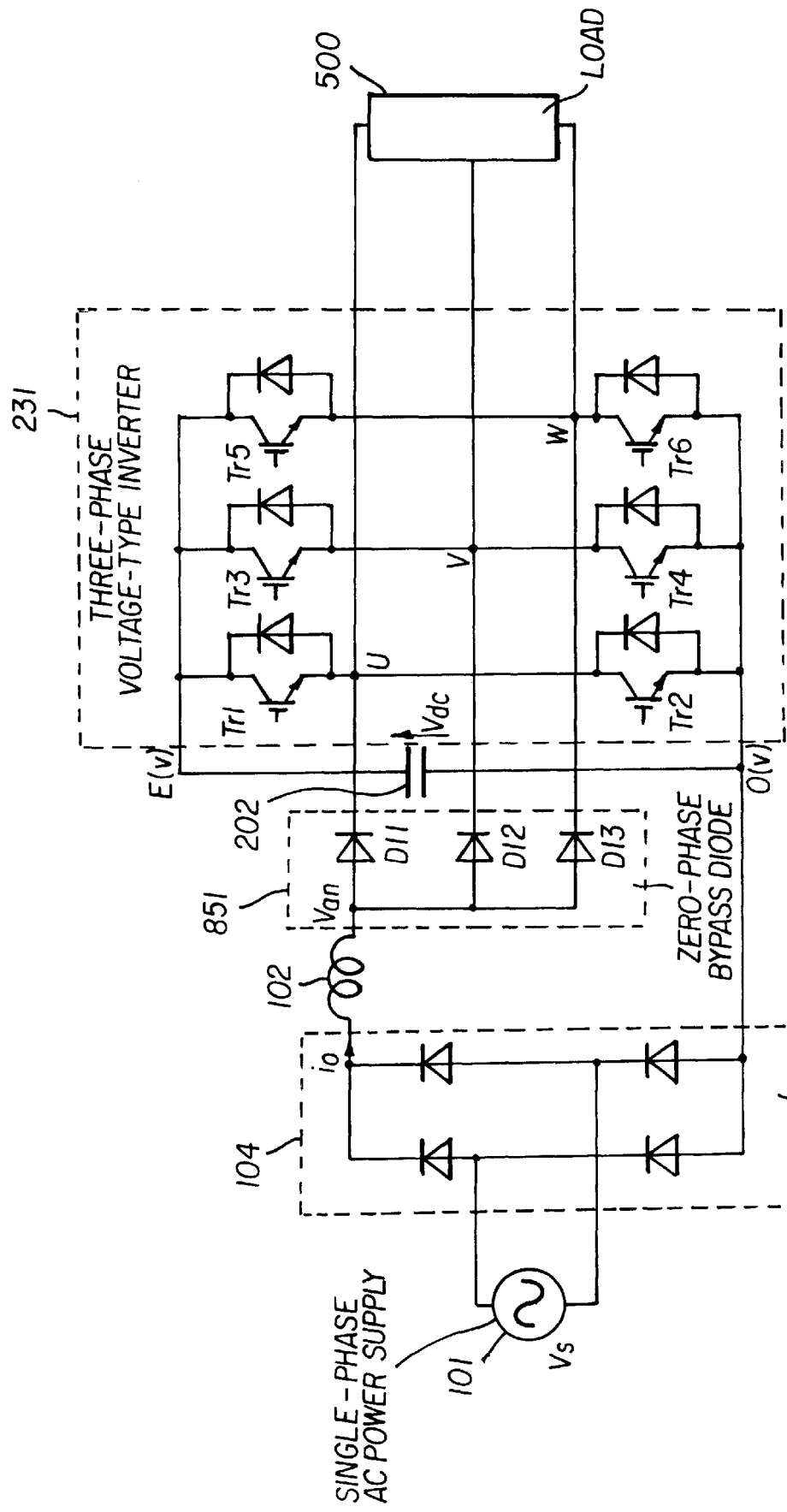
FIG. 38 is a circuit diagram showing the twenty-first embodiment of the invention.

FIG. 38 is a circuit diagram showing a power conversion apparatus constructed according to the twenty-first embodiment of the present invention.

The apparatus of FIG. 38 includes a single-phase ac power supply 101, single-phase full-wave rectifier circuit 104 in the form of a diode bridge, reactor 102, smoothing capacitor 202, three-phase voltage type inverter consisting of semiconductor switching elements Tr1–Tr6 and diodes that are reversely connected in parallel with the respective switching elements Tr1–Tr6, and a load 500, such as a three-phase ac motor, as in the known circuit of FIG. 48.

In the present embodiment, however, the booster chopper 205 used in the circuit of FIG. 48 is not provided. Instead, a zero-phase bypass diode set 851 serving as zero-phase-sequence current passing means is provided between one end of the reactor 102 on the side of the inverter 231, and three-phase ac output terminals U, V, W of the inverter 231. The zero-phase bypass diode set 851 consists of three diodes D11, D12, D13 for the respective phases, which are connected in parallel with each other with the same polarity. Namely, the anodes of these diodes D11, D12, D13 are connected in common to the reactor 102, and the cathodes are connected to the three-phase ac output terminals U, V, W, respectively.

In the present embodiment, the negative-side terminal of the inverter 231 (smoothing capacitor 202) is connected to the negative-side output terminal of the rectifier circuit 104.

In this embodiment, attention is given to a zero-voltage vector of the three-phase voltage type inverter 231. Namely, the three-phase voltage type inverter 231 is able to generate a zero-voltage vector, by selecting one of two switching patterns, i.e., a switching pattern in which all of the upper arms are conducted altogether, and a switching pattern in which all of the lower arms are conducted altogether. This embodiment makes use of this degree of freedom in selecting the switching pattern.

Figure 39:
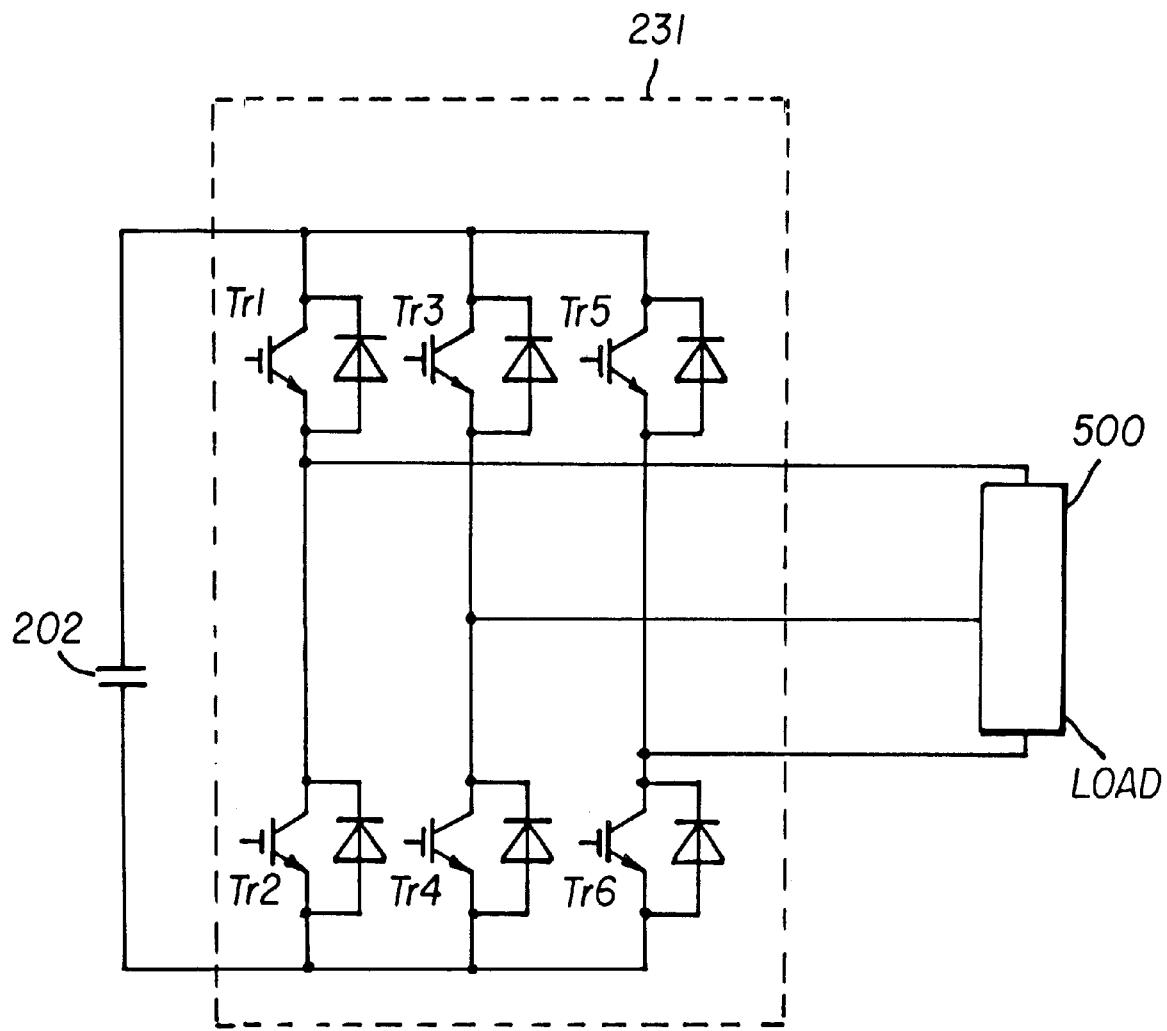
FIG. 39 is a circuit diagram showing an equivalent circuit of a positive-phase-sequence component of the embodiment of FIG. 38.

Since the zero-phase-sequence voltage generated by the inverter 231 does not appear as voltage between lines of the inverter 31, this voltage has no influence on supply of ac power to the load 500. Thus, an equivalent circuit of its positive-phase-sequence component is configured as shown in FIG. 39, wherein the inverter 231 operates in the same manner as a known counterpart for supplying power to the load 500, and supplies and receives ac power to and from the load 500, by controlling the voltage between lines of the inverter 231 and current flowing between the lines, thereby to control electric power to be supplied to the load 500.

Figure 40:
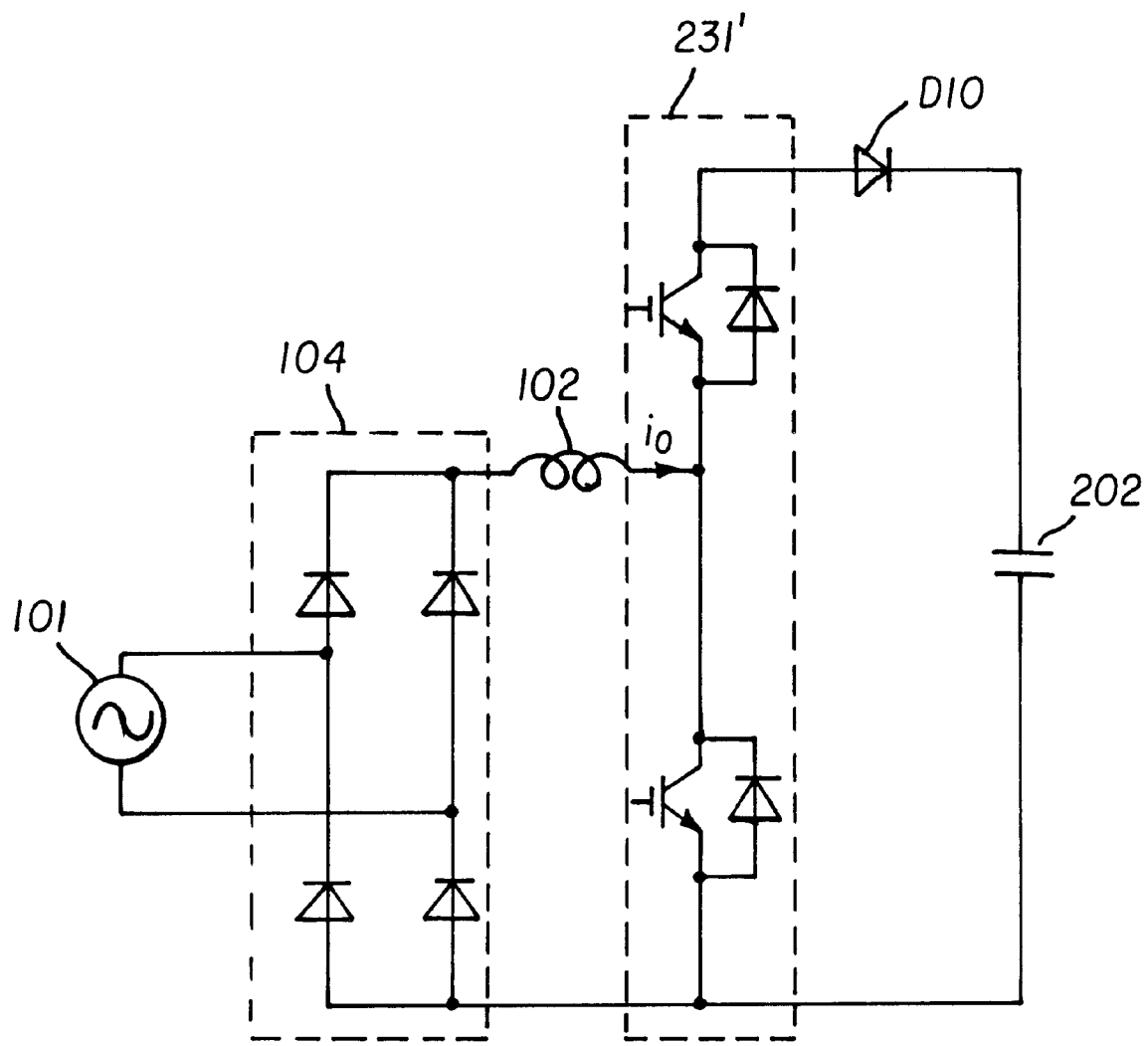
FIG. 40 is a circuit diagram showing an equivalent circuit of a zero-phase-sequence component of the embodiment of FIG. 39.

On the other hand, an equivalent circuit of the zero-phase-sequence component is configured as shown in FIG. 40, wherein three pairs of arms of the inverter 231 as shown in FIG. 38 may be regarded as one pair of arms 231' which perform switching operation at the ratio of the zero-voltage vectors. Namely, the function of the booster chopper 205 used in the known circuit of FIG. 48 may be performed by turning on all of the switching elements Tr1, Tr3, Tr5 of the upper arms of the inverter 231 or all of the switching elements Tr2, Tr4, Tr6 of the lower arms, so as to generate a zero-voltage vector.

Due to the operation of this inverter 231 for controlling the zero-phase-sequence voltage, the current waveform of the ac power supply 101 can be shaped into a sinusoidal wave that is in phase with the power supply voltage, as in the known circuit. In FIG. 40 showing the equivalent circuit of the zero-phase-sequence component, D10 denotes a diode that is equivalent to the zero-phase-sequence bypass diode set 851 of FIG. 38.

The zero-phase-sequence bypass diode 851 is connected between one end of the reactor 102 and the ac output terminals of the inverter 231 for respective phases, and the zero-phase voltage is controlled by causing the inverter 231 to generate a zero-voltage vector, whereby the equivalent circuit of FIG. 40 for the zero-phase-sequence component can be established. In this arrangement, the output voltage of the rectifier circuit 104 becomes equal to a zero-phase-sequence voltage when viewed from the input terminal of the load 500, namely, ac output terminals of the inverter 231 for respective phases, and the zero-phase-sequence current $i_0$ is bypassed through the diode D10 (zero-phase bypass diode set 851), and thus prevented from flowing into the load 500.

Upon output of the zero-voltage vector from the inverter 231, zero-phase-sequence power is transmitted between the single-phase ac power supply 101 and the inverter 231 via the zero-phase bypass diode set 851, so that substantially the same operation as that of the known booster chopper 205 can be performed. This eventually reduce the number or size of the semiconductor switching elements, and their driving circuit and other related components, in the power converting circuit as a whole. Accordingly, the circuit configuration can be simplified, and the size and cost of the apparatus can be reduced.

Figure 41:
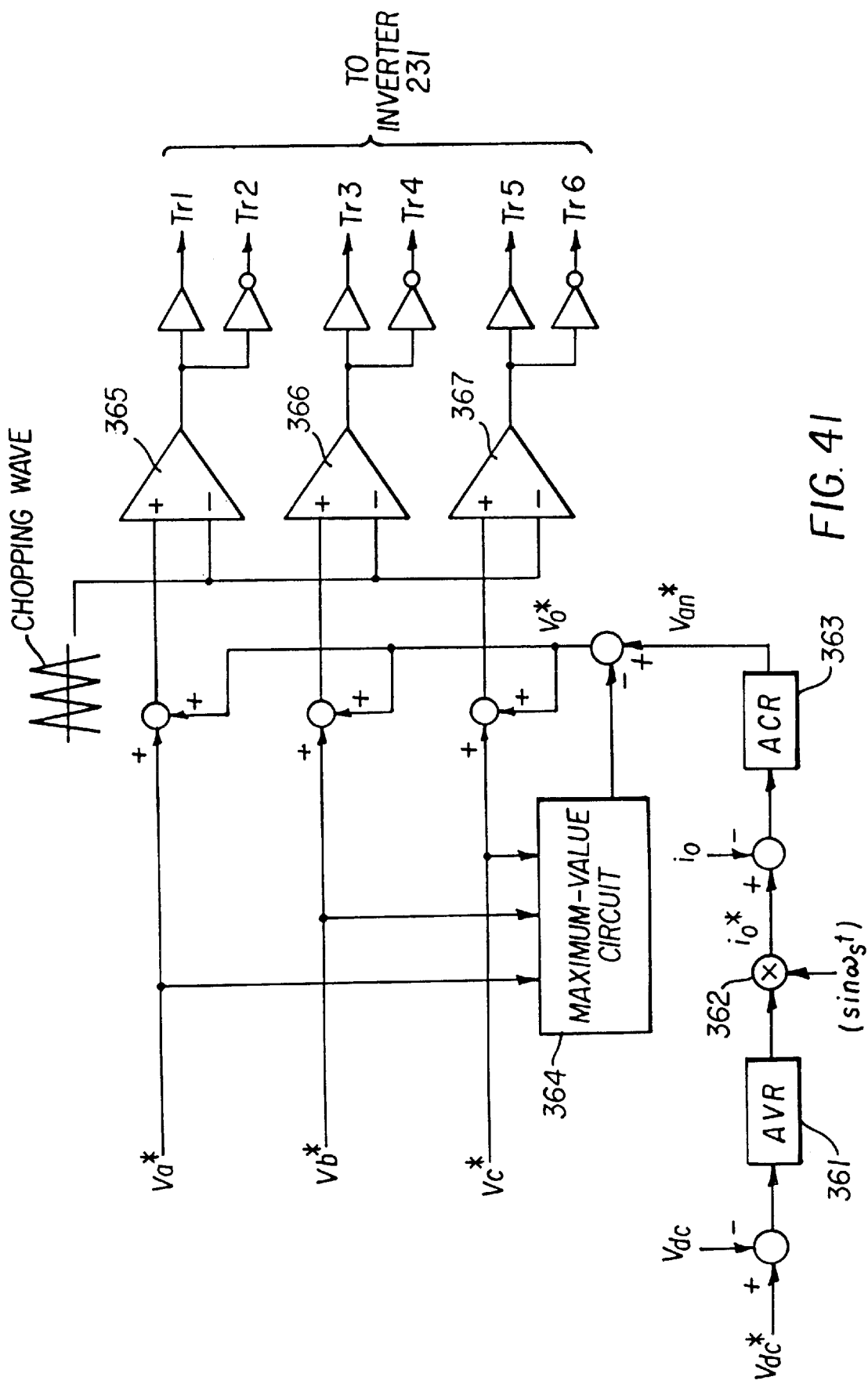
FIG. 41 is a circuit diagram showing a control circuit of the embodiment of FIG. 38.

The inverter 231 shown in FIG. 38 is controlled by PWM pulses, which are produced by a control circuit as shown in FIG. 41 by way of example.

In FIG. 41, a difference between a dc voltage command value $v_{dc}^*$ and a dc voltage detected value $v_{dc}$ (voltage of the smoothing capacitor 202 in FIG. 38) is input to a voltage controller 361, and a multiplier 362 multiplies the output of this controller 362 by an absolute value $|\sin \omega_s t|$ of a sinusoidal wave which is in phase with the power supply voltage and has a magnitude of 1, thereby to provide a zero-phase-sequence (input) current command value $i_0^*$.

A difference between the zero-phase-sequence current command value $i_0^*$ and a zero-phase-sequence current detected value $i_0$ is input to a current controller 363, which in turn produces an anode potential command value $v_{an}^*$ for the zero-phase-sequence bypass diode set 851. A difference between this anode potential command value $v_{an}^*$ and an output signal of a minimum-value circuit 364 as described later is obtained so as to obtain a zero-phase-sequence voltage command value $v_0^*$, according to the expression (2) below. The minimum-value circuit 364 serves to output the minimum value selected from voltage command values $v_a^*$, $v_b^*$, and $v_c^*$, with respect to respective phases.

The zero-phase-sequence voltage command value $v_0^*$ is then added to voltage command values $v_a^*$, $v_b^*$, and $v_c^*$, for respective phases, and the results of addition are input to comparators 365–367 for comparison with a chopping wave.

The outputs of these comparators 365–367 are reversed by the upper and lower arms, so as to obtain PWM patterns for the switching elements Tr1–Tr6 of the inverter 231.

Here, the anode potential $v_{an}$ of the zero-phase bypass diode 851 becomes zero when the switching element Tr2, Tr4, Tr6 of any one of the lower arms of the inverter 231 is turned on. Considered in terms of the average voltage during one switching period, the anode potential $v_{an}$ is the lowest potential among the average voltages in the respective switching periods of the U, V, W phases. Thus, the anode potential $v_{an}$ is obtained based on the voltage command values $v_a^*$, $v_b^*$, $v_c^*$ calculated from line voltage command values for respective phases, and zero-phase-sequence voltage command value $v_0^*$, and is represented by the following expression (1):

$$v_{an} = \min(v_a^*, v_b^*, v_c^*) + v_0^* \qquad (1)$$

where $\min(v_a^*, v_b^*, v_c^*)$ represents the minimum value of $v_a^*, v_b^*$ and $v_c^*$, which value is generated by the minimum-value circuit 364.

Accordingly, the zero-phase-sequence voltage command value $v_0^*$ on which each of the voltage command values $v_a^*$, $v_b^*$, $v_c^*$ is superimposed is represented by the following expression (2):

$$v_0^* = v_{an}^* - \min(v_a^*, v_b^*, v_c^*) \qquad (2)$$

where $v_{an}^*$ represents anode potential command value.

Figure 42:
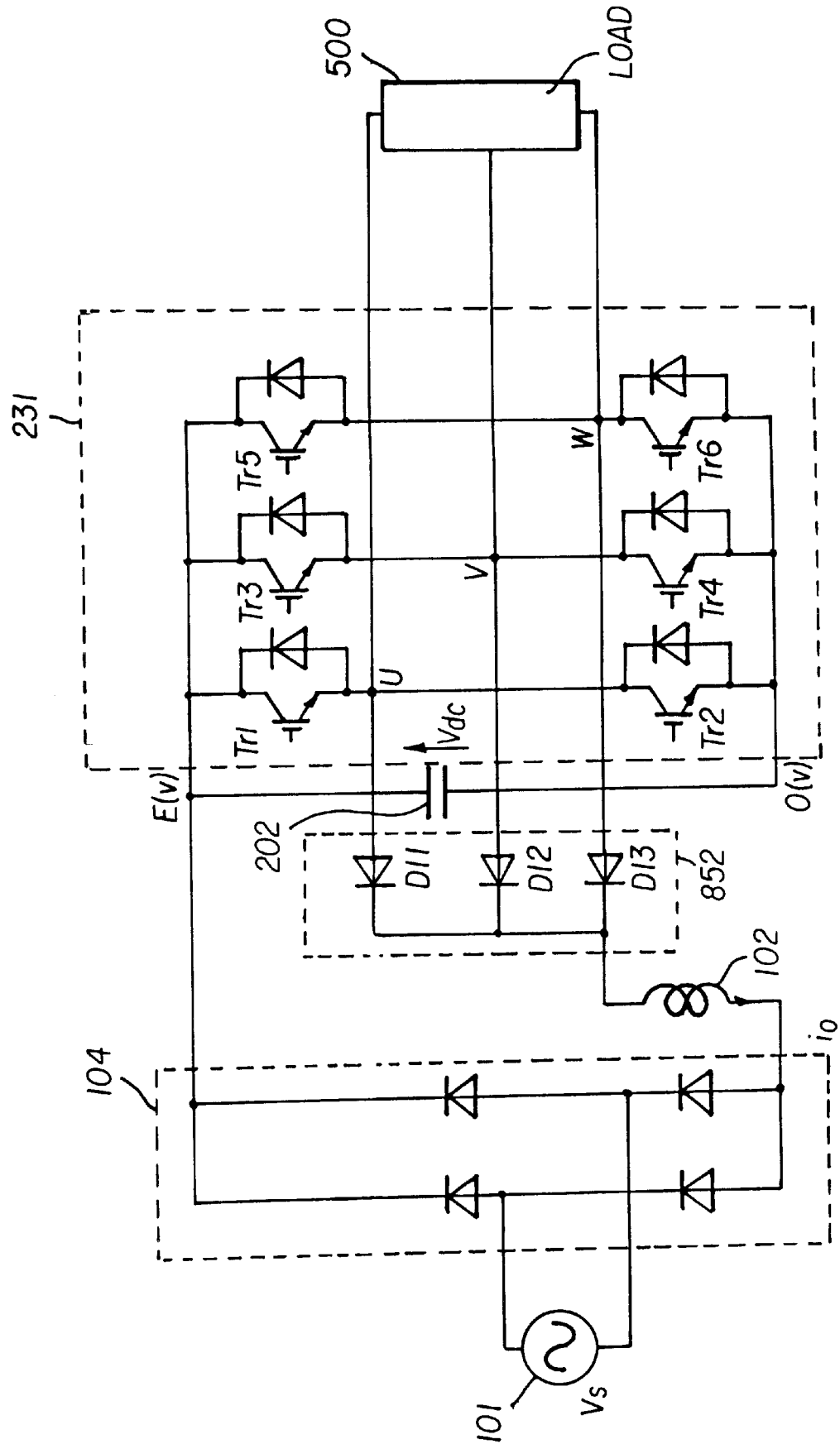
FIG. 42 is a circuit diagram showing the twenty-second embodiment of the invention.

FIG. 42 is a circuit diagram showing a power conversion apparatus according to the twenty-second embodiment of the present invention.

In this embodiment, the positive-side output terminal of the rectifier circuit 104 and the positive-side terminal of the smoothing capacitor 202 are connected to each other, and one end of the reactor 102 is connected to the negative-side output terminal of the rectifier circuit 104, while a zero-phase bypass diode set 852 is connected between the other end of the reactor 102 and ac output terminals U, V, W of the inverter 231. In this arrangement, the polarity of diodes D11–D13 that constitute the zero-phase bypass diode set 852 is reversed with respect to that of the diodes D11–D13 shown in FIG. 38.

In the present embodiment, too, upon output of a zero-voltage vector by the inverter 231, zero-phase-sequence power is transmitted between the single-phase ac power supply 101 and the inverter 231 via the zero-phase bypass diode set 852, so that the inverter 231 performs substantially the same operation as the booster chopper used in the known circuit. Thus, the apparatus of this embodiment do no need semiconductor switching elements for the booster chopper, and circuits for driving and controlling the switching elements.

Figure 43:
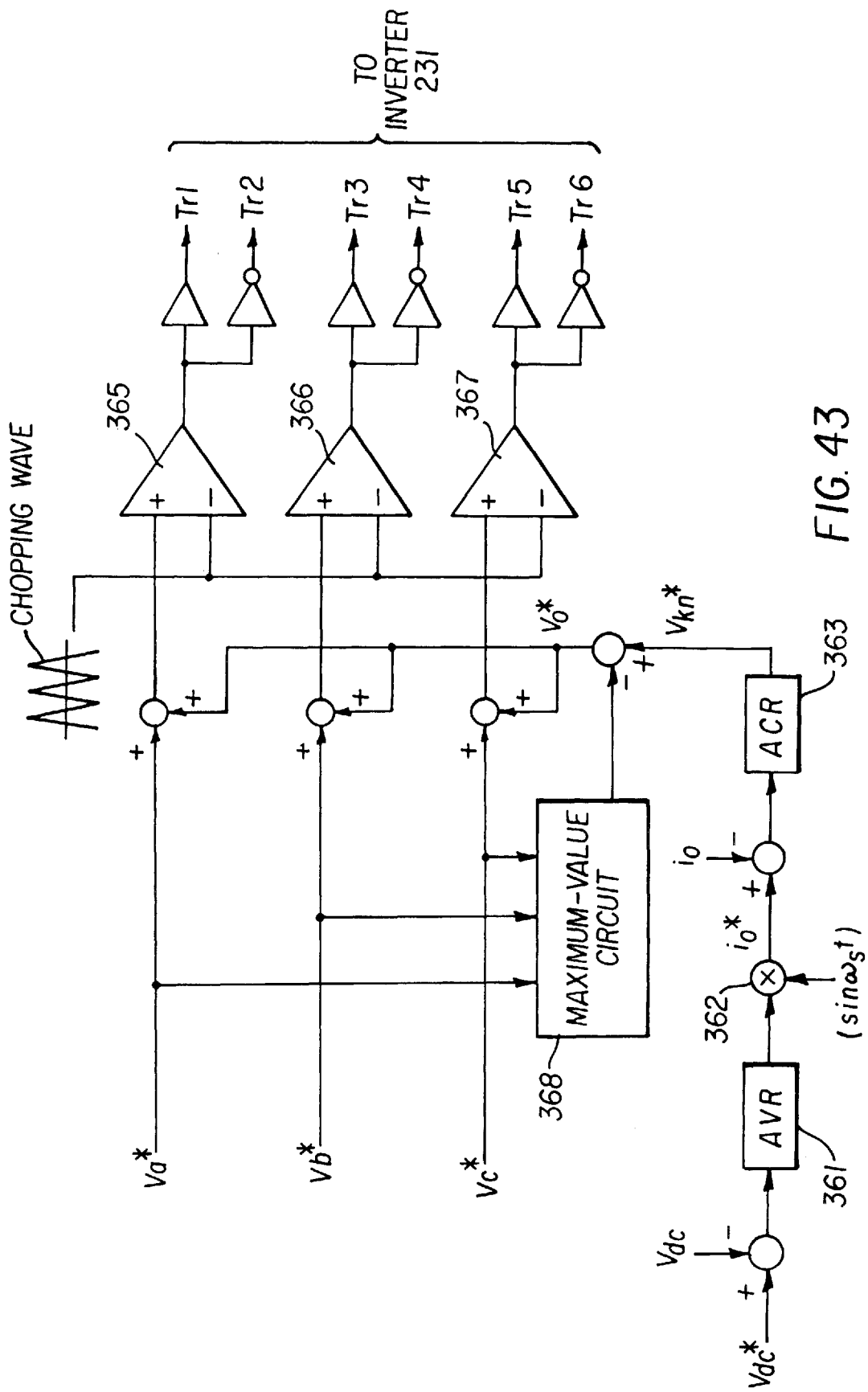
FIG. 43 is a circuit diagram showing a control circuit of the embodiment of FIG. 42.

FIG. 43 is a control circuit for controlling the inverter 231 of FIG. 42.

The control circuit of FIG. 43 is different from that of FIG. 41 in that the output of the current controller 363 of the circuit of FIG. 43 is represented as a cathode potential command value $v_{kn}^*$, while the maximum value of voltage command values $v_a^*$, $v_b^*$ and $v_c^*$ is generated by a maximum-value circuit 368, and a difference between the cathode potential command value $v_{kn}^*$ and this maximum value is obtained as a zero-phase-sequence voltage command value $v_0^*$.

The cathode potential $v_{kn}$ of the zero-phase bypass diode set 852 becomes equal to E[V] (dc input voltage of the inverter 231) when the switching element Tr1, Tr3, Tr5 of any one of the upper arms of the inverter 231 is turned on.

Considered in terms of the average voltage during one switching period, the cathode potential $v_{kn}$ is the highest potential among the average voltages in the respective switching periods of the U, V, W phases. Thus, the cathode potential $v_{kn}$ is obtained based on the voltage command values $v_a^*$, $v_b^*$, $v_c^*$ calculated from line voltage command values for respective phases, and zero-phase-sequence voltage command value $v_0^*$, and is represented by the following expression (3):

$$v_{kn} = \max(v_a^*, v_b^*, v_c^*) + v_0^* \quad (3)$$

where $\max(v_a^*, v_b^*, v_c^*)$ represents the maximum value of $v_a^*$, $v_b^*$ and $v_c^*$, which value is generated by the maximum-value circuit 368.

Accordingly, the zero-phase-sequence voltage command value $v_0^*$ on which each of the voltage command values $v_a^*$, $v_b^*$, $v_c^*$ is superimposed is represented by the following expression (4):

$$v_0^* = v_{kn}^* - \max(v_a^*, v_b^*, v_c^*) \quad (4)$$

Figure 44:
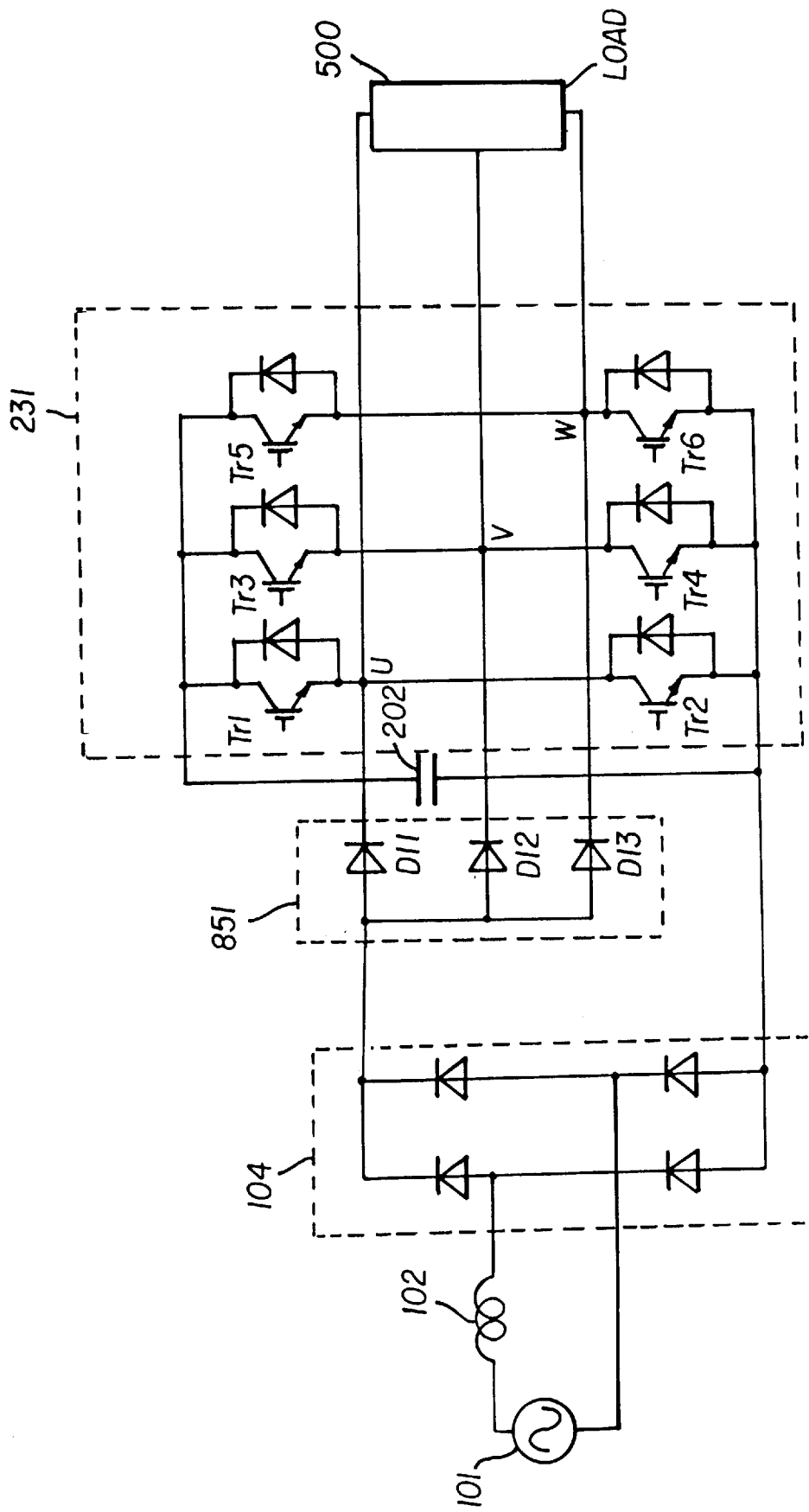
FIG. 44 is a circuit diagram showing the twenty-third embodiment of the invention.

FIG. 44 is a circuit diagram showing a power conversion apparatus according to the twenty-third embodiment of the present invention, which is a modified example of the embodiment of FIG. 38 wherein the reactor 102 located on the dc side of the rectifier circuit 104 in FIG. 38 is replaced by a reactor 102 located on the side of the ac power supply 101.

Although the operation of the present embodiment is similar to that of FIG. 38, the overall size of the apparatus can be reduced by forming a module of a main circuit consisting of the rectifier circuit 104, zero-phase bypass diode 851, inverter 231, smoothing capacitor 202, and so on.

The concept of connecting a reactor to the side of the ac power supply 101 as in the present embodiment may be applied to the embodiment of FIG. 42. Although not illustrated in the figures, the reactor 102 on the dc output side of the rectifier circuit 104 in FIG. 42 may be replaced by an ac reactor that is disposed between the ac power supply 101 and the rectifier circuit 104.

In the present embodiment, the control circuit of FIG. 41 or FIG. 43 may be employed as a circuit for controlling the inverter 231.

Figure 45:
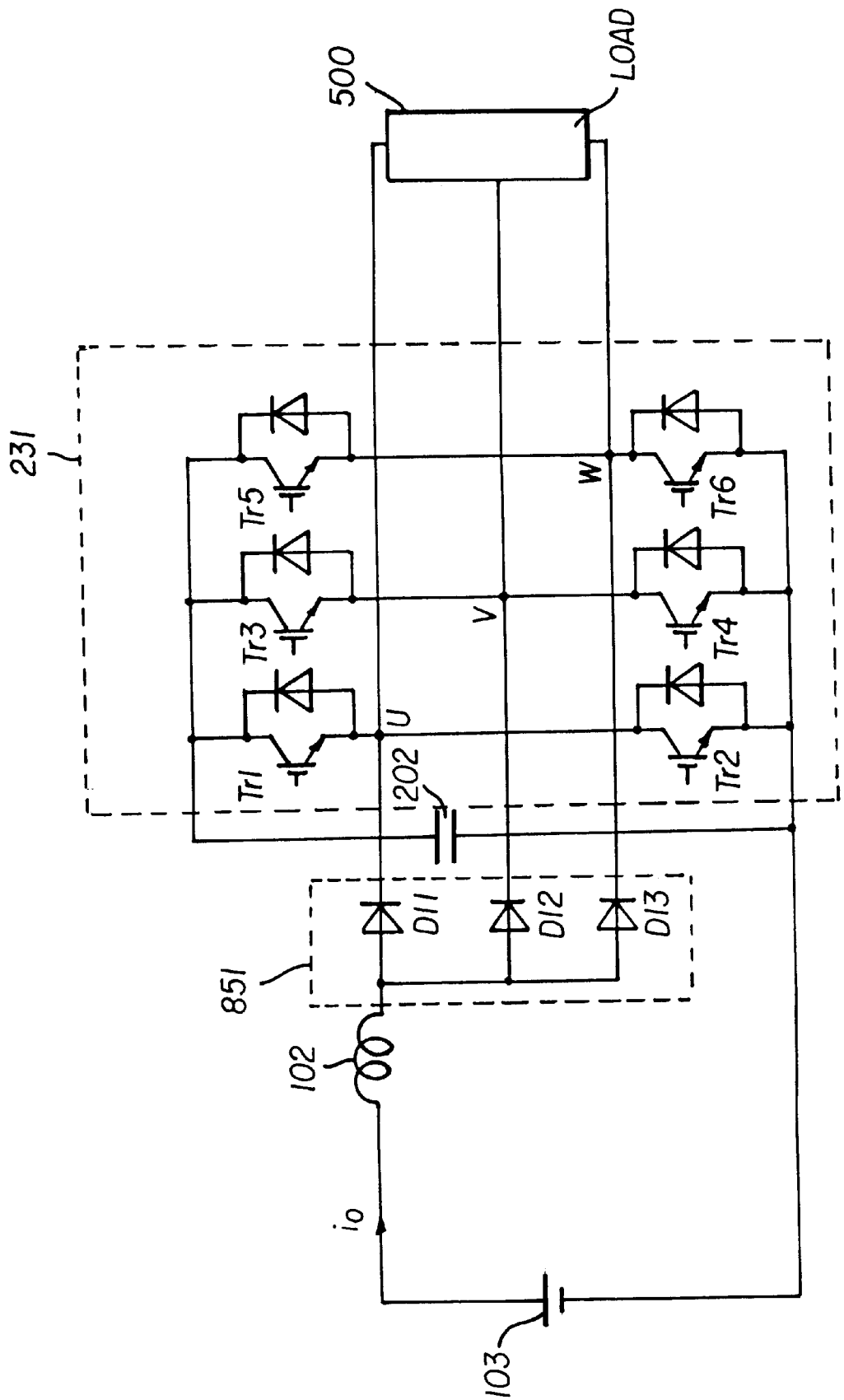
FIG. 45 is a circuit diagram showing the twenty-fourth embodiment of the invention.

FIG. 45 is a circuit diagram showing a power conversion apparatus constructed according to the twenty-fourth embodiment of the present invention.

This embodiment is a modified example of the embodiment of FIG. 38 wherein the combination of the ac power supply 101 and rectifier circuit 104 shown in FIG. 38 is replaced by a dc power supply 103.

In the present embodiment, the inverter 231 is caused to generate a zero-voltage vector to perform substantially the same operation as the booster chopper of the known circuit, so that dc link voltage of the inverter 231 can be increased, thus making it possible to broaden or increase the range of the output voltage.

The concept of using the dc power supply 103 in place of the combination of the ac power supply and the rectifier circuit as in the present embodiment is also applicable to the embodiment of FIG. 42.

The control circuit of FIG. 41 or FIG. 43 may be used as a circuit for controlling the inverter 231 of the present embodiment.

The present invention may be applied to power converting circuits including single-phase voltage type inverters, or polyphase voltage-type inverters other than three-voltage-type inverters.

What is claimed is:

1. A power conversion apparatus, comprising:

a power converter including a plurality of semiconductor switching elements which operate to perform power conversion, thereby to output polyphase alternating current;

an ac load circuit connected to an ac output side of the power converter; and a zero-phase power supply device connected to the ac load circuit and to the power converter, wherein the power converter, ac load circuit, and the zero-phase power supply device are connected in the form of a loop, so that voltage and current of the zero-phase power supply device provide zero-phase-sequence components when viewed from the ac output side of the power converter through the ac load circuit, and wherein the power converter performs time-sharing operations to supply and receive electric power to and from the ac load circuit, and supply and receive zero-phase-sequence power to and from the zero-phase power supply device.

2. A power conversion apparatus, comprising:

a single-phase ac power supply that generates a single-phase ac voltage;

a power converter including a voltage-type inverter that generates a polyphase ac voltage;

a polyphase ac motor that is driven by the polyphase ac voltage generated from the voltage-type inverter, said polyphase ac motor including stator windings that are star-connected to each other; and a converter comprising two semiconductor switching elements that are connected in series and coupled to a dc side of the voltage-type inverter, wherein a first terminal of said single-phase ac power supply is connected to a neutral point of the stator windings of the polyphase ac motor, and a second terminal of the single-phase ac power supply is connected to a middle point between the two semiconductor elements of the converter, so that voltage and current of the single-phase ac power supply provide zero-phase-sequence components when viewed from an ac output side of the voltage-type inverter through the polyphase ac motor, and wherein the voltage-type inverter supplies and receives electric power to and from the polyphase ac motor, and the inverter and the converter supply and receive zero-phase-sequence power to and from the ac power supply when the inverter outputs a zero-voltage vector, such that power transmission between the inverter and the ac motor and power transmission between the inverter and converter, and the ac power supply, are performed in a time-sharing manner.

3. A power conversion apparatus, comprising:

a single-phase ac power supply that generates a single-phase ac voltage;

a power converter including a voltage-type inverter that generates a polyphase ac voltage;

a polyphase ac motor that is driven by the polyphase ac voltage generated from the voltage-type inverter, said polyphase ac motor including stator windings that are star-connected to each other; and a converter comprising two diodes that are connected in series and coupled to a dc side of the voltage-type inverter, wherein a first terminal of said single-phase ac power supply is connected to a neutral point of the stator windings of the polyphase ac motor, and a second terminal of the single-phase ac power supply is connected to a middle point between the two diodes of the converter, so that voltage and current of the ac power supply provide zero-phase-sequence components when viewed from an ac output side of the voltage-type inverter through the polyphase ac motor, and wherein the voltage-type inverter supplies and receives electric power to and from the polyphase ac motor, and the inverter and the converter supply and receive zero-phase-sequence power to and from the single-phase ac power supply when the inverter outputs a zero-voltage vector, such that power transmission between the inverter and the ac motor and power transmission between the inverter and converter, and the ac power supply, are performed in a time-sharing manner.

4. A power conversion apparatus, comprising:

a single-phase ac power supply that generates a single-phase ac voltage;

a power converter including a voltage-type inverter that generates a polyphase ac voltage;

a polyphase ac motor that is driven by the polyphase ac voltage generated from the voltage-type inverter, said polyphase ac motor including stator windings that are star-connected to each other; and a converter comprising two capacitors that are connected in series and coupled to a dc side of the voltage-type inverter, wherein a first terminal of the single-phase ac power supply is connected to a neutral point of the stator windings of the polyphase ac motor, and a second terminal of the single-phase ac power supply is connected to a middle point between the two capacitors of the converter, so that voltage and current of the ac power supply provide zero-phase-sequence components when viewed from an ac output side of the voltage-type inverter through the polyphase ac motor, and wherein the voltage-type inverter supplies and receives electric power to and from the polyphase ac motor, and the inverter and the converter supply and receive zero-phase-sequence power to and from the single-phase ac power supply when the inverter outputs a zero-voltage vector, such that power transmission between the inverter and the ac motor and power transmission between the inverter and converter, and the ac power supply, are performed in a time-sharing manner.

5. A power conversion apparatus, comprising:

a dc power supply that generates a dc voltage;

a power converter including a voltage-type inverter that generates a polyphase ac voltage;

a polyphase ac motor that is driven by the polyphase ac voltage generated from the voltage-type inverter, said polyphase ac motor including stator windings that are star-connected to each other; and a smoothing capacitor that is connected in parallel to a dc side of the voltage-type inverter, wherein a first terminal of the dc power supply is connected to a neutral point of the stator windings of the polyphase ac motor, and a second terminal of the dc power supply is connected to a connection point between the smoothing capacitor and the inverter, so that voltage and current of the dc power supply provide zero-phase-sequence components when viewed from an ac output side of the voltage-type inverter through the polyphase ac motor, and wherein the voltage-type inverter performs time-sharing operations to supply and receive electric power to and from the polyphase ac motor, and supply and receive zero-phase-sequence power to and from the dc power supply when the inverter outputs a zero-voltage vector.

6. A power conversion apparatus, comprising:

a power inverter, including a plurality of semiconductor switching elements, which converts a DC input voltage to an AC output voltage;

a smoothing capacitor connected to a DC input side of the inverter;

an AC load circuit connected to an AC output side of the inverter;

circuit means for forming a zero-phase-sequence current circuit between the AC output side and the DC input side of the inverter; and a zero-phase power supply included in the zero-phase-sequence current circuit;

wherein the AC output voltage includes a zero-phase-sequence component as well as a positive-phase-sequence component.

7. A power conversion apparatus as defined in claim 6, wherein said inverter is a three phase voltage type inverter, and wherein said AC load circuit has a neutral point when viewed from the AC output side of the inverter.

8. A power conversion apparatus as defined in claim 7, wherein said neutral point is a neutral point of star-connected windings of a three phase AC motor in said AC load circuit.

9. A power conversion apparatus as defined in claim 8, wherein said circuit means comprises said neutral point of the AC load circuit and a middle point of a series circuit of two other semiconductor switching elements, wherein the series circuit is connected to the DC input side of the inverter, and wherein said zero-phase power supply is a single-phase AC power supply connected between said neutral point and said middle point.

10. A power conversion apparatus as defined in claim 8, wherein said circuit means comprises said neutral point of the AC load circuit and a middle point of a series circuit of two diodes, wherein the series circuit is connected to the DC input side of the inverter, and wherein said zero-phase power supply is a single-phase AC power supply connected between said neutral point and said middle point.

11. A power conversion apparatus as defined in claim 8, wherein said circuit means comprises said neutral point of the AC load circuit and a middle point of a series circuit of two other capacitors, wherein the series circuit is connected to the DC input side of the inverter, and wherein said zero-phase power supply is a single-phase AC power supply connected between said neutral point and said middle point.

12. A power conversion apparatus as defined in claim 7, wherein said circuit means comprises said neutral point of the AC load circuit and one of the DC input terminals of the inverter, wherein said zero-phase power supply is a DC power supply connected between the neutral point and the one of the DC input terminals of the inverter, and wherein the terminal of the DC power supply which is connected to the one of DC input terminals of the inverter has the same polarity as one of the DC input terminals of the inverter.

* * * * *